(12) United States Patent
Hsiung et al.

(10) Patent No.: US 7,313,447 B2
(45) Date of Patent: Dec. 25, 2007

(54) TEMPORARY EXPANDING INTEGRATED MONITORING NETWORK

(75) Inventors: Chang-Meng B. Hsiung, Irvine, CA (US); Bethsabeth Munoz, Pasadena, CA (US); Ajoy Kumar Roy, Pasadena, CA (US); Michael Gregory Steinthal, Los Angeles, CA (US); Steven A. Sunshine, Pasadena, CA (US); Michael Allen Vicic, Pasadena, CA (US); Shou-Hua Zhang, Arcadia, CA (US)

(73) Assignee: Smiths Detection Inc., Pasadena, CA (US)

( * ) Notice: Subject to any disclaimer, the term of this patent is extended or adjusted under 35 U.S.C. 154(b) by 0 days.

(21) Appl. No.: 11/376,109

(22) Filed: Mar. 16, 2006

(65) Prior Publication Data

US 2006/0259163 A1  Nov. 16, 2006

Related U.S. Application Data

(60) Division of application No. 10/214,631, filed on Aug. 7, 2002, now Pat. No. 7,031,778, which is a continuation of application No. 09/802,377, filed on Mar. 9, 2001, now Pat. No. 6,853,920.

(60) Provisional application No. 60/188,565, filed on Mar. 10, 2000, provisional application No. 60/188,590, filed on Mar. 10, 2000, provisional application No. 60/188,591, filed on Mar. 10, 2000.

(51) Int. Cl.
| | |
|---|---|
| *G05B 15/02* | (2006.01) |
| *G05B 11/01* | (2006.01) |
| *G05B 13/02* | (2006.01) |
| *G05B 19/18* | (2006.01) |
| *G06F 11/00* | (2006.01) |
| *G06F 15/00* | (2006.01) |

(52) U.S. Cl. .............................. 700/9; 700/17; 700/18; 700/19; 700/28; 702/188

(58) Field of Classification Search ............... 700/28, 700/9, 17–19; 702/188
See application file for complete search history.

(56) References Cited

U.S. PATENT DOCUMENTS 5,274,572 A  12/1993  O'Neill et al.

(Continued)

FOREIGN PATENT DOCUMENTS

EP  0 509 817 A1  10/1992

(Continued)

*Primary Examiner*—Ronald D Hartman, Jr.
(74) *Attorney, Agent, or Firm*—Foley & Lardner LLP

(57) ABSTRACT

A system for monitoring an industrial process and taking action based on the results of process monitoring. Actions taken may include process control, paging, voicemail, and input for e-enterprise systems. The system includes an input module for receiving a plurality of parameters from a process for manufacture of a substance or object. The system also includes a library module. The library module includes a plurality of computer aided processes. Any one of the computer aided processes is capable of using each of the plurality of parameters to compare at least two of the plurality of parameters against a training set of parameters. The training set of parameters is generally predetermined. The computer aided process is also capable of determining if the at least two of the plurality of parameters are within a predetermined range of the training set of parameters. Additionally, the system includes an output module for outputting a result based upon the training set and the plurality of parameters.

16 Claims, 13 Drawing Sheets

U.S. PATENT DOCUMENTS

| | | |
|---|---|---|
| 5,311,562 A | 5/1994 | Palusamy et al. |
| 5,402,333 A | 3/1995 | Cardner |
| 5,410,492 A | 4/1995 | Gross et al. |
| 5,459,675 A | 10/1995 | Gross et al. |
| 5,571,401 A | 11/1996 | Lewis et al. |
| 5,629,872 A | 5/1997 | Gross et al. |
| 5,659,467 A | 8/1997 | Vickers |
| 5,675,070 A | 10/1997 | Gelperin |
| 5,697,326 A | 12/1997 | Mottram et al. |
| 5,745,382 A | 4/1998 | Vilim et al. |
| 5,761,090 A | 6/1998 | Gross et al. |
| 5,764,509 A | 6/1998 | Gross et al. |
| 5,774,379 A | 6/1998 | Gross et al. |
| 5,788,833 A | 8/1998 | Lewis et al. |
| 5,807,701 A | 9/1998 | Payne et al. |
| 5,891,398 A | 4/1999 | Lewis et al. |
| 5,918,200 A | 6/1999 | Tsutsui et al. |
| 5,987,399 A | 11/1999 | Wegerich et al. |
| 5,991,525 A | 11/1999 | Shah et al. |
| 6,198,394 B1 | 3/2001 | Jacobsen et al. |
| 6,238,338 B1 | 5/2001 | DeLuca et al. |
| 6,356,205 B1 | 3/2002 | Salvo et al. |
| 2003/0204371 A1 | 10/2003 | Sciamanna |

FOREIGN PATENT DOCUMENTS

| | | |
|---|---|---|
| EP | 0 875 808 A2 | 4/1998 |
| EP | 0 959 398 A1 | 11/1998 |
| EP | 0 964 325 A1 | 12/1998 |
| EP | 0 965 897 A1 | 12/1999 |
| WO | WO 94/28557 | 12/1994 |
| WO | WO 97/08627 | 3/1997 |
| WO | WO 97/14105 | 4/1997 |
| WO | WO 97/49011 | 12/1997 |
| WO | WO 98/39718 | 9/1998 |
| WO | WO 99/26073 | 5/1999 |
| WO | WO 99/36920 | 7/1999 |

TEMPORARY EXPANDING INTEGRATED MONITORING NETWORK

CROSS-REFERENCE TO RELATED APPLICATIONS

This application is a divisional application of U.S. patent application Ser. No. 10/214,631, filed Aug. 7, 2002, now U.S. Pat. No. 7,031,778, which is a continuation application of U.S. patent application Ser. No. 09/802,377, filed Mar. 9, 2001, now U.S. Pat. No. 6,853,920, which also claims the benefit of the following three provisional patent applications, each filed Mar. 10, 2000 and incorporated herein by reference: U.S. provisional patent application No. 60/188,565; U.S. provisional patent application No. 60/188,590; and U.S. provisional patent application No. 60/188,591. The following nonprovisional patent applications are hereby incorporated by reference: U.S. nonprovisional patent application Ser. No. 09/802,519; and U.S. nonprovisional patent application Ser. No. 09/802,512.

BACKGROUND OF THE INVENTION

This invention in general relates to processing information or data over a network of computers. Embodiments of the present invention relate to techniques for monitoring and/or controlling complex processes by comparing the current state of a first process to current, historical, and/or predicted states of the first process or a second process using statistical, structural, or physical models. Other embodiments of the present invention provide a system including computer code for monitoring or controlling, or both monitoring and controlling a process using multi-dimensional data in a commercial setting. The multidimensional data can include, among others, intrinsic information such as temperature, acidity, chemical composition, and color, as well as extrinsic information, such as origin, and age. The multidimensional data can also include symbolic data that is primarily visual in nature and which does not readily lend itself to traditional quantification. Merely by way of example, the present invention is described below in conjunction with an industrial manufacturing process, but it would be recognized that the invention has a much broader range of applicability. The invention can be applied to monitor and control complex processes in other fields such as chemicals, electronics, biological, health care, petrochemical, gaming, hotel, commerce, machining, electrical grids, and the like. Embodiments of the present invention may further accomplish process control in real time utilizing a web-based architecture.

Techniques and devices for maintaining process control in complex processes are well known. Such techniques often require monitoring individual parameters such as temperature, pressure, flow, incoming fluid characteristics, and the like. Most of these techniques only monitor and adjust a single parameter. The single parameter is often monitored and displayed to an operator or user of the process through an electronic display. For example, refining a petroleum product such as oil or gas often uses temperature measurements of raw or in process fluids such as oil using thermocouples. These thermocouples are often attached to critical processes such as distillation and the like and then coupled to an electronic display for output. The display generally outputs signals corresponding to temperature in a graphical user interface form or numerical value in Celsius, for example. In the most primitive oil refining operations, for example, operators still monitor temperature of a process or processes using the display by visual means. If the temperature goes out of range, the operator merely adjusts the process. In more advanced applications, process controllers monitor and control temperature of processes. The process controllers often use proportional control, derivative control, integral control, or a combination of these to provide an optimum control of temperature for the process. These techniques, however, still only monitor in single parameter such as temperature and adjust-such temperature by feedback control means.

Oil refining is merely one of many examples of industrial processes that require control. Other examples include food processing, chemical production, drug manufacturing, semiconductor processing, water treatment, agriculture, assembly operations, health care, electronic power, gaming, hotel, and other commerce related fields. All of these examples generally use fairly crude processing techniques for adjusting complex processing variables such as temperature, pressure, flow rate, speed, and others, one at a time using automatic feed back control or manual feed back control. In some applications, fairly complex sensor assemblies are used to monitor process parameters. U.S. Pat. No. 5,774,374 in the name of Gross et al. and assigned to the University of Chicago, describes one way of monitoring an industrial or biological process using sensors. This conventional approach relies upon comparing a measured signal against a reference signal by subjective criteria. However, the subjective criteria have often been determined by trial and error and are only as good as the person deciding upon such criteria.

Many limitations still exist with some or all of these techniques. For example, most of these techniques still only monitor a single parameter and adjust it against a subjective reference point. Human monitoring of multiple parameters is often required, which is only as good as the human operator. Additionally, many if not all of these techniques cannot monitor the quality of a substance in process. Here, only extrinsic variables such as temperature, pressure, and the like can be easily monitored. There is simply no easy way to monitor the substance itself while it is being processed. Although complex chemical analysis methods are available to determine specific components or weights of the substance, there is simply no easy way to identify the quality of the substances while it is being manufactured. These and many other limitations are described throughout the present specification and more particularly below.

From the above, it is seen that improved ways of monitoring or controlling a process, or both monitoring and controlling a process, are highly desirable.

SUMMARY OF THE INVENTION

According to the present invention, a technique for processing information or data over a network of computers is provided, including a system for monitoring or controlling a process, or both monitoring and controlling a process. Embodiments of the present invention provide a system including computer codes for process monitoring and/or control using multidimensional data. The multidimensional data can include, among others, intrinsic information such as temperature, acidity, chemical composition, and color, as well as extrinsic information such as origin, and age.

In accordance with embodiments of the present invention, a process may be monitored and/or controlled by comparing the current state of a first process to current, historical, and/or predicted states of the first process or of a second process through the use of statistical, structural, or physical models. The process is then monitored and/or controlled based upon a descriptor predicted by the model. For purposes of this application, the term "descriptor" includes model coefficients/parameters, loadings, weightings, and labels, in addition to other types of information.

In one specific embodiment of a system for controlling a process, the system comprises a computer program product comprising a code directed to storing a first model in memory, a code directed to acquiring data from a process, and a code directed to applying the first model to the data to identify a first predicted descriptor characteristic of a state of the process. A code is directed to consulting a first knowledge based system to provide an output based upon the first predicted descriptor.

In another embodiment of a system for controlling an industrial process, the system includes a computer program product. The product includes code directed to accessing a process controller. The product also includes code directed to an input module adapted to input a plurality of parameters from a process. The product also includes code directed to a computer aided process module coupled to the process controller, the computer aided process module code being adapted to compare at least two of the plurality of parameters against a predetermined training set of parameters, and being adapted to determine if the least two of the plurality of parameters are within a predetermined range of the training set of parameters. Additionally, the product includes code directed to an output module for outputting a result based upon the training set and the plurality of parameters. Other functionality described herein can also be implemented in computer code and the like according to other embodiments of the present invention.

In another embodiment of a system for controlling a process, the system comprises a first field mounted device in communication with a process and configured to produce a first input. A process manager receives the first input and is configured to—apply a first model to the first input to identify a first predicted descriptor characteristic of a state of the process. The process manager is further configured to consult a first knowledge based system to provide an output based upon the first predicted descriptor.

In one embodiment of a method for controlling a process, the method comprises storing a first model in a memory and acquiring data from a process. The first model is applied to the data to identify a first predicted descriptor characteristic of a state of the process, and a first knowledge based system is consulted to provide an output based upon the first predicted descriptor.

Numerous benefits are achieved by way of the present invention over conventional techniques. For example, because of its web-based architecture, embodiments of the present invention permit monitoring and/or control over a process to be performed by a user located virtually anywhere. Additionally, embodiments of the invention permit monitoring and control over a process in real time, such that information about the process can rapidly be analyzed by a variety of techniques, with corrective steps based upon the analysis implemented immediately. Further, because the invention utilizes a plurality of analytical techniques in parallel, the results of these analytical techniques can be cross-validated, enhancing the reliability and accuracy of the resulting process monitoring or control. The present invention can be used with a wide variety of processes, e.g., those utilized in the chemical, biological, petrochemical, and food industries. However, the present invention is not limited to controlling the process of any particular industry, and is generally applicable to control over any process. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION AND SPECIFIC EMBODIMENTS

The present invention relates to processing information or data over a network of computers. More specifically, embodiments of the present invention include methods, systems, and computer code for monitoring or controlling a process, or for both monitoring and controlling a process.

Figure 1:
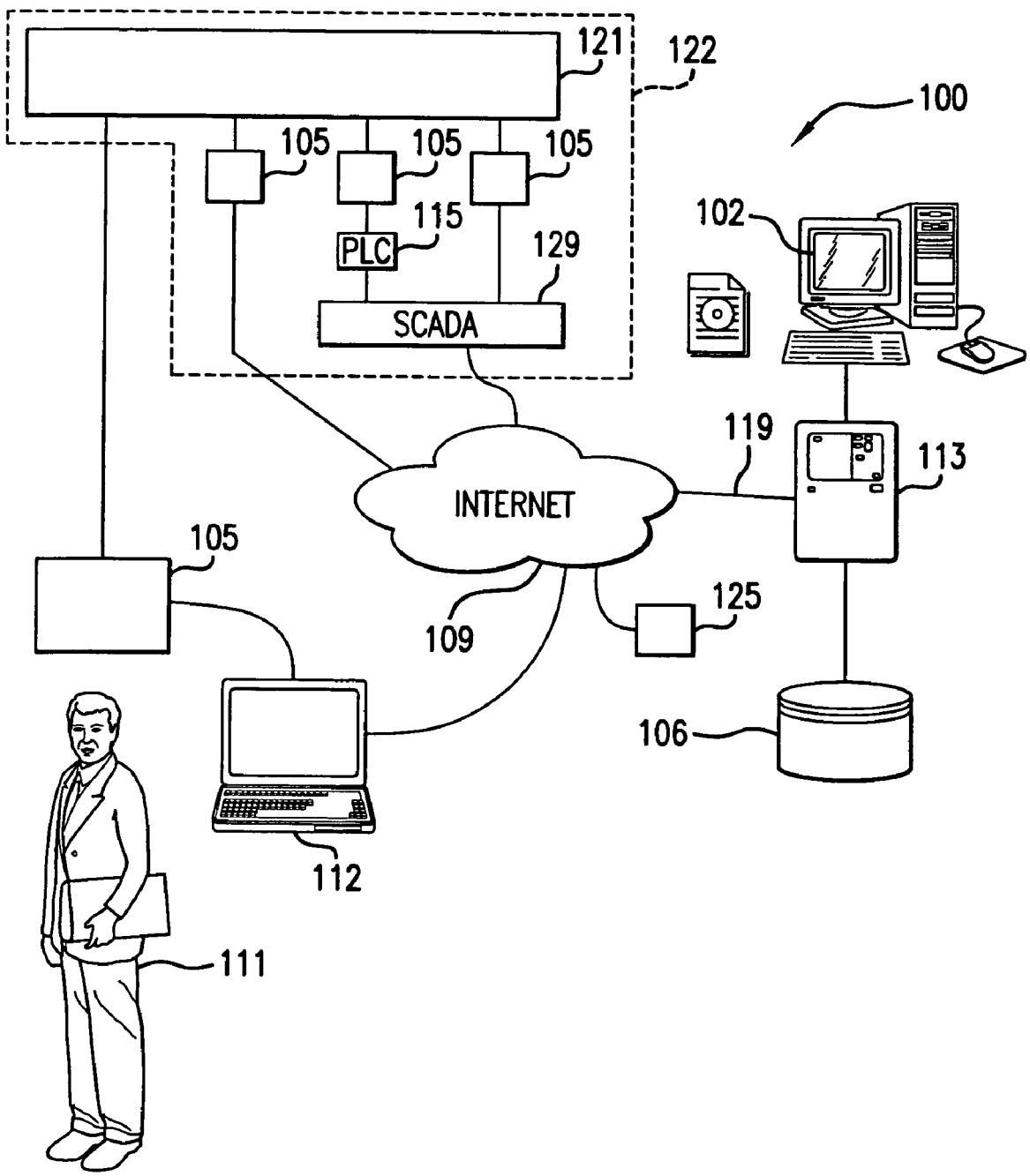
FIG. 1 is a simplified diagram of an environmental information analysis system according to an embodiment of the present invention.

FIG. 1 is a simplified diagram of an integrated computer aided system 100 for monitoring and controlling a process according to an embodiment of the present invention. This diagram is merely an example which should not limit the scope of the claims herein. One of ordinary skill in the art would recognize many other variations, modifications, and alternatives.

As shown, system 100 includes a variety of sub-systems that are integrated and coupled with one another through a web-based architecture. One example of such a sub-system is wide area network 109 which may comprise, for example, the Internet, an intranet, or another type of network. The Internet is shown symbolically as a cloud or a collection of server routers, computers, and other devices.

As used in this patent application and in industry, the concepts of "client" and "server," as used in this application and the industry, are very loosely defined and, in fact, are not fixed with respect to machines or software processes executing on the machines. Typically, a server is a machine e.g. or process that is providing information to another machine or process, i.e., the "client," e.g., that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a website is often hosted by a server computer with a large storage capacity, high-speed processor and Internet link having the ability to handle many high-bandwidth communication lines.

Wide area network 109 allows for communication with other computers such as a client unit 112. Client 112 can be configured with many different hardware components and can be made in many dimensions, styles and locations (e.g., laptop, palmtop, pen, server, workstation and mainframe).

Server 113 is coupled to the Internet 109. The connection between server 113 and internet 109 is typically by a relatively high bandwidth transmission medium such as a T1 or T3 line, but can also be other media, including wireless communication. Terminal 102 is also connected to server 113. This connection can be by a network such as Ethernet, asynchronous transfer mode, IEEE standard 1553 bus, modem connection, universal serial bus, etc. The communication link need not be in the form of a wire, and could also be wireless utilizing infrared, radio wave transmission, etc.

Another subsystem of system 100 of FIG. 1 are the various field mounted devices 105 in contact with process 121 located in plant 122. While FIG. 1 does illustrate process monitoring/control in conjunction with an industrial process, the present invention is not limited to such an application. Other types of complex processes, such as medical diagnostic procedures, could also be monitored and/or controlled in accordance with embodiments of the present invention.

Field mounted devices 105 can include sensors, transmitters, actuators, multifunctional devices, or Remote Terminal Units (RTU's), among others. As shown in FIG. 1, field mounted devices 105 may be controlled by a device such as a programmable logic controller (PLC) 115. Field mounted devices 105 are generally coupled to a central Supervisory Control and Data Acquisition (SCADA) system 129. SCADA system 129 enables control, analysis, monitoring, storage and management of the information flow between the systems at the field level and at the control level of a company. This ensures that the decentralized I/O modules and the machine controllers are linked to the office computers on the control level. Components of control, analysis, monitoring. A particular process may utilize more than one SCADA system at a time.

FIG. 1 also shows that a field mounted device 105 may be linked directly with internet 109, bypassing SCADA 129 and other common interfaces altogether. Such an arrangement will become increasingly prevalent as the use of web-enabled devices (devices including devoted hardware/ software interfaces) increases. And while FIG. 1 shows wire-based direct communication between a field mounted device and the internet, such web-enabled devices may alternatively communicate directly with the internet through wireless technology.

FIG. 1 further shows that a field mounted device 105 may be coupled to a laptop client computer 112 that is in turn in communication with internet 109. This latter configuration is particularly useful where a particular field mounted device is not permanently linked to the process via SCADA system 129, but is instead transported to process 121 and temporarily installed by technician 111 for specialized diagnostic or control purposes.

Field mounted devices 105 can be similar or can also be different, depending upon the application. One example of a field mounted device is a sensing element for acquiring olfactory information from fluid substances, e.g., liquid, vapor, liquid/vapor. Once the information is acquired by field mounted device 105, device 105 may transfer information to server 113 for processing purposes. In one aspect of the present invention, process 121 is monitored and controlled using information that includes multi-dimensional data. Details of the processing hardware is shown below and illustrated by the Figs.

Database 106 is connected to server 113. Database 106 includes information useful for process control and monitoring functions. For example, database 106 may store information regarding process 121 received from field mounted devices 105. Database 106 may also include a library of different algorithms or models that may be used to monitor and control industrial process 121. Alternatively, such a library of algorithms or models may be resident on server 113.

In accordance with embodiments of the present invention, the outcome of applying a specific algorithm or model to process 121 may be internally cross-validated by comparing the result application of other algorithms or models to the same data. Examples of specific algorithms and models, and their role in process control/monitoring methods and systems in accordance with embodiments of the present invention, are described more fully below.

FIG. 1 also shows that internet 109 is linked to one or more external systems 125. Examples of such external systems include Enterprise Resource Planning (ERP) systems and Lab Information Management Systems (LIMS). External system 125 could also be a duplicate or sister process of process 121, such that the state of process 121 may be externally validated by comparison with the results of the second process.

Figure 1A:
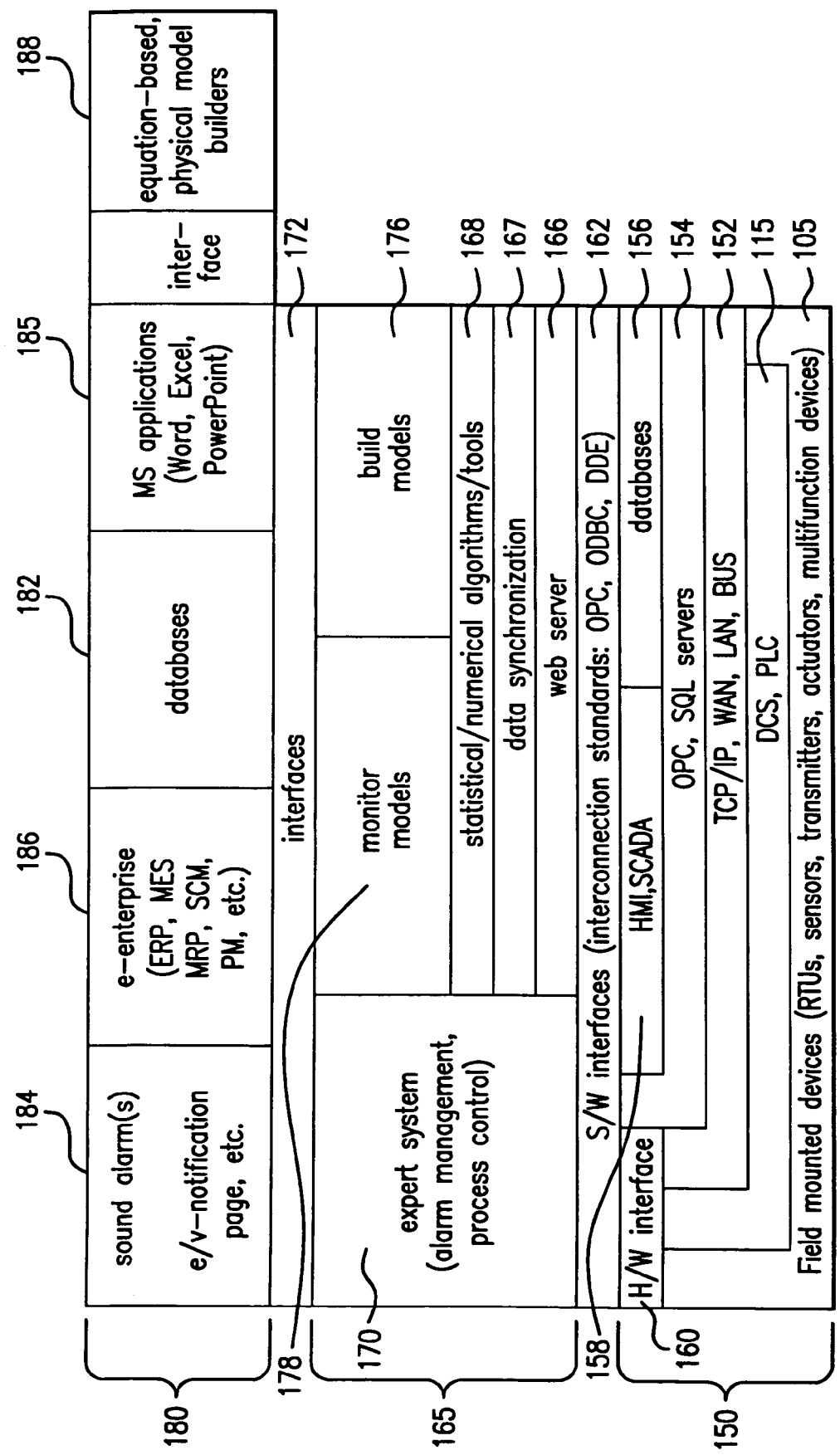
FIG. 1A is a simplified block diagram showing a process monitoring and control system in accordance with one embodiment of the present invention.

FIG. 1A is a simplified block diagram showing a process monitoring and control system in accordance with one embodiment of the present invention. FIG. 1A shows various layers where information is gathered, distributed, and/or processed.

Bottom portion 150 of FIG. 1A represents structures that are in general located proximate to the physical location of the process itself, such as in the manufacturing plant. The lowest layer of portion 150 represents field mounted devices 105 such as RTU's, sensors, actuators, and multifunctional devices in direct contact with the process. The next layer represents logic devices 115 such as programmable logic controllers (PLC) that receive signals from and transmit signals to, field mounted devices 105. The next layer of FIG. 1A represents communication structures 152 such as buses, wide area networks (WAN), or local area networks (LAN) that enable communication using TCP/IP protocols of data collected by field mounted devices 105 to a centralized location. This centralized location is represented by the next layer as Structured Query Language (SQL) or OPC (OLE for Process Control, where OLE is Object Linking and Embedding) server 154. Server 154 includes an interface with database 156, used for example to store archived process data, and also typically includes a user interface 158. The user interface can be a direct human machine interface (HMI), or as previously described can take the form of a SCADA system.

Field mounted devices 105, logic devices 115, communication structures 152, and server 154 are each in communication with hardware interface 160 that is in turn in communication with software interface 162. Software interface 162 links bottom portion 150 of FIG. 1A with middle portion 165 of FIG. 1A.

Middle portion 165 represents process control and monitoring processes in accordance with embodiments of the present invention. An input module includes software interface 162 which couples information from the conventional processing plant to a plurality of processes for operations and analysis. As known to those of skill in the art, the software interface 162 may take the form of several standards, including Open DataBase Connectivity (ODBC), or Dynamic Data Exchange (DDE) standards. Software interface 162 in turn couples with server 166, rendering both inputs and outputs of the process control system accessible via web-based communication. Specifically, data from the process may be acquired over the internet, and outputs from the system may be accessed by a user over the internet utilizing browser software.

In the next layer 167, data received by server 166 is synchronized to permit orderly assimilation for monitoring and control purposes. In the next layer 168, the assimilated data is examined and manipulated using a—variety of techniques, including statistical/numerical algorithms and tools 168, expert systems 170, and others. These processes also include model building 176 to accurately predict behavior of the process, and model monitoring 178 based upon inputs received from the plant.

Common interface 172 is part of an output module that couples the analysis processes of middle portion 165 with selected legacy systems shown in top portion 180 of FIG. 1A. Such legacy systems include databases 182, display systems 184 for sounds/alarms, and desktop applications 185. Legacy systems may also include Enterprise Resource Planning (ERP) and other e-enterprise systems 186, as well as Supply Chain Management (SCM) systems. The legacy systems may further include equation-based models 188 for predicting process behavior based upon physical laws.

FIG. 1A illustrates several aspects of process monitoring and/or control in accordance with embodiments of the present invention. For example, process modeling and control may be implemented utilizing a web-based architecture. Statistical methods, expert systems, and algorithms utilized to monitor and control the process need not be present at the plant site, but rather can receive information from the plant over the web. This allows the user to monitor and control process parameters from essentially any physical location, particularly given the emergence of wireless communications.

In certain embodiments of systems in accordance with the present invention, algorithms and models, and the results of application of algorithms and models to process data, may all be resident or accessible through a common application server. In this manner, the user may remotely access data and/or model results of interest, carefully controlling the bandwidth of information transmitted communicated according to available communication hardware. This server-based approach simplifies access by requiring user access to a simple browser rather than a specialized software package.

Yet another aspect of the present invention is the ability to monitor and control a process in real time. Specifically, data collected by the field level-sensors may rapidly be communicated over the Internet to the server that is coordinating application of statistical methods, expert systems, and algorithms in accordance with embodiments of the present invention. These techniques can rapidly be applied to the data to produce an accurate view of the process and to provide recommendations for user action.

Still another aspect of the present invention illustrated in FIG. 1A is the ability to precisely dictate the autonomy of process monitoring and/or control from human oversight. Specifically, the system permits scalable autonomy of process monitoring and control from a human user. On one end of the scale, a human user can have an intimate role with the system, carefully monitoring incoming process data, viewing possible interpretations of the data based upon models, expert systems, and algorithms, and then based upon these possible interpretations selecting a course of action based upon his or her experience, intuition, and judgment. Alternatively, the role of the human user can be less intimate, with the human operator merely monitoring the responses undertaken by the system to control the process, and focusing upon process control only in unusual situations or even not at all.

Another aspect of the present invention is the ability to rapidly and effectively transfer key preliminary information downstream to process monitoring and modeling functions. For example, the present invention may be utilized to monitor and control an oil refining process. Key operational parameters in such a process would be affected by preliminary information such as the physical properties of incoming lots of crude oil starting material. One example of a test for measuring the physical properties of crude oil is American Society for Testing and Materials (ASTM) method number 2878, in which 22 temperatures are measured after specified amounts of fluids have been vaporized. The values of these 22 variables from lot-to-lot are likely to provide sufficient information to calculate appropriate set point values for one or more temperatures in a petroleum cracking process, such as the temperature profile for the first in a series of reactors.

Utilizing the present invention, the crude oil could be sampled and analyzed using the ASTM 2878 method at a location distant from the refinery (i.e. at the oil field or on a ship approaching the refinery), and data from the analysis communicated in real time over a web-based link downstream to the process monitoring and control functionalities. Process monitoring and control functionalities (i.e. models, algorithms, and/or knowledge based systems) could be adjusted to take into account the specific properties of the incoming crude oil, ensuring the accuracy and reliability of the determination of process state.

Another aspect of the present invention is parallel use of a wide variety of techniques for process monitoring and control, with enhanced reliability obtained by cross-validating results of these techniques. This aspect is further illustrated in connection with FIGS. 2-3A.

Figure 2:
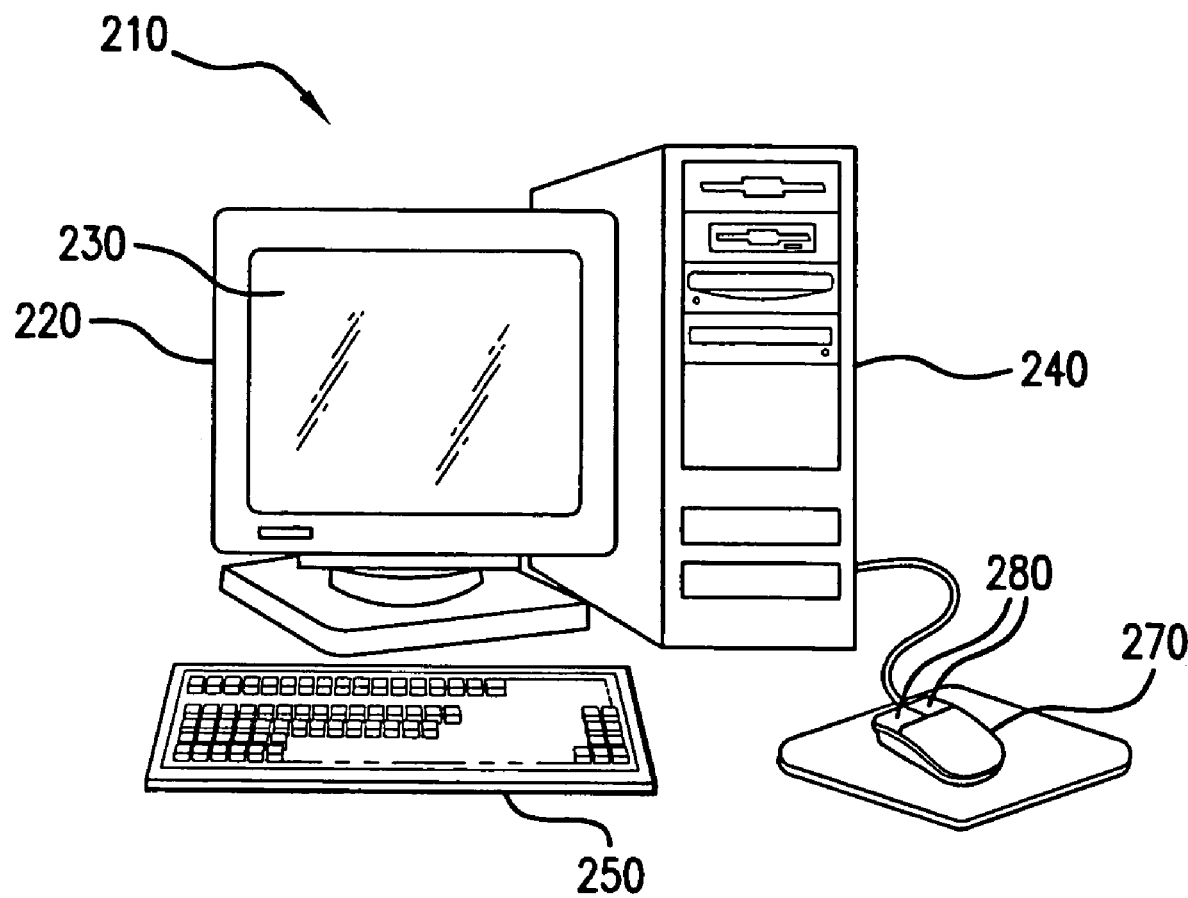
FIGS. 2 to 2A are simplified diagrams of computing device for processing information according to an embodiment of the present invention.

FIG. 2 is a simplified diagram of a computing device for processing information according to an embodiment of the present invention. This diagram is merely an example which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship.

FIG. 2 shows computer system 210 including display device 220, display screen 230, cabinet 240, keyboard 250, and mouse 270. Mouse 270 and keyboard 250 are representative "user input devices." Mouse 270 includes buttons 280 for selection of buttons on a graphical user interface device. Other examples of user input devices are a touch screen, light pen, track ball, data glove, microphone, and so forth. FIG. 2 is representative of but one type of system for embodying the present invention. It will be readily apparent to one of ordinary skill in the art that many system types and configurations are suitable for use in conjunction with the present invention. In a preferred embodiment, computer system 210 includes a Pentium™ class based computer, running Windows™ operating system by Microsoft Corporation. However, the apparatus is easily adapted to other operating systems and architectures by those of ordinary skill in the art without departing from the scope of the present invention.

As noted, mouse 270 can have one or more buttons such as buttons 280. Cabinet 240 houses familiar computer components such as disk drives, a processor, storage device, etc. Storage devices include, but are not limited to, disk drives, magnetic tape, solid state memory, bubble memory, etc. Cabinet 240 can include additional hardware such as input/output (I/O) interface cards for connecting computer system 210 to external devices external storage, other computers or additional peripherals, which are further described below.

Figure 2A:
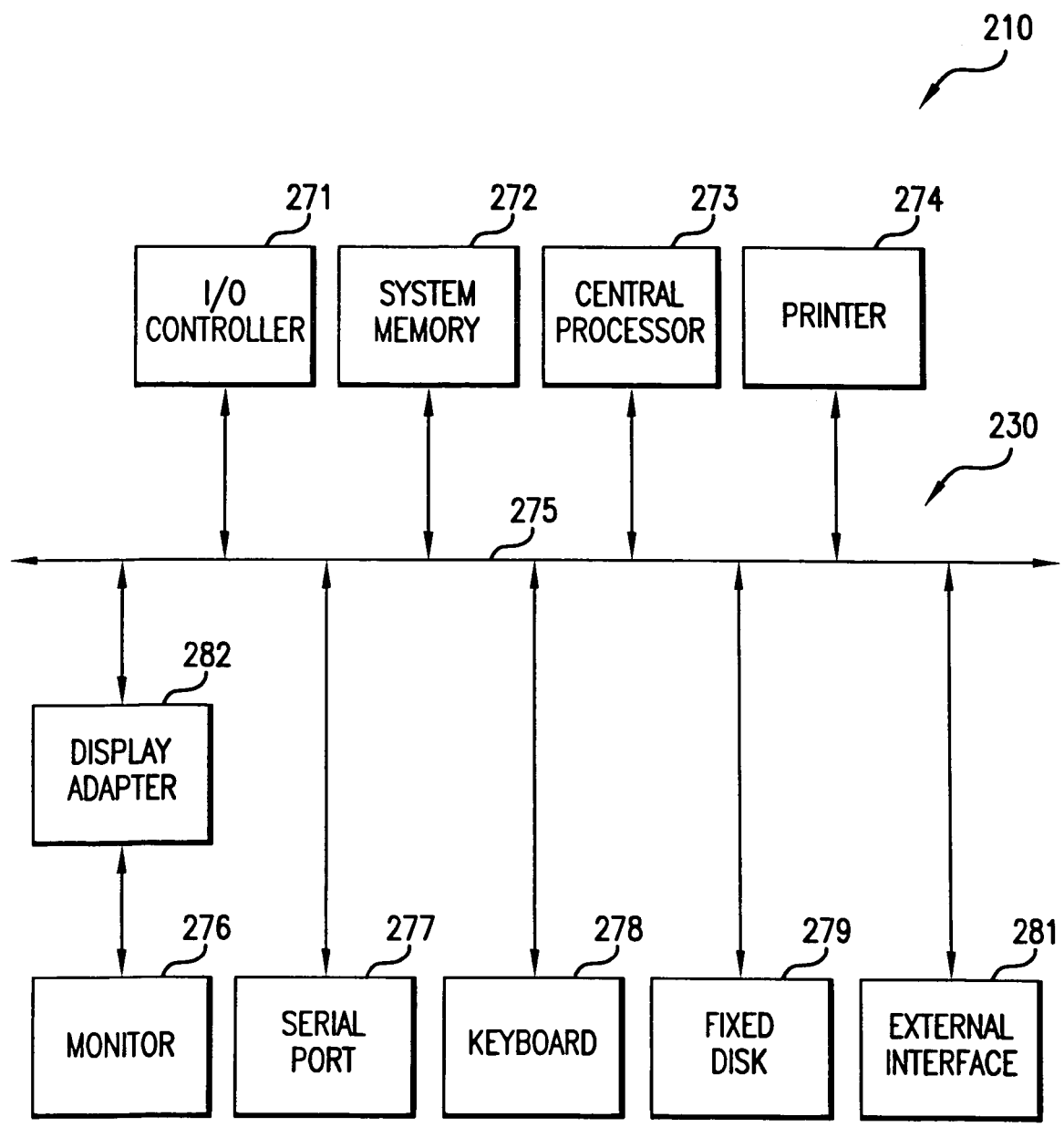

FIG. 2A is an illustration of basic subsystems in computer system 210 of FIG. 2. This diagram is merely an illustration and should not limit the scope of the claims herein. One of ordinary skill in the art will recognize other variations, modifications, and alternatives. In certain embodiments, the subsystems are interconnected via a system bus 275. Additional subsystems such as a printer 274, keyboard 278, fixed disk 279, monitor 276, which is coupled to display adapter 282, and others are shown. Peripherals and input/output (I/O) devices, which couple to I/O controller 271, can be connected to the computer system by any number of means known in the art, such as serial port 277. For example, serial port 277 can be used to connect the computer system to a modem 281, which in turn connects to a wide area network such as the Internet, a mouse input device, or a scanner. The interconnection via system bus allows central processor 273 to communicate with each subsystem and to control the execution of instructions from system memory 272 or the fixed disk 279, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 3:
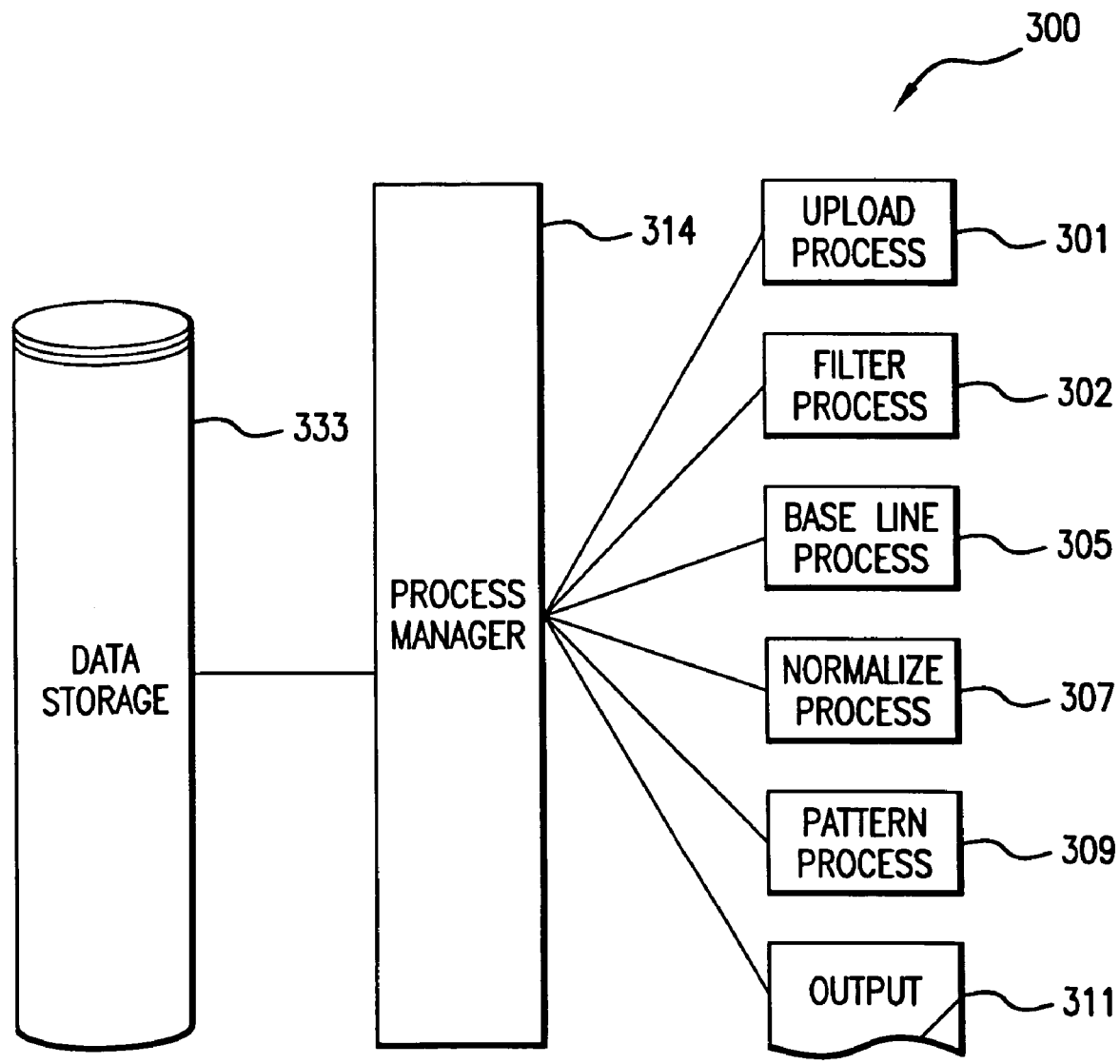
FIG. 3 is a simplified diagram of computing modules for processing information according to an embodiment of the present invention.

FIG. 3 is a simplified diagram of computing modules 300 in a system for processing information according to an embodiment of the present invention. This diagram is merely an example which should not limit the scope of the claims herein. One of ordinary skill in the art would recognize many other variations, modifications, and alternatives. As shown, the computing modules 300 include a variety of processes, which couple to a process manager 314. The processes include an upload process 301, a filter process 302, a base line process 305, a normalization process 307, a pattern process 309, and an output process 311. Other processes can also be included. A non-exclusive explanatory list of pre-processing techniques utilized by the present invention is given in TABLE 7.

Process manager also couples to data storage device 333 and oversees the processes. These processes can be implemented in software, hardware, firmware, or any combination of these in any one of the hardware devices, which were described above, as well as others.

The upload process takes data from the acquisition device and uploads them into the main process manager 314 for processing. Here, the data are in electronic form. In embodiments where the data has been—stored in data storage, they are retrieved and then loaded into the process. Preferably, the data can be loaded onto workspace to a text file or loaded into a spread sheet for analysis. Next, the filter process 302 filters the data to remove any imperfections. As merely an example, data from the present data acquisition device are often accompanied with glitches, high frequency noise, and the like. Here, the signal to noise ratio is often an important consideration for pattern recognition especially when concentrations of analytes are low, exceedingly high, or not within a predefined range of windows according to some embodiments. In such cases, it is desirable to boost the signal to noise ratio using the present digital filtering technology. Examples of such filtering technology includes, but is not limited to a Zero Phase Filter, an Adaptive Exponential Moving Average Filter, and a Savitzky-Golay Filter, which will be described in more detail below.

The data go through a baseline correction process 305. Depending upon the embodiment, there can be many different ways to implement a baseline correction process. In the field of process control, one approach to establishing a baseline is stationarization. Stationarization involves the elimination of seasonal and/or batch variations from process control analysis. Stationarization is particularly useful in monitoring the time dynamics of a process. In monitoring process dynamics, the value of a single measurement, such as temperature, may not be as important as the relationship between successive temperature measurements in time.

A baseline correction process may also find response peaks, calculate $\Delta R/R$, and plot the $\Delta R/R$ verses time stamps, where the data have been captured. It also calculates maximum $\Delta R/R$ and maximum slope of $\Delta R/R$ for further processing. Baseline drift is often corrected by way of the present process. The main process manager also oversees that data traverse through the normalization process 307. In some embodiments, normalization is a row wise operation. Here, the process uses a so-called area normalization. After such normalization method, the sum of data along each row is unity. Vector length normalization is also used, where the sum of data squared of each row equals unity.

Next, the method performs a main process for classifying each of the substances according to each of their characteristics in a pattern recognition process. The pattern recognition process uses more than one algorithms, which are known, are presently being developed, or will be developed in the future. The process is used to find weighting factors for each of the characteristics to ultimately determine an identifiable pattern to uniquely identify each of the substances. That is, descriptors are-provided for each of the substances. Examples of some algorithms are described throughout the present specification. Also shown is the output module 311. The output module is coupled to the process manager. The output module provides for the output of data from any one of the above processes as well as others. The output module can be coupled to one of a plurality of output devices. These devices include, among others, a printer, a display, and a network interface card. The present system can also include other modules. Depending upon the embodiment, these and other modules can be used to implement the methods according to the present invention.

The above processes are merely illustrative. The processes can be performed using computer software or hardware or a combination of hardware and software. Any of the above processes can also be separated or be combined, depending upon the embodiment. In some cases, the processes can also be changed in order without limiting the scope of the invention claimed herein. One of ordinary skill in the art would recognize many other variations, modifications, and alternatives.

Figure 3A:
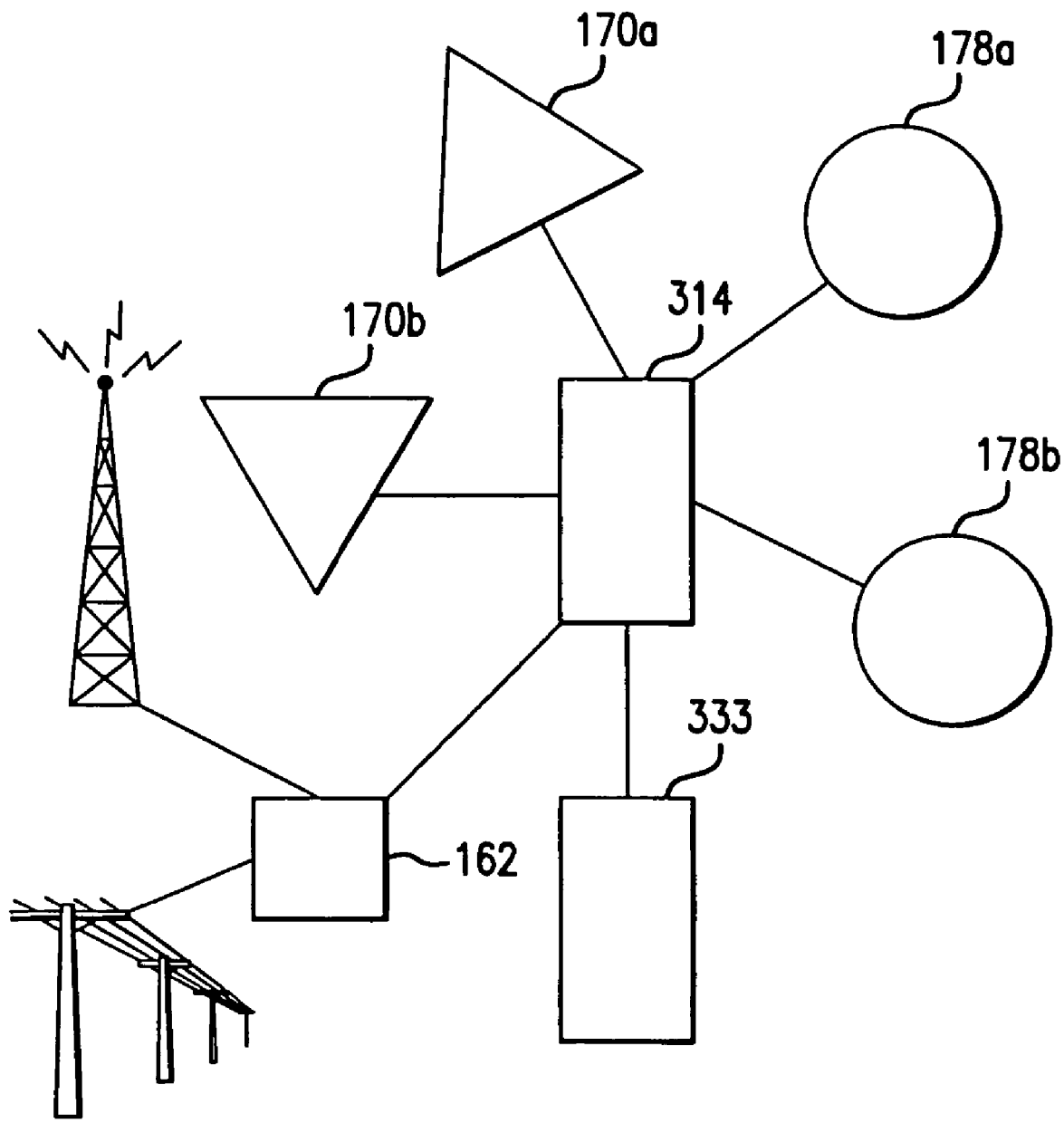
FIG. 3A is a simplified diagram showing interaction between a process manager and various analytical techniques available to monitor a process.

FIG. 3A is a simplified view of the interaction between various process control and monitoring techniques that may be employed in accordance with embodiments of the present invention. This diagram is merely an example which should not limit the scope of the claims herein. One of ordinary skill in the art would recognize many other variations, modifications, and alternatives.

As shown in FIG. 3A, server 161 receives raw process data from a plant via a net-based software interface. Once the raw data has been pre-processed, it is communicated to process manager 314. Process manager 314 may in turn access a wide variety of techniques in order to analyze and characterize the data received. Specifically, a model or algorithm may be applied to the data to identify a predicted descriptor characteristic of a state of the process. A knowledge based system may then be consulted to provide an output based upon the predicted descriptor. This output may be utilized to monitor and control the process if desired.

As shown in FIG. 3A, process manager 314 is communication with database 316 and with models 178a and 178b. Models 178a and 178b attempt to simulate the behavior of the process being controlled, thereby allowing prediction of future behavior. A library of the different categories of algorithms used to form models can be stored in data storage device 333 so as to be accessible to process manager 314. Models 178a and 178b may be constructed upon a variety of fundamental principles.

One approach is to model the process based upon data received from operation of a similar process, which may or may not be located in the same plant. This aspect of the present invention is particularly attractive given the recent trend of standardizing industrial plants, particularly for newly-constructed batch processes. Such standardized industrial plants may feature identical equipment and/or instrumentation, such that a model built to predict the behavior of one plant can be used to evaluate the health of another plant. For example, the manager of a semiconductor fabrication plant in the United States may compare operation of a particular type of tool with data from an identical tool operating in a second semiconductor fabrication plant located in Malaysia. This comparison may occur in real time, or may utilize archived data from past operation of the tool in the second semiconductor fabrication plant. Moreover, the processes or tools to be compared need not be identical, but may be similar enough that comparison between them will provide information probative of the state of the process.

Another type of model may be based upon mathematical equations derived from physical laws. Examples of such physical laws include mass balance, heat balance, energy balance, linear momentum balance, angular momentum balance, entropy and a wide variety of other physical models. The mathematical expressions representing these physical laws may be stored in data storage device 333 so as to be accessible for process analysis.

Yet another type of model is based upon algorithms such as statistical techniques. A non-exclusive, explanatory list of univariate techniques which may be utilized by the present invention is presented in TABLE 8. Another type of model is based upon multivariate statistical techniques such as principal component analysis (PCA). A non-exclusive, explanatory list of multivariate techniques that may be utilized by the present invention is presented in TABLE 10. The appended software specification also provides details regarding both model building and model monitoring utilizing several of these multivariate techniques. Still other model types may rely on a neural-based approach, examples of which include but are not limited to neural networks and genetic selection algorithms.

Other models may themselves be a collection of component models. One significant example of this model type is the System Coherence Rendering Exception Analysis for Maintenance (SCREAM) model currently being developed by the Jet Propulsion Laboratory of Pasadena, Calif. Originally developed to monitor and control satellites, SCREAM is a collection of models that conduct time-series analysis to provide intelligence for system self-analysis. A detailed listing of the techniques utilized by SCREAM is provided in TABLE 11.

One valuable aspect of SCREAM is recognition of process lifecycles. Many process dynamics exhibit a characteristic life cycle. For example, a given process may exhibit non-linear behavior in an opening stage, followed by more predictable linear or cyclical phases in a mature stage, and then conclude with a return to non-linear behavior in a concluding stage. SCREAM is especially suited not only to recognizing these expected process phases, but also to recognizing undesirable deviation from these expected phases.

Another valuable aspect of SCREAM is the ability to receive and analyze symbolic data. Symbolic data are typically data not in the form of an analog signal, and hence not readily susceptible to quantitation. Examples of symbolic data typically include labels and digital/integer inputs or outputs. Symbolic data is generally visual in nature, for example a position of a handle, a color of a smoke plume, or the—general demeanor of a patient (in the case of a medical diagnostic process).

SCREAM uses symbolic inputs to determine the state of the process. For example, positions of on/off valves may be communicated as a digital signal using '0' to represent the open position and '1' to represent the closed position, or vice versa. Based on the valve positions, SCREAM may identify the physical state of the process. As valve positions change, the process may enter a different state.

Once a model has been applied to process data to produce a predicted descriptor characteristic of process state, a knowledge based system is consulted to produce an output for process monitoring and/or control purposes. As shown in FIG. 3A, process manager 314 is communication with first and second knowledge based systems 170a and 170b.

Examples of such knowledge based systems include self-learning systems, expert systems, and logic systems, as well as so-called "fuzzy" variants of each of these types of systems. An expert system is commonly defined as a computer system programmed to imitate problem-solving procedures of a human expert. For example, in a medical system the user might enter data like the patient's symptoms, lab reports, etc., and derive from the computer a possible diagnosis. The success of an expert system depends on the quality of the data provided to the computer, and the rules the computer has been programmed with for making deductions from that data.

An expert system may be utilized in conjunction with supervised learning for purposes of process control. For example, where specific measures have previously successfully been implemented to correct a process anomaly, these measures may serve as a training set and be utilized as a basis for addressing similar future problems.

While the above discussion has proposed analysis of process data through application of a single model followed by consultation with a single knowledge based system to obtain an output, the present invention is not limited to this embodiment. For example, as shown in FIG. 3A process manager 314 is in communication with first model 178a and with a second model 178b. These models may be applied in parallel to obtain predicted descriptors. These independently generated predicted descriptors can be cross-referenced to validate the accuracy and reliability of process control.

For example, where application of a first model produces a first predicted descriptor in agreement with a second predicted descriptor, the process state assessment is confirmed and the output may reflect a degree of certainty as to the state of the process. This reflection may be in the form of the content of the output (i.e. a process fault is definitely indicated) and/or in the form of the output (i.e. a pager is activated to immediately alert the human user to a high priority issue).

However, where first and second predicted descriptors resulting from application of different models are not in agreement, a different output may be produced that reflects uncertainty in process state. This reflection may be in the form of the content of the output (i.e. a process fault may be indicated) and/or in the form of the output (i.e. only an email is sent to the human user to indicate a lower priority issue.)

As an alternative approach, a second knowledge based system may be consulted to resolve a conflict in predicted descriptors from different models. An output based upon the descriptor chosen by the second knowledge based system would then produced.

Figure 3B:
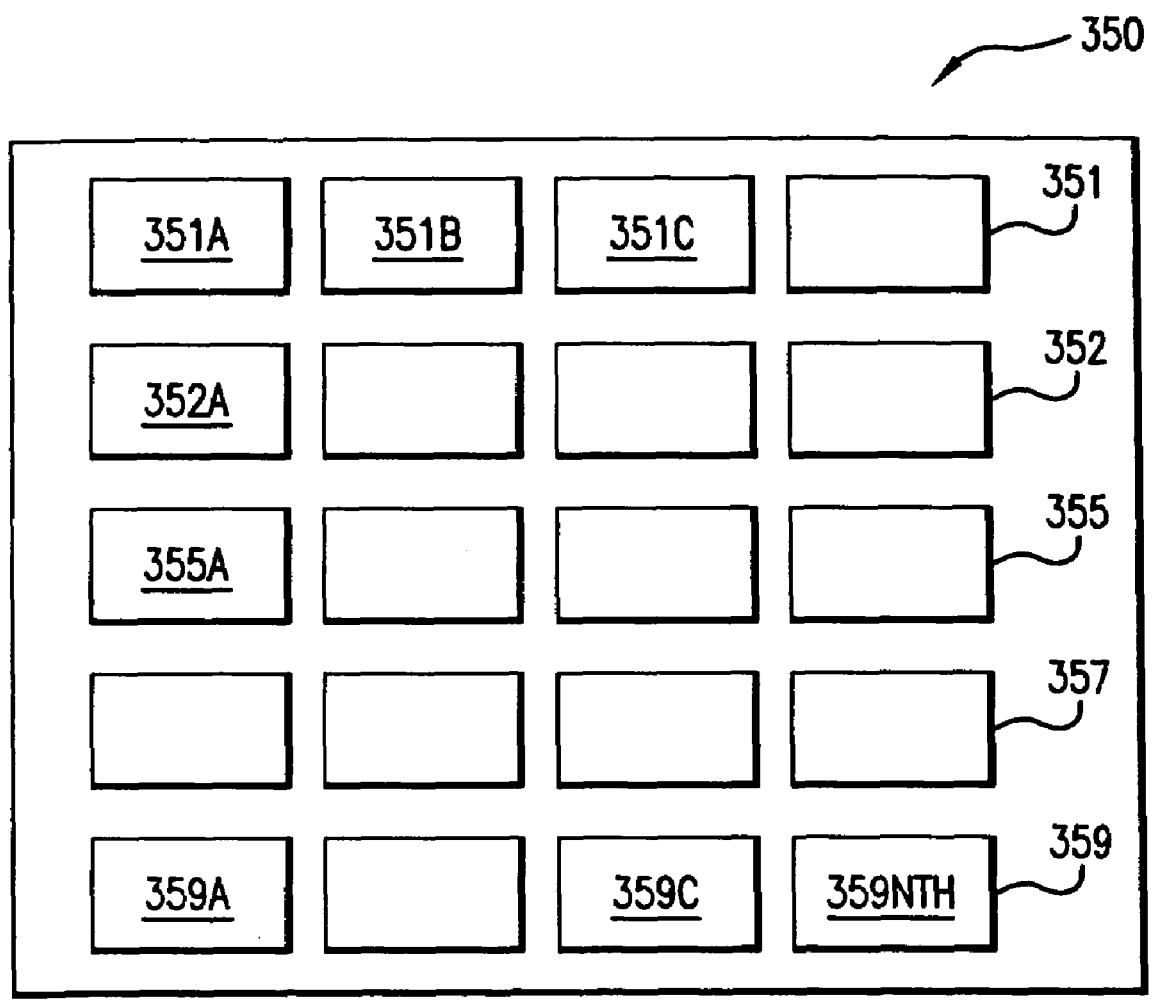
FIG. 3B is a simplified diagram of a capturing device for processing information according to an embodiment of the present invention.

A wide variety, of structures may be utilized to detect process characteristics and/or modify operational process parameters. Data may be received from a system in a variety of formats, such as text, still image, moving video images, and sound. FIG. 3B is a simplified diagram of a top-view 300 of an information capturing device according to an embodiment of the present invention. This diagram is merely an example which should not limit the scope of the claims herein. One of ordinary skill in the art would recognize many other variations, modifications, and alternatives.

As shown in FIG. 3B, the top view diagram includes an array of sensors, 351A, 351B, 301C, 359nth. The array is arranged in rows 351, 352, 355, 357, 359 and columns, which are normal to each other. Each of the sensors has an exposed surface for capturing, for example, olfactory information from fluids, e.g., liquid and/or vapor. The diagram shown is merely an example of an information capturing device. Details of such information capturing device are provided in U.S. application Ser. No. 09/518,179, which is now U.S. Pat. No. 6,422,061, commonly assigned, and hereby incorporated by reference for all purposes. Other devices can be made by companies such—as Aromascan (now Osmetech), Hewlett Packard, Alpha-MOS, or other companies.

Although the above has been described in terms of a capturing device for fluids including liquids and/or vapors, there are many other types of capturing devices. For example, other types of information capturing devices for converting an intrinsic or extrinsic characteristic to a measurable parameter can be used. These information capturing devices include, among others, pH monitors, temperature measurement devices, humidity devices, pressure sensors, flow measurement devices, chemical detectors, velocity measurement devices, weighting scales, length measurement devices, color identification, and other devices. These devices can provide an electrical output that corresponds to measurable parameters such as pH, temperature, humidity, pressure, flow, chemical types, velocity, weight, height, length, and size.

In some embodiments, the present invention can be used with at least two sensor arrays. The first array of sensors comprises at least two sensors (e.g., three, four, hundreds, thousands, millions or even billions) capable of producing a first response in the presence of a chemical stimulus. Suitable chemical stimuli capable of detection include, but are not limited to, a vapor, a gas, a liquid, a solid, an odor or mixtures thereof. This aspect of the device comprises an electronic nose. Suitable sensors comprising the first array of sensors include, but are not limited to conducting/non-conducting regions sensor, a SAW sensor, a quartz microbalance sensor, a conductive composite sensor, a chemiresistor, a metal oxide gas sensor, an organic gas sensor, a MOSFET, a piezoelectric device, an infrared sensor, a sintered metal oxide sensor, a Pd-gate MOSFET, a metal FET structure, a electrochemical cell, a conducting polymer sensor, a catalytic gas sensor, an organic semiconducting gas sensor, a solid, electrolyte gas sensors, and a piezoelectric quartz crystal sensor. It will be apparent to those of skill in the art that the electronic, nose array can be comprises of combinations of the foregoing sensors. A second sensor can be a single sensor or an array of sensors capable of producing a second response in the presence of physical stimuli. The physical detection sensors detect physical stimuli. Suitable physical stimuli include, but are not limited to, thermal stimuli, radiation stimuli, mechanical stimuli, pressure, visual, magnetic stimuli, and electrical stimuli.

Thermal sensors can detect stimuli which include, but are not limited to, temperature, heat, heat flow, entropy, heat capacity, etc. Radiation sensors can detect stimuli that include, but are not limited to, gamma rays, X-rays, ultra-violet rays, visible, infrared, microwaves and radio waves. Mechanical sensors can detect stimuli which include, but are not limited to, displacement, velocity, acceleration, force, torque, pressure, mass, flow, acoustic wavelength, and amplitude. Magnetic sensors can detect stimuli that include, but are not limited to, magnetic field, flux, magnetic moment, magnetization, and magnetic permeability. Electrical sensors can detect stimuli which include, but are not limited to, charge, current, voltage, resistance, conductance, capacitance, inductance, dielectric permittivity, polarization and frequency.

In certain embodiments, thermal sensors are suitable for use in the present invention that include, but are not limited to, thermocouples, such as a semiconducting thermocouples, noise thermometry, thermoswitches, thermistors, metal thermoresistors, semiconducting thermoresistors, thermodiodes, thermotransistors, calorimeters, thermometers, indicators, and fiber optics.

In other embodiments, various radiation sensors suitable for use in the present invention include, but are not limited to, nuclear radiation microsensors, such as scintillation counters and solid state detectors, ultra-violet, visible and near infrared radiation microsensors, such as photoconductive cells, photodiodes, phototransistors, infrared radiation microsensors, such as photoconductive IR sensors and pyroelectric sensors.

In certain other embodiments, various mechanical sensors are suitable for use in the present invention and include, but are not limited to, displacement microsensors, capacitive and inductive displacement sensors, optical displacement sensors, ultrasonic displacement sensors, pyroelectric, velocity and flow microsensors, transistor flow microsensors, acceleration microsensors, piezoresistive microaccelerometers, force, pressure and strain microsensors, and piezoelectric crystal sensors.

In certain other embodiments, various chemical or biochemical sensors are suitable for use in the present invention and include, but are not limited to, metal oxide gas sensors, such as tin oxide gas sensors, organic gas sensors, chemocapacitors, chemodiodes, such as inorganic Schottky device, metal oxide field effect transistor (MOSFET), piezoelectric devices, ion selective FET for pH sensors, polymeric humidity sensors, electrochemical cell sensors, pellistors gas sensors, piezoelectric or surface acoustical wave sensors, infrared sensors, surface plasmon sensors, and fiber optical sensors.

Various other sensors suitable for use in the present invention include, but are not limited to, sintered metal oxide sensors, phthalocyanine sensors, membranes, Pd-gate MOSFET, electrochemical cells, conducting polymer sensors, lipid coating sensors and metal FET structures. In certain preferred embodiments, the sensors include, but are not limited to, metal oxide sensors such as a Tuguchi gas sensors, catalytic gas sensors, organic semiconducting gas sensors, solid electrolyte gas sensors, piezoelectric quartz crystal sensors, fiber optic probes, a micro-electro-mechanical system device, a micro-opto-electro-mechanical system device and Langmuir-Blodgett films.

Additionally, the above description in terms of specific hardware is merely for illustration. It would be recognized that the functionality of the hardware be combined or even separated with hardware elements and/or software. The functionality can also be made in the form of software, which can be predominantly software or a combination of hardware and software. One of ordinary skill in the art would recognize many variations, alternatives, and modifications. Details of methods according to the present invention are provided below.

A method of controlling a process according to one embodiment of the present invention may be briefly outlined as follows:
1. acquire initial data from a source at a first time;
2. convert the initial data into electronic form;
3. load the initial data into a first memory;
4. retrieve the initial data from the first memory;
5. acquire subsequent data from the source at a second time;
6. assign a first descriptor to the initial data and a second descriptor to the subsequent data;
7. construct a model based on the initial data and the first descriptor and on the subsequent data and the second descriptor;
8. store the model in a second memory;
9. acquire data from a process;
10. apply the model to the data to identify a predicted descriptor characteristic of a state of the process; and
11. consult a knowledge based system and provide an output based upon the predicted descriptor.

The above sequence of steps is merely an example of a way to monitor a process according to one embodiment of the present method and system. Details of these steps are provided below, but it is to be understood that one of ordinary skill in the art would recognize many other variations, modifications, and alternatives.

The first step listed above is acquisition of initial data from a source at a first time. While data is to be acquired from at least one source, in many embodiments data will be acquired from a plurality of sources in contact with the process, for example the field mounted devices illustrated and described in conjunction with FIG. 1A.

The second, third, and fourth listed steps are respectively, conversion of the initial data into electronic form, storage of the electronic data, and retrieval of the stored data. Structures for performing these steps are well known in the art.

The fifth step is to acquire subsequent data from the source at a second time. This step provides the system with exemplary information about changes in the process between the first time and the second time. While in its most general form the present invention samples data from two time periods, in practice it is expected that data from many times will be acquired.

The sixth step is to assign a first descriptor to the initial data and a second descriptor to the subsequent data. The descriptor characterizes the state of the process in relation to the data. Examples of possible descriptors include "normal process operation," "process start-up," "process shutdown," "over heat condition," etc.

The seventh step is to construct a model of process behavior based upon the initial and subsequent data and the first and second descriptors. While at least one model is constructed, in practical implementation of the present invention many types of models based upon different principles may be constructed utilizing approaches such as univariate statistical techniques, time series analysis, and multivariate statistical techniques such as PCA, CDA, and PLS, as are known to one of ordinary skill in the art.

Once the model has been constructed, the eighth step is to store the model in a second memory. In the ninth step, the stored model is applied to a set of data acquired from the process. This data set can may represent real time parameters of the process that is to be monitored and/or controlled.

In the tenth step, the model is applied to the third data set to produce a predicted descriptor that characterizes the state of the process. This predicted descriptor is output by the model based upon the construction of the model, utilizing the initial data, the subsequent data, the first descriptor, and the second descriptor.

Based upon the predicted descriptor predicted by application of the model, in the eleventh and final step a knowledge based system is referenced and an output is provided. This output may be provided to an internal entity such as a process control device, or to an external entity such as associated s supply chain management system (SCM), or to both internal and external systems. For example, where the third descriptor predicted by the model indicates failure of a pump, an output in the form of a purchase order with the relevant replacement pump part number could be communicated to the SCM. Alternatively or in conjunction with notifying an SCM system, the output could be directed to an entity such as a pager or voicemail, thereby communicating the state of the process to a human operator for monitoring and/or possible intervention.

The above listed steps represent only a specific example of a method for monitoring and controlling a process in accordance with an embodiment of the present invention. One of ordinary skill in the art would recognize many variations, alternatives, and modifications.

For example, many models useful for predicting process behavior may be created utilizing univariate and multivariate statistical techniques applied to previously collected data. Alternatively however, useful models of process behavior may also be constructed from mathematical expressions of physical or natural laws. Where such a physical model is employed, rules implicit in the model may govern predicted behavior of the system over time. Prior collection of data may therefore not be necessary to create the model, and the model may be directly applied to data acquired from the process.

In yet another possible embodiment, data from the process may be—analyzed in parallel by more than one model. In embodiments of the present invention where multiple models are being used to predict process behavior, the descriptor output by each model may be compared. A difference in the descriptor predicted by the various models could be resolved through application of a knowledge based system such as an expert system.

A method using digital information for populating a database for identification or classification purposes according to the present invention may be briefly outlined as follows:

1. Acquire data, where the data are for one or more substances, each of the substances having a plurality of distinct characteristics;
2. Convert data into electronic form;
3. Provide data in electronic form (e.g., text, normalized data from an array of sensors) for classification or identification;
4. Load the data into a first memory by a computing device;
5. Retrieve the data from the first memory;
6. Remove first noise levels from the data using one or more filters;
7. Correct data to a base line for one or more variables such as drift, temperature, humidity, etc.;
8. Normalize data using, a base line;
9. Reject one or more of the plurality of distinct characteristics from the data;
10. Perform one or more pattern recognition methods on the data;
11. Classify the one or more substances based upon the pattern recognition methods to form multiple classes that each corresponds to a different substance;
12. Determine optimized (or best general fit) pattern recognition method via cross validation process;
13 Store the classified substances into a second memory for further analysis; and
14. Perform other steps, as desirable.

The above sequence of steps is merely an example of a way to teach or train the present method and system. The present example takes more than one different substance, where each substance has a plurality of characteristics, which are capable of being detected by sensors. Each of these characteristics are measured, and then fed into the present method to create a training set. The method includes a variety of data processing techniques to provide the training set. Depending upon the embodiment, some of the steps may be separated even further or combined. Details of these steps are provided below according to Figs.

Figure 4A:
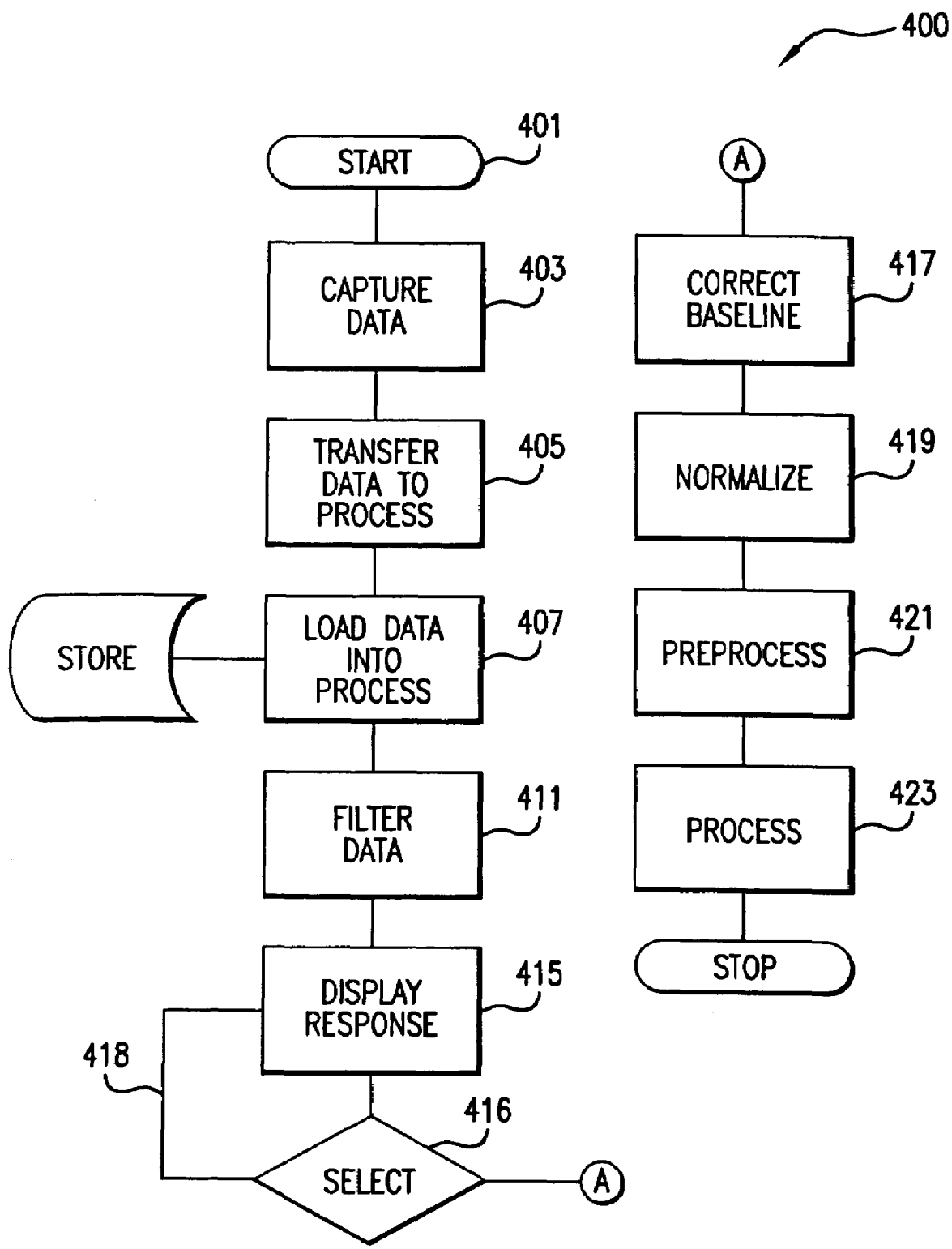
FIGS. 4A to 4E are simplified diagrams of methods according to embodiments of the present invention.
Figure 4B:
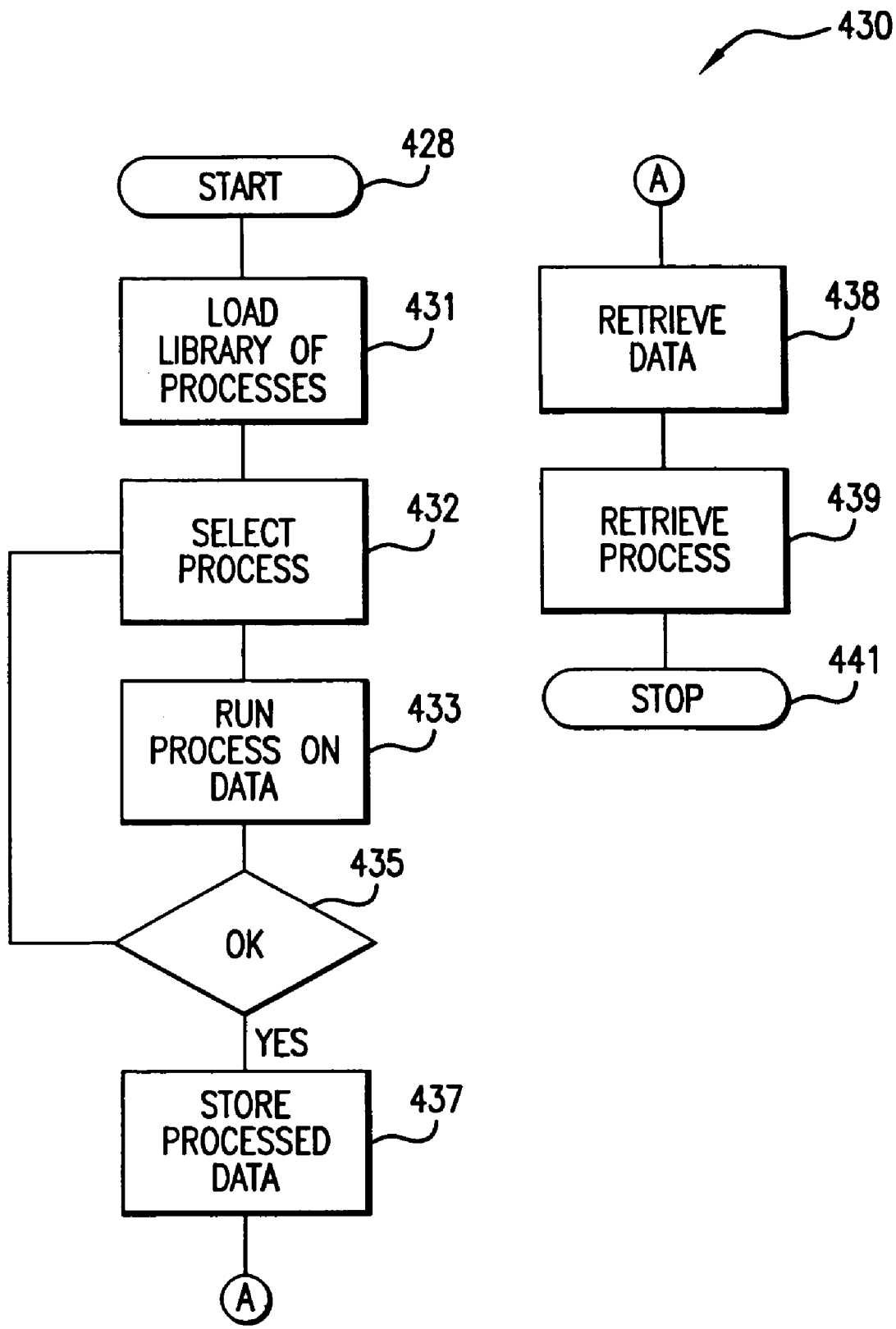
Figure 4C:
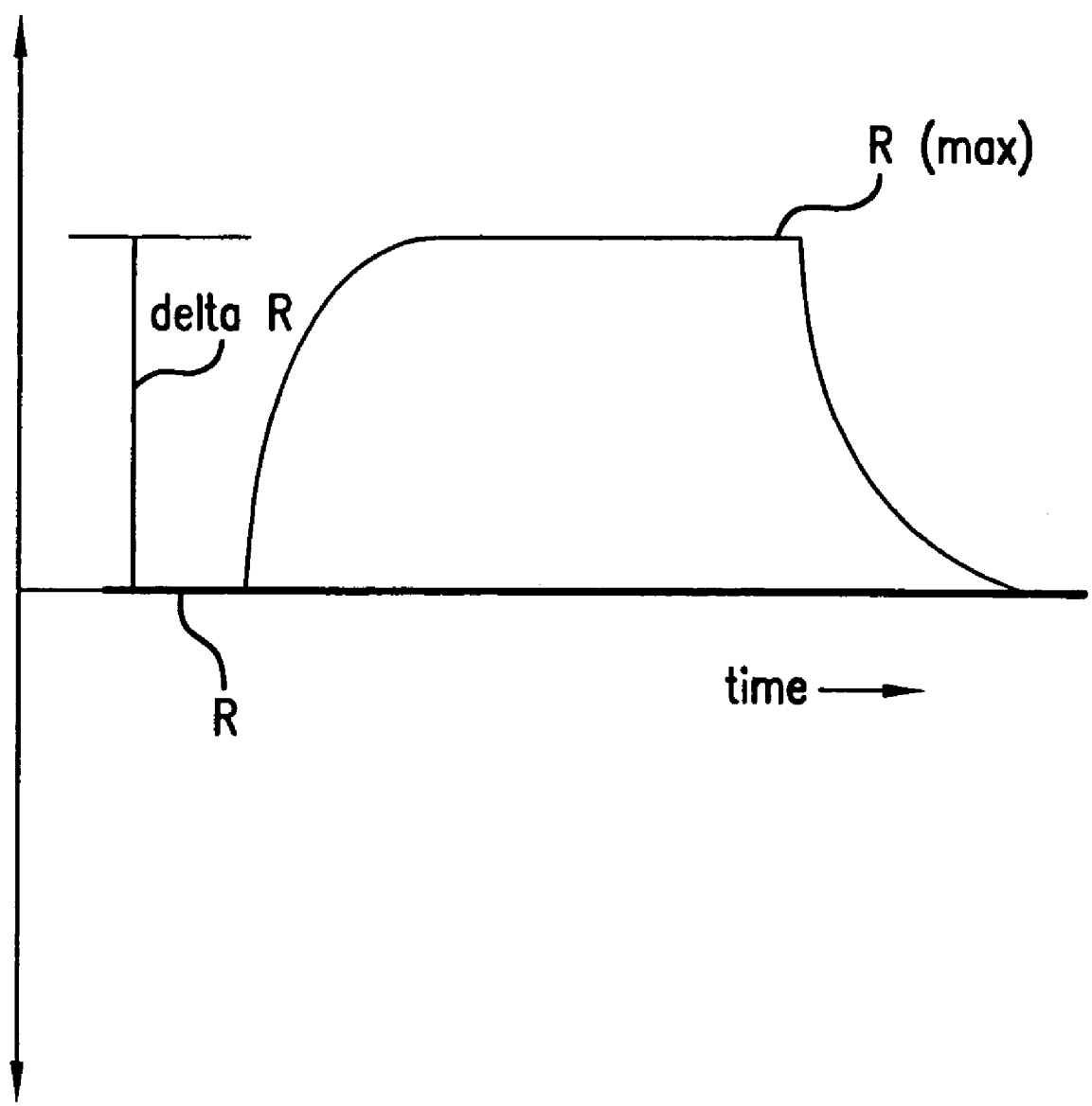

FIGS. 4A to 4C are simplified diagrams of methods 400 according to embodiments of the present-invention. These diagrams are merely examples which should not limit the scope of the claims herein. One of ordinary skill in the art would recognize many other variations, modifications, and alternatives. As shown, the present method begins at start, step 401. The method then captures data (step 403) from a data acquisition device. The data acquisition device can be any suitable device for capturing either intrinsic or extrinsic information from a substance. As merely an example, the present method uses a data acquisition device for capturing olfactory information. The device has a plurality of sensors, which convert a scent or olfaction print into an artificial or electronic print. In a specific embodiment, such data acquisition device is disclosed in WO 99/47905, commonly assigned and hereby incorporated by reference for all purposes. Those of skill in the art will know of other devices including other electronic noses suitable for use in the present invention. In a specific embodiment, the present invention captures olfactory information from a plurality of different liquids, e.g., isopropyl alcohol, water, toluene. The olfactory information from each of the different liquids is characterized by a plurality of measurable characteristics, which are acquired by the acquisition device. Each different liquid including the plurality of measurable characteristics can be converted into an electronic data form for use according to the present invention. Some of these characteristics were previously described, but can also include others.

Next, the method transfers the electronic data, now in electronic form, to a computer aided process (step 405). The computer aided process may be automatic and/or semiautomatic depending upon the application. The computer aided process can store the data into memory, which is coupled to a processor. When the data is ready for use, the data is loaded into the process, step 407. In embodiments where the data has been stored, they are retrieved and then loaded into the process. Preferably, the data can be loaded onto workspace to a text file or loaded into a spread sheet for analysis. Here, the data can be loaded continuously and automatically, or be loaded manually, or be loaded and monitored continuously to provide real time analysis.

The method filters the data (step 411) to remove any imperfections. As merely an example, data from the present data acquisition device are often accompanied with glitches, high frequency noise, and the like. Here, the signal to noise ratio is often an important consideration for pattern recognition especially when concentrations of analytes are low, exceedingly high, or not within a predefined range of windows according to some embodiments. In such cases, it is desirable to boost the signal to noise ratio using the present digital filtering technology. Examples of such filtering technology includes, but is not limited to a Zero Phase-Filter, an Adaptive Exponential Moving Average Filter, and a Savitzky-Golay Filter, which will be described in more detail below.

Optionally, the filtered responses can be displayed, step 415. Here, the present method performs more than one of the filtering techniques to determine which one provides better results. By way of the present method, it is possible to view the detail of data preprocessing. The method displays outputs (step 415) for each of the sensors, where signal to noise levels can be visually examined. Alternatively, analytical techniques can be used to determine which of the filters worked best. Each of the filters are used on the data, step 416 via branch 418. Once the desired filter has been selected, the present method goes to the next step.

The method performs a baseline correction step (step 417). Depending upon the embodiment, there can be many different ways to implement a baseline correction method. Here, the baseline correction method finds response peaks, calculates $\Delta R/R$, and plots the $\Delta R/R$ verses time stamps, where the data have been captured. It also calculates maximum $\Delta R/R$ and maximum slope of $\Delta R/R$ for further processing. Baseline drift is often corrected by way of the present step. Once baseline drift has been corrected, the present method undergoes a normalization process, although other processes can also be used. Here, $\Delta R/R$ can be determined using one of a plurality of methods, which are known, if any, or developed according to the present invention.

As merely an example, FIG. 4C illustrates a simplified plot of a signal and various components used in the calculation of ΔR/R, which can be used depending upon the embodiment. This diagram is merely an illustration, which should not limit the scope of the claims herein. One of ordinary skill in the art would recognize many other variations, modifications, and alternatives. As shown, the diagram shows a pulse, which is plotted along a time axis, which intersects a voltage, for example. The diagram includes, a ΔR (i.e., delta R), which is defined between R and R(max). As merely an example, ΔR/R is defined by the following expression:

$$\Delta R/R = (R(\max) - R(0))/R$$

where

ΔR is defined by the average difference between a base line value R(0) and

R(max);

R(max) is defined by a maximum value of R;

R(0) is defined by an initial value of R; and

R is defined as a variable or electrical measurement of resistance from a sensor, for example.

This expression is merely an example, the term ΔR/R could be defined by a variety of other relationships. Here, ΔR/R has been selected in a manner to provide an improved signal to noise ratio for the signals from the sensor, for example. There can be many other relationships that define ΔR/R, which may be a relative relation in another manner. Alternatively, ΔR/R could be an absolute relationship or a combination of a relative relationship and an absolute relationship. Of course, one of ordinary skill in the art would provide many other variations, alternatives, and modifications.

As noted, the method includes a normalization step, step 419. In some embodiments, normalization is a row wise operation. Here, the method uses a so-called area normalization. After such normalization method, the sum of data along each row is unity. Vector length normalization is also used, where the sum of data squared of each row equals unity.

As shown by step 421, the method may next perform certain preprocessing techniques. Preprocessing may be employed to eliminate the effect on the data of inclusion of the mean value in data analysis, or of the use of particular units of measurement, or of large differences in the scale of the different data types received. Examples of such preprocessing techniques include mean-centering and auto-scaling. Preprocessing techniques utilized for other purposes include for example, smoothing, outlier rejection, drift monitoring, and others. Some of these techniques will be described later. Once preprocessing has been completed, the method performs a detailed processing technique.

Next, the method performs a main process for classifying each of the substances according to each of their characteristics, step 423. Here, the present method performs a pattern recognition process, such as the one illustrated by the simplified diagram 430 in FIG. 4B. This diagram is merely an example, which should not limit the scope of the claims herein. One of ordinary skill in the art would recognize many other variations, modifications, and alternatives.

As shown, the method 430 begins with start, step 428. The method queries a library, including a plurality of pattern recognition algorithms, and loads (step 431) one or more of the algorithms in memory to be used. The method selects the one algorithm, step 432, and runs the data through the algorithm, step 433. In a specific embodiment, the pattern recognition process uses more than one algorithms, which are known, are presently being developed, or will be developed in the future. The process is used to find weighting factors based upon descriptors for each of the characteristics to ultimately determine an identifiable pattern to describe the activity of a process. The present method runs the data, which have been preprocessed, through each of the algorithms.

PCA Principal Components Analysis
HCA Hierarchical Cluster Analysis
KNN CV K Nearest Neighbor Cross Validation
KNN Prd K Nearest Neighbor Prediction
SLMCA CV SIMCA Cross Validation
SIMCA Prd SIMCA Prediction
Canon CV Canonical Discriminant Analysis and Cross Validation
Canon Prd Canonical Discriminant Prediction
Fisher CV Fisher Linear Discriminant Analysis and Cross Validation
Fisher Prd Fisher Linear Discriminant Prediction
SCREAM System Coherence Rendering Exception Analysis for Maintenance PCA and HCA, are unsupervised learning methods. They can be used for investigating training data and finding the answers of:

I. How many principal components will cover the most of variances?

II. How many principal components you have to choose?

III. How do the loading plots look?

IV. How do the score plots look?

V. How are the scores separated among the classes?

VI. How are the clusters grouped in their classes?

VII. How much are the distances among the clusters?

The other four algorithms, KNN CV, SIMCA CV, Canon CV, and Fisher CV, are supervised learning methods used when the goal is to construct models to be used to predict the future behavior of a process. These algorithms will perform cross validation, find the optimum number of parameters, and build models. SCREAM is actually a combination of several techniques employing time series analysis.

Once the data has been run through the first algorithm, for example, the method repeats through a branch (step 435) to step 432 to another process. This process is repeated until one or more of the algorithms have been used to analyze the data. The process is repeated to try to find a desirable algorithm that provides good results with a specific preprocessing technique used to prepare the data. If all of the desirable algorithms have been used, the method stores (or has previously stored) (step 437) each of the results of the processes on the data in memory.

In a specific embodiment, the present invention provides a cross-validation technique. Here, an auto (or automatic) cross-validation algorithm can be implemented. The present technique uses cross-validation, which is an operation process used to validate models built with chemometrics algorithms based on training data set. During the process, the training data set is divided into calibration and validation subsets. A model is built with the calibration subset and is used to predict the validation subset. The training data set can be divided into calibration and validation subsets called "leave-one-out," i.e., take one sample out from each class to build a validation subset and use the rest samples to build a calibration subset. This process can be repeated using different subset until every sample in the training set has been included in one validation subset. The predicted results are stored in an array. Then, the correct prediction percentages (CPP) are calculated, and are used to validate the performance of the model.

According to the present method, a cross-validation with one training data set can be applied to generally all the models built with different algorithms, such as K-Nearest Neighbor (KNN), SIMCA, Canonical Discriminant Analysis, Fisher Linear Discriminant Analysis, and SCREAM respectively. The results of correct prediction percentages (CPP) show the performance differences with the same training data set but with different algorithms. Therefore, one can pickup the best algorithm according to the embodiment.

During the model building, there are several parameters and options to choice. To build the best model with one algorithm, cross-validation is also used to find the optimum parameters and options. For example, in the process of building a KNN model, cross-validation is used to validate the models built with different number of K, different scaling options, e.g., mean-centering or auto-scaling, and other options, e.g., with PCA or without PCA, to find out the optimum combination of K and other options. In a preferred embodiment, auto-cross-validation can be implemented using a single push-button or two push buttons for ease in use. It will automatically run the processes mentioned above over all the (or any selected) algorithms with the training data set to find out the optimum combination of parameters, scaling options and algorithms.

The method also performs additional steps of retrieving data, step 438, and retrieving the process or algorithm, step 439. As noted, each of the processes can form a descriptor for each sample in the training set. Each of these descriptors can be stored and retrieved. Here, the method stores the raw data, the preprocessed data, the descriptors, and the algorithm used for the method for each algorithm used according to the present invention. The method stops, step 441.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

An alternative method according to the present invention is briefly outlined as follows:
1. Acquire raw data in voltages;
2. Check base line voltages;
3. Filter;
4. Calculate ΔR/R
5. Determine Training set?
6. If yes, find samples (may repeat process);
7. Determine outlier?;
8. If yes, remove bad data using, for example PCA;
9. Find important sensors using importance index (individual filtering process);
10. Normalize;
11. Find appropriate pattering recognition process;
12. Run each pattern recognition process;
13. Display (optional);
14. Find best fit out of each pattern recognition process;
15. Compare against confidence factor (if less than a certain number, this does not work);
16. Perform other steps, as required.

The above sequence of steps is merely an example of a way to teach or train the present method and system according to an alternative embodiment. The present example takes more than one different substance, where each substance has a plurality of characteristics, which are capable of being detected by sensors or other sensing devices. Each of these characteristics are measured, and then fed into the present method to create a training set. The method includes a variety of data processing techniques to provide the training set. Depending upon the embodiment, some of the steps may be separated even further or combined. Details of these steps are provided below according to Figs.

Figure 4D:
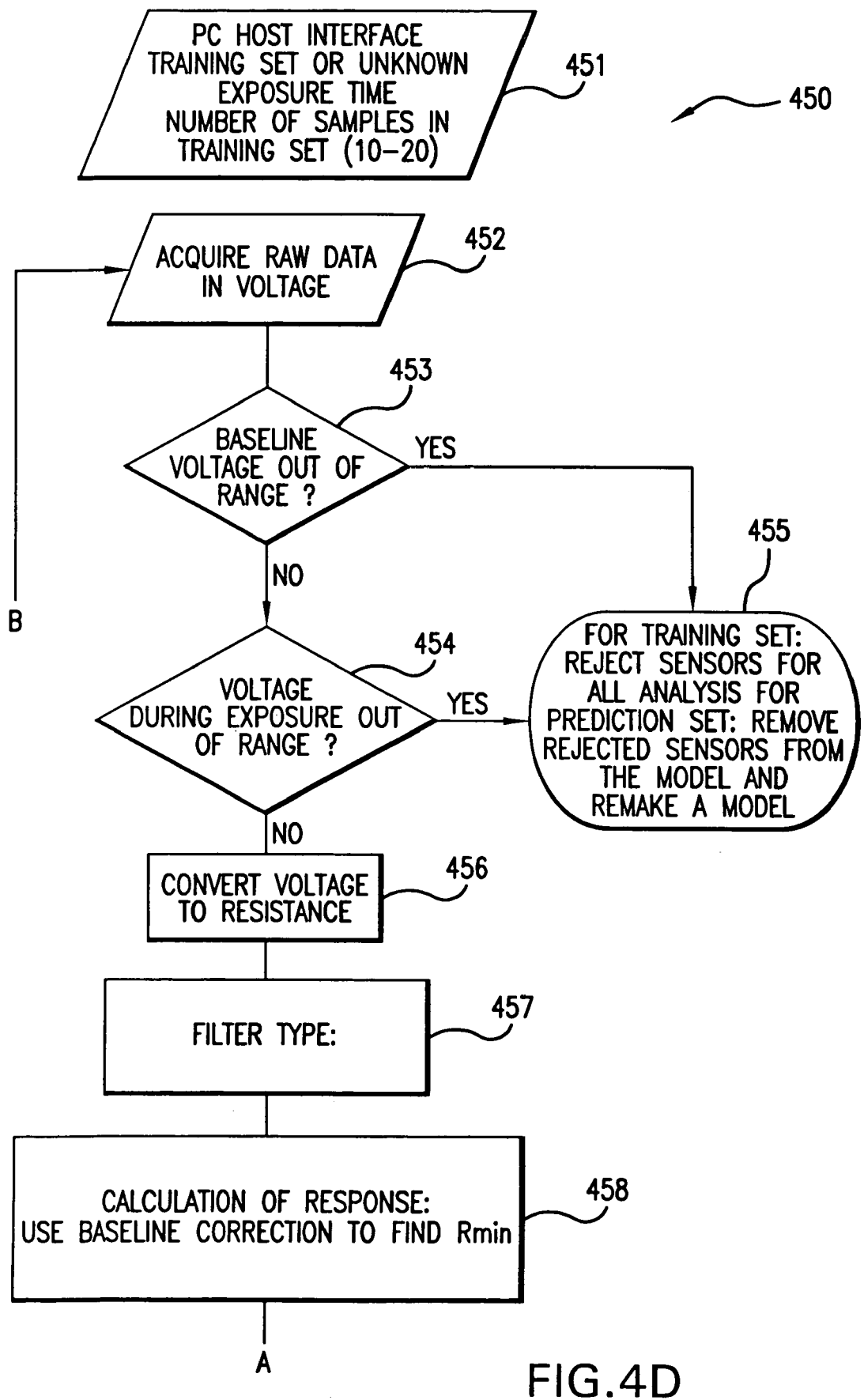
Figure 4E:
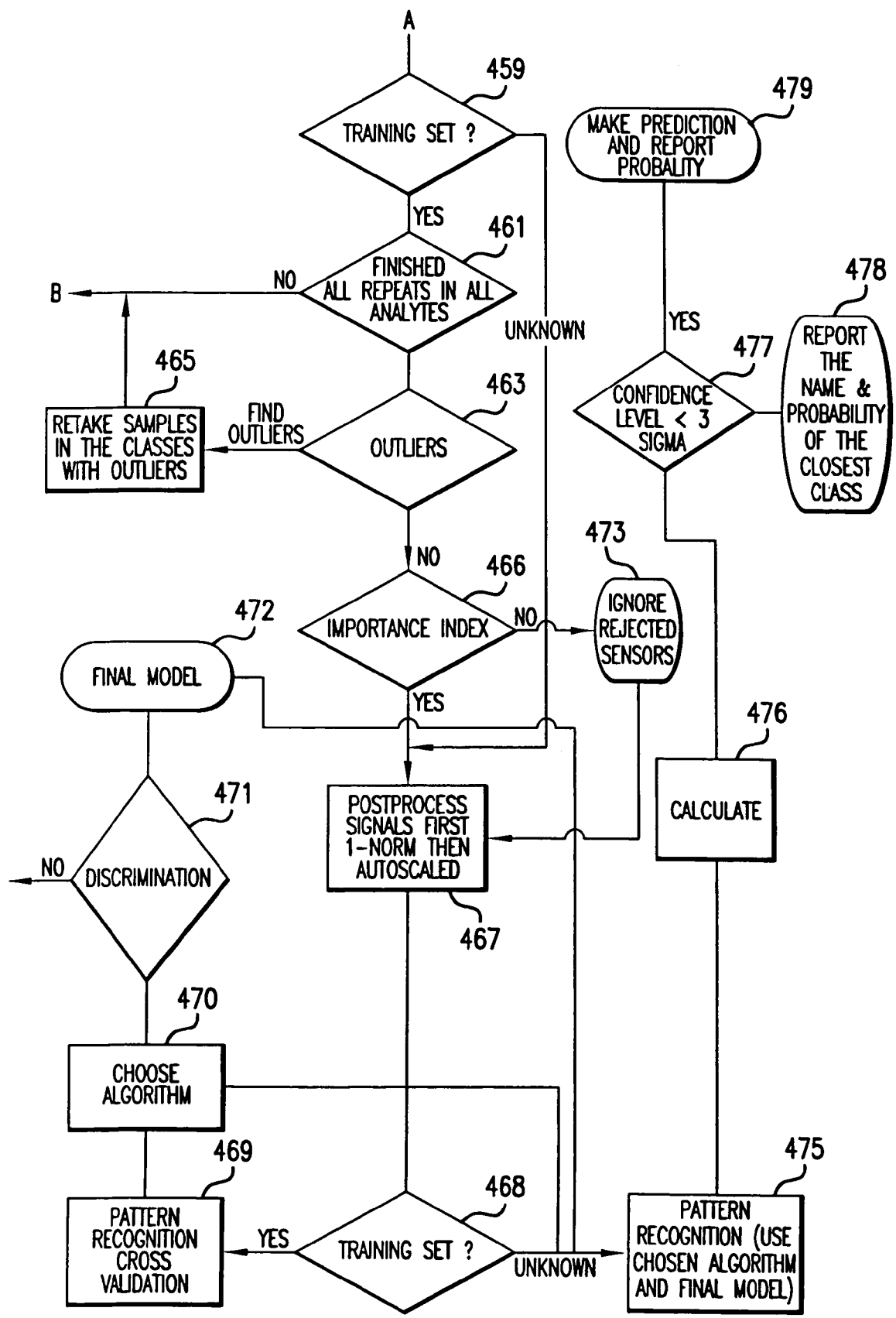

FIGS. 4D and 4E are simplified of methods 450 according to embodiments of the present invention. These diagrams are merely examples which should not limit the scope of the claims herein. One of ordinary skill in the art would recognize many other variations, modifications, and alternatives. As shown, the present method begins at step 451. Here, the method begins at a personal computer host interface, where the method provides a training set of samples (which are each defined as a different class of material) to be analyzed or an unknown sample (once the training set has been processed). The training set can be derived from a plurality of different samples of fluids (or other substances or information). The samples can range in number from more than one to more than five or more than ten or more than twenty in some applications. The present method processes one sample at a time through the method that loops back to step 451 via the branch indicated by reference letter B, for example, from step 461, which will be described in more detail below.

In a specific embodiment, the method has captured data about the plurality of samples from a data acquisition device. Here, each of the samples should form a distinct class of data according to the present invention. The data acquisition device can be any suitable device for capturing either intrinsic or extrinsic information from a substance. As merely an example, the present method uses a data acquisition device for capturing olfactory information. The device has a plurality of sensors or sensing devices, which convert a scent or olfaction print into an artificial or electronic print. In a specific embodiment, such data acquisition device is disclosed in WO 99/47905, commonly assigned and hereby incorporated by reference for all purposes. Those of skill in the art will know of other devices including other electronic noses suitable for use in the present invention. In a specific embodiment, the present invention captures olfactory information from a plurality of different liquids, e.g., isopropyl alcohol, water, toluene. The olfactory information from each of the different liquids is characterized by a plurality of measurable characteristics, which are acquired by the acquisition device. Each different liquid including the plurality of measurable characteristics can be converted into an electronic data form for use according to the present invention.

The method acquires the raw data from the sample in the training set often as a voltage measurement, step 452. The voltage measurement is often plotted as a function of time. In other embodiments, there are many other ways to provide the raw data. For example, the raw data can be supplied as a resistance, a capacitance, an inductance, a binary characteristic, a quantized characteristic, a range value or values, and the like. Of course, the type of raw data used depends highly upon the application. In some embodiments, the raw data can be measured multiple times, where an average is calculated. The average can be a time weighted value, a mathematical weighted value, and others.

Next, the method checks the base line voltages from the plurality of sensing devices used to capture information from the sample, as shown in step 453. The method can perform any of the base line correction methods described herein, as well as others. Additionally, the method can merely check to see if each of the sensing devices has an output voltage within a predetermined range. If each of the sensing devices has an output voltage within a predetermined range, each of the sensing devices has a base line voltage that is not out of range. Here, the method continues to the next step. Alternatively, the method goes to step 455, which rejects the sensing device that is outside of the predetermined voltage range, and then continues to the next step. In some embodiments, the sensing device that is outside of the range is a faulty or bad sensor, which should not be used for training or analysis purposes.

The method then determines if the measured voltage for each sensing device is within a predetermined range, step 454. The voltage for each sensor is provided by exposing the sensor to the sample. The exposure can be made for a predetermined amount of time. Additionally, the exposure can be repeated and averaged, either by time or geometrically. The voltage is compared with a range or set of ranges, which often characterize the sensor for the exposure. If the exposed sensing device is outside of its predetermined range for the exposure, the method can reject (step 455) the sensor and proceed to the next step. The rejected sensor may be faulty or bad. Alternatively, if each of the sensing devices in, for example, in the array of sensors is within a respective predetermined range, then the method continues to the next step, which will be discussed below.

The method can convert the voltage into a resistance value, step 456. Alternatively, the voltage can be converted to a capacitance, an inductance, an impedance, or other measurable characteristic. In some embodiments, the voltage is merely converted using a predetermined relationship for each of the sensing devices. Alternatively, there may be a look up table, which correlates voltages with resistances. Still further, there can be a mathematical relationship that correlates the voltage with the resistance.

The method the runs the data through one or more filters, step 457. The method filters the data to remove any imperfections, noise, etc. As merely an example, data from the present data acquisition device are often accompanied with glitches, high frequency noise, and the like. Here, the signal to noise ratio is often an important consideration for pattern recognition especially when concentrations of analytes are low, exceedingly high, or not within a predefined range of windows according to some embodiments. In such cases, it is desirable to boost the signal to noise ratio using the present digital filtering technology. Examples of such filtering technology includes, but is not limited to a Zero Phase Filter, an Adaptive Exponential Moving Average Filter, and a Savitzky-Golay Filter, which will be described in more detail below.

The method runs a response on the data, step 458. Here, the method may perform a baseline correction step. Depending upon the embodiment, there can be many different ways to implement a baseline correction method. Here, the baseline correction method finds response peaks, calculates $\Delta R/R$, and plots the $\Delta R/R$ verses time stamps, where the data have been captured. It also calculates maximum $\Delta R/R$ and maximum slope of $\Delta R/R$ for further processing. Baseline drift is often corrected by way of the present step. Once baseline drift has been corrected, the present method undergoes a normalization process, although other processes can also be used. Here, $\Delta R/R$ can be determined using one of a plurality of methods, which are known, if any, or developed according to the present invention.

In the present embodiment, the method is for analyzing a training set of substances, step 459 (in FIG. 4E). The method then continues to step 461. Alternatively, the method skips to step 467, which will be described in one or more of the copending applications. If there is another substances in the training set to be analyzed (step 459), the method returns to step 452 via branch B, as noted above. Here, the method continues until each of the substances in the training set has been run through the process in the present preprocessing steps. The other samples will run through generally each of the above steps, as well as others, in some embodiments.

Next, the method goes to step 463. This step determines if any of the data has an outlier. In the present embodiment, the outlier is a data point, which does not provide any meaningful information to the method. Here, the outlier can be a data point which is outside of the noise level, where no conclusions can be made. The outlier is often thought of a data point that is tossed out due to statistical deviations. That is, lowest and highest data points can be considered as outliers in some embodiments. If outliers are found, step 463, the method can retake (step 465) samples, which are exposed to the sensing devices, that have the outliers. The samples that are retaken loop back through the process via the branch indicated by reference letter B. Outliers can be removed from the data in some embodiments.

The method also can uncover important sensors using an importance index (individual filtering process). Here, the method identifies which sensors do not provide any significant information by comparing a like sensor output with a like sensor output for each of the samples in the training set. If certain sensors are determined to have little influence in the results, these sensors are ignored (step 473) and then continues to the next step, as shown in the Fig. Alternatively, if generally all sensors are determined to have some significance, the method continues to step 467.

Next, the method performs post processing procedures (step 467), as defined herein. The post processing procedures include, for example, a normalization step. In a specific embodiment, the normalization step scales the data to one or other reference value and then autoscales the data so that each sample value is referenced against each other. If the data is for the training step, step 468, the method continues to a pattern recognition cross-validation process, step 469, the cross validation process is used with step 470.

The pattern recognition process uses more than one algorithms, which are known, are presently being developed, or will be developed in the future. The process is used to find weighting factors for each of the characteristics to ultimately determine an identifiable pattern to uniquely identify each of the substances. The present method runs the data, which have been preprocessed, through each of the algorithms.

PCA Principal Components Analysis
HCA Hierarchical Cluster Analysis
KNN CV K Nearest Neighbor Cross Validation
KNN Prd K Nearest Neighbor Prediction
SIMCA CV SIMCA Cross Validation
SIMCA Prd SIMCA Prediction
Canon CV Canonical Discriminant Analysis and Cross Validation
Canon Prd Canonical Discriminant Prediction
Fisher CV Fisher Linear Discriminant Analysis and Cross Validation
Fisher Prd Fisher Linear Discriminant Prediction
SCREAM System Coherence Rendering Exception Analysis for Maintenance PCA and HCA, are unsupervised learning methods. They are used for investigating training data and finding the answers of:

I. How many principal components will cover the most of variances?
II. How many principal components you have to choose?
III. How do—the loading plots look?
IV. How do the score plots look?
V. How are the scores separated among the classes?
VI. How are the clusters grouped in their classes?
VII. How much are the-distances among the clusters?

The other four algorithms, KNN CV, SIMCA CV, Canon CV, and Fisher CV, are supervised learning methods used when the goal is to construct models to be used to predict the future behavior of a process. These algorithms will do cross validation, find the optimum number of parameters, and build models. SCREAM is a combination of several techniques employing time series analysis.

In a specific embodiment, the present invention provides a cross-validation technique. Here, an auto (or automatic) cross-validation algorithm can be implemented. The present technique uses cross-validation, which is an operation process used to validate models built with chemometrics algorithms based on training data set. During the process, the training data set is divided into calibration and validation subsets. A model is built with the calibration subset and is used to predict the validation subset. The training data set can be divided into calibration and validation subsets called "leave-one-out," i.e., take one sample out from each class to build a validation subset and use the rest samples to build a calibration subset. This process can be repeated using different subset until every sample in the training set has been included in one validation subset. The predicted results are stored in an array. Then, the correct prediction percentages (CPP) are calculated, and are used to validate the performance of the model.

According to the present method, a cross-validation with one training data set can be applied to generally all the models built with different algorithms, such as K-Nearest Neighbor (KNN), SIMCA, Canonical Discriminant Analysis, and Fisher Linear Discriminant Analysis, respectively. The results of correct prediction percentages (CPP) show the performance differences with the same training data set but with different algorithms. Therefore, one can pick up the best algorithm according to the embodiment, as shown in step 470.

During model building, several parameters and options may be chosen. To build the best model with one algorithm, cross-validation is also used to find the optimum parameters and options. For example, in the process of building a KNN model, cross-validation is used to validate the models built with different number of K, different scaling options, e.g., mean-centering or auto-scaling, and other options, e.g., with PCA or without PCA, to find out the optimum combination of K and other options. In a preferred embodiment, auto-cross-validation can be implemented using a single push-button or two push buttons for ease in use. It will automatically run the processes mentioned above over all the (or any selected) algorithms with the training data set to find out the optimum combination of parameters, scaling options and algorithms.

Once the best fit algorithm and model has been uncovered, the method goes through a discrimination test, step 471. In a specific embodiment, the method compares the results, e.g., fit of data against algorithm, combination of data and other preprocessing information, against confidence factor (if less than a certain number, this does not work). This step provides a final screen on the data, the algorithm used, the preprocessing methods, and other factors to see if everything just makes sense. If so, the method selects the final combination of techniques used according to an embodiment of the present invention.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. An example according to the present invention is described in U.S. Ser. No. 09/802,513, which is incorporated by reference for all purposes.

The above example is merely an illustration, which should not unduly limit the scope of the claims herein. One of ordinary skill in the art would recognize many other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

An alternative method for identification or classification purposes according to the present invention is briefly outlined as follows:

1. Provide unknown sample;
2. Acquire raw data in voltages;
3. Check base line voltages;
4. Filter;
5. Calculate $\Delta R/R$
6. Determine Training set?
7. If yes, use method outlined above;
8. Otherwise, normalize;
9. If training set, use method outlined above;
10. Otherwise, find appropriate pattern recognition process from method above for training set;
11. Output result from pattern recognition process;
12. Check confidence level;
13. If greater than predetermined amount, go to next step, otherwise, report the name and probability of closest class;
14. Make prediction and report probability; and
15. Perform other steps, as required.

The above sequence of steps is merely an example of a way to identify or classify an unknown sample or known sample of unknown quality according to an alternative embodiment. The present example takes one substance or sample, where the substance has a plurality of characteristics, which are capable of being detected by sensors or other sensing devices. Each of these characteristics is measured, and then fed into the present method to create a training set. The method includes a variety of data processing techniques to provide the training set. Depending upon the embodiment, some of the steps may be separated even further or combined. Details of these steps are provided below according to Fig.

As shown, the present method (450) begins at step 451. Here, the method begins at a personal computer host interface, where the method provides a sample to be analyzed or an unknown sample (once the training set has been processed). The present method processes a known sample of unknown quality to determine if the quality is within or outside of a predetermined range. Alternatively, the sample may be unknown and the sample classification is determined according to an embodiment of the present invention. In a specific embodiment, the method has captured data about the sample from a data acquisition device. Here, the sample should form a distinct class of data according to the present invention. The data acquisition device can be any suitable device for capturing either intrinsic or extrinsic information from a substance. As merely an example, the present method uses a data acquisition device for capturing olfactory information. The device has a plurality of sensors or sensing devices, which convert a scent or olfaction print into an artificial or electronic print. In a specific embodiment, such data acquisition device is disclosed in WO 99/47905, commonly assigned and hereby incorporated by reference for all purposes. Those of skill in the art will know of other devices including other electronic noses suitable for use in the present invention. In a specific embodiment, the present invention captures olfactory information from a plurality of different liquids, e.g., isopropyl alcohol, water, toluene. The olfactory information from each of the different liquids is characterized by a plurality of measurable characteristics, which are acquired by the acquisition device. Each different liquid including the plurality of measurable characteristics can be converted into an electronic data form for use according to the present invention.

The method acquires the raw data from the sample often as a voltage measurement, step 452. The voltage measurement is often plotted as a function of time. In other embodiments, there are many other ways to provide the raw data. For example, the raw data can be supplied as a resistance, a capacitance, an inductance, a binary characteristic, a quantified characteristic, a range value or values, and the like. Of course, the type of raw data used depends highly upon the application. In some embodiments, the raw data can be measured multiple times, where an average is calculated. The average can be a time weighted value, a mathematical weighted value, and others.

Next, the method checks the base line voltages from the plurality of sensing devices used to capture information from the sample, as shown in step 453. The method can perform any of the base line correction methods described herein, as well as others. Additionally, the method can merely check to see if each of the sensing devices has an output voltage within a predetermined range. If each of the sensing devices has an output voltage within a predetermined range, each of the sensing devices has a base line voltage that is not out of range. Here, the method continues to the next step. Alternatively, the method goes to step 455, which rejects the sensing device that is outside of the predetermined voltage range, and then continues to the next step. In some embodiments, the sensing device that is outside of the range is a faulty or bad sensor, which should not be used for training or analysis purposes.

The method then determines if the measured voltage for each sensing device is within a predetermined range, step 454. The voltage for each sensor is provided by exposing the sensor to the sample. The exposure can be made for a predetermined amount of time. Additionally, the exposure can be repeated and averaged, either by time or geometrically. The voltage is compared with a range or set of ranges, which often characterize the sensor for the exposure. If the exposed sensing device is outside of its predetermined range for the exposure, the method can reject (step 455) the sensor and proceed to the next step. The rejected sensor may be faulty or bad. Alternatively, if each of the sensing devices in, for example, in the array of sensors is within a respective predetermined range, then the method continues to the next step, which will be discussed below.

The method can convert the voltage into a resistance value, step 456. Alternatively, the voltage can be converted to a capacitance, an inductance, an impedance, or other measurable characteristic. In some embodiments, the voltage is merely converted using a predetermined relationship for each of the sensing devices. Alternatively, there may be a look up table, which correlates voltages with resistances. Still further, there can be a mathematical relationship that correlates the voltage with the resistance.

The method the runs the data through one or more filters, step 457. The method filters the data to remove any imperfections, noise, etc. As merely an example, data from the present data acquisition device are often accompanied with glitches, high frequency noise, and the like. Here, the signal to noise ratio is often an important consideration for pattern recognition especially when concentrations of analytes are low, exceedingly high, or not within a predefined range of windows according to some embodiments. In such cases, it is desirable to boost the signal to noise ratio using the present digital filtering technology. Examples of such filtering technology includes, but is not limited to a Zero Phase Filter, an Adaptive Exponential Moving Average Filter, and a Savitzky-Golay Filter, which will be described in more detail below.

The method runs a response on the data, step 458. Here, the method may perform a baseline correction step. Depending upon the embodiment, there can be many different ways to implement a baseline correction method. Here, the baseline correction method finds response peaks, calculates $\Delta R/R$, and plots the $\Delta R/R$ verses time stamps, where the data have been captured. It also calculates maximum $\Delta R/R$ and maximum slope of $\Delta R/R$ for further processing. Baseline drift is often corrected by way of the present step. Once baseline drift has been corrected, the present method undergoes a normalization process, although other processes can also be used. Here, $\Delta R/R$ can be determined using one of a plurality of methods, which are known, if any, or developed according to the present invention.

In a specific embodiment, most of the preprocessing steps, as noted above, were determined by optimum combinations of processes from the training set. The sample is run through the same or similar set of preprocessing steps. In the present embodiment, the method skips to step 467. The post processing procedures include, for example, a normalization step. In a specific embodiment, the normalization step scales the data to one or other reference value and then autoscales the data so that the sample value is referenced against each other (step 467).

Since the sample is not part of the training set process (step 468), the method goes to step 475. Here, the unknown sample is run through the algorithm selected from the training procedure, step 475. The training set uncovered the optimum or near optimum algorithm to be used by the unknown sample, which should fall into one of the classes from the training set. The sample is run through calculations (step 476) and a result or results are outputted. The result is outputted through a confidence factor (step 477). If the result is greater than a predetermined amount, the method goes to step 479. Alternatively, the method outputs a result (step 478), where the name and probability of the closest (step 455).

In step 479, the method makes the prediction and reports the probability. In some embodiments, the method identifies the unknown sample based upon its descriptor that matches a known class of samples from the training set. Alternatively, the method identifies that the sample, which is known, but may be of unknown quality, is within a predetermined range of values. Here, the method can determine if a sample, which has been derived from an industrial process, for example, is within a predetermined specification from a training step. The sample can be a final product, an intermediary product, or any other stage of manufacture or processing.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. The above example is merely an illustration, which should not unduly limit the scope of the claims herein. One of ordinary skill in the art would recognize many other variations, modifications, and alternatives.

For example, while the above description focuses upon use of embodiments of the present invention to control an industrial process, the present invention is not limited to this application. The present invention is generally applicable to monitoring the state of complex processes, and can be utilized, for instance, to monitor the ongoing health of a piece of capital equipment such as pump, compressor, or paper manufacturing machine.

Moreover, the present invention is not limited to monitoring industrial processes. Other complex processes may be monitored in accordance with embodiments of the present invention. For example, an embodiment of the present invention could be utilized for human medical diagnosis, with non-symbolic inputs such as heart rate, medical history, blood tests etc. being combined with symbolic information such as patient demeanor, skin texture and color, etc. Based upon the various inputs, a system could provide a threshold patient assessment, and even suggest changes in treatment, subject, of course to supervision and intervention by a trained physician.

EXAMPLES

To prove the operation of the present invention, we made a software specification document, which can be used to implement aspects of the invention. This specification is merely an example and should not unduly limit the scope of the claims herein. One of ordinary skill in the art would recognize many other variations, modifications, and alternatives. For easy reading, we have provided an outline of the Table of Contents for the specification as follows:
SYSTEM REQUIREMENTS
PROJECT DESCRIPTION
PRODUCT DEFINITION
FUNCTIONAL SPECIFICATIONS
OPERATIONS ENVIRONMENT
APPENDICES
GLOSSARY
System Requirements We have prepared the information below to define computer software, including a software product for process control. The software has been made to analyze sensor data from diverse data sources in a plant or other manufacturing environment. A software product able to provide advanced analysis capabilities would fill an unmet need and offer value in a number of market sectors. By using advanced analytical techniques, better prediction is possible that, in turn, provides improved product quality, increased reliability, less downtime, and other benefits. Various tests have been conducted with key partners in select vertical markets. Analysis of data from a petrochemical pilot plant, and experiments involving smoke and fire detection both yielded positive results, and has encouraged the work to develop a robust software product to proceed.

In the present example, we will develop a modular set of web/browser-based software products that allows users in diverse industries to augment existing methods of monitoring, analyzing, and reporting the status of sensors and/or other measurement devices. For the purpose of this document, the software shall be referred to as the Software. We will also extend the analytic capabilities currently available to include advanced multivariate techniques and SCREAM (System Coherence Rendering Exception Analysis for Maintenance) techniques for process monitoring, control and optimization, fault & anomaly detection, the ability to identify key relationships between variables, and will reduce the complexity of control.

The Software will interface with existing process control hardware and e-enterprise software so that the results of the software's analyses can be automatically translated into specific actions that improve plant efficiency. Although the software should be applicable to any industry, focus will be on the oil and gas, chemical, and consumer food sectors. Healthcare may also be an industry on which to focus.

In the present example, our system had one or more desirable features. These features include computer software that:
1. enables the collection of sensor data;
2. performs univariate, multivariate, and SCREAM analyses;
3. allows process models to be built and saved including an interface to equation based, physical model builders; software that monitors real-time sensor data;
4. allows data mining of historical and real-time data;
5. allows administration and configuration of users, sensors, and data;
6. defines and manages alarms related to process model results;
7. provides expert systems to interpret alarm data and recommend specific actions;
8. provides an interface to Enterprise Resource Planning (ERP) systems that use process model results to initiate actions; and
9. provides an interface to Process Control systems that use Process Model results to initiate actions.

As noted, the above are merely examples that should not unduly limit the scope of the claims herein. One of ordinary skill in the art would recognize many other variations, modifications, and alternatives.

Project Description

The following have been identified as objectives for the Software: (1) decreasing the number of individual alarms a process operator needs to address; (2) reducing problem diagnosis time by providing sensitive and robust techniques for anomaly detection; (3) identifying system attributes that can be optimized to save operating costs using advanced data mining techniques; (4) providing system monitoring performance allowing system monitors to exchange multiple univariate alarms for fewer multivariate or SCREAM alarms; (5) performing superior data pre-processing capabilities, data visualization, and flexible data presentation; (6)

reducing the amount of out-of-specification product, product re-working, and batch cycle times; and (7) reducing or eliminating catastrophic process events.

The problem is defined by demands on manufacturing processes that are constantly rising, with higher targets of quality, throughput, and yield being required at the same time as lower costs, less waste, and less pollution. Meeting these demands necessitates better knowledge about the processes and process operations, as well as better control over process conditions.

Methods such as Principal Component Analysis (PCA) and Partial Least Squares (PLS) work well for modeling and analysis of large and complex data sets. These methods give easily interpretable results such as deviations from the model. We believe that use of the JPL-developed SCREAM techniques can offer an even better way to detect, and ultimately resolve, faults even those for which models have not been explicitly trained.

The scope of the project is characterized by a number of factors. One such factor is geographical boundaries. For now, the product is being developed for the US market only. The system will be provided in English only. While this does not have major development implications, development of alternate displays for numbers, etc. based on country convention (e.g., displaying 1.000.000 instead of 1,000,000) have not yet been undertaken. There may also be some implications for measurement units (e.g., the use of liters vs. gallons, etc.)

Most of the testing done to date with SCREAM has been in the aerospace industry. JPL has reported success using these techniques, but the results have not yet been verified in other industries. To address this issue, we will work with potential partners during the software design phase to confirm the effectiveness of the SCREAM techniques in several industries.

Another possible factor is reluctance by management to adopt the system. With so much at stake on the manufacturing environment, management may be reluctant to introduce an unproven product from a relatively small player into their plant environment. To address this issue strategic partnerships with a few high-profile partners will be pursued to develop a track record of success for the product. In addition, the Software will be deployed in parallel with existing techniques during a product validation period.

In addition, Model Builders may be reluctant to embrace another system due to the training required and the lack of perceived value. We need to address this issue by clearly demonstrating the value of the Software and getting Model Builders to view it as a must-have rather than a nice-to-have.

Some research in the area of process control system suggests that Monitor reluctance is a key reason why new software solutions are not readily adopted into the normal work routine. To address this issue we will focus resources during the design phase on a superior user interface for users, with particular focus on the monitoring function. We will also focus on Monitor training during implementation. Monitors may need re-assurance that the Software is there to help them do their jobs, not to displace them from their jobs.

Process control is a fairly crowded space with a few dominant players, but with many smaller players contributing subject matter expertise. The Software will need careful positioning as a product that works with existing software but that is good enough to stand on its own.

It will be important for us to develop/train internal resources to integrate the Software with existing hardware and software in the process control environment. Alternatively, we could hire or contract for appropriate resources in these areas.

We believe that a browser-based solution is crucial to the success of the product. It needs to be verified that that a browser-based implementation can achieve the performance requirements outlined in this document. It is suggested that early measurements be made during the design phase to validate the technical feasibility.

A number of assumptions affect planning and project development. Detailed descriptions of assumptions that are underlying premises of the project or system structure are described.

While outlined briefly here, it is expected that the Software will include an expert system that integrates with ERP systems and Process Control Systems. Systems should be designed with this—in mind, using existing industry standards wherever possible.

The Software will co-exist with process control and e-enterprise software solutions already in place. It is assumed that some sort of software (i.e. a SCADA system) is already collecting, storing, and organizing sensor data. Therefore, the Software will not need to be interacting with the sensors directly.

JPL's SCREAM software is assumed to deliver the expected results and that the technology is applicable to manufacturing environments. Furthermore, the Software will likely also integrate a software package that provides all univariate and multivariate calculations.

A number of assumptions concerning process control technology are given below. First, the thin client HMI (Human Machine Interface) has become more pervasive in every aspect of both process and discrete manufacturing. Thin-client technology provides remote monitoring, control, and maintenance capabilities to Web-conceived machinery and can access server-based network applications and embedded devices with web server software. Instead of the application residing and executing on a local device, it resides and executes on the Web server. The Web server can be resident on an internal high-speed intranet network or located on an Internet server anywhere in the world. Thin clients access HMI information using commercial Web browsers that do not require locally resident HMI software. Web browsers provide thin-client technology access to anyone who is authorized anywhere and anytime. Browsers bridge the gap between diverse systems, are intuitive and easy to use, are free or inexpensive, and run on PCs and Palmtops. They communicate with any computer embedded with Web server software, lower user training costs, and lower IT support and maintenance costs.

In addition, XML is emerging as the primary translation media for moving data and information across the Internet. It will be used to move real-time data from the device level to the enterprise level to run applications that will provide the collaborative information needed across all tiers within the factory and beyond. XML will become the query-response format for many server applications.

XML schemas capture the essential data structures of the business and manufacturing processes of vertical industry sectors and trading partners in the supply chain. Standardization of XML schemas replaces older electronic data interchange (EDI) transaction data sets and establishes, standardized supply chain data sets.

Furthermore, Java technology, which already is the preferred method of powering the Internet, will move to more and more controls applications. Its platform independence makes it a natural for use with heterogeneous legacy systems. Implementation of e-manufacturing will be the primary reason for using Java, since it was designed for highly distributed environments.

Java is the preferred implementation language for building browser-based HMI front-ends to all manner of control systems connected across the Intranet/Internet. Embedded smart devices (drives, motors, servos, actuators, gauges, pumps, flow meters, etc.) will push data up from the plant floor to run everything from control to asset management and the supply chain. Embedded Web servers will connect devices, controls, and systems across the Internet to suppliers, subcontractors, and customers.

Wireless technology enables the mobile consulting, service, and support that is necessary in today's customer-driven economy. People are kept informed, are always accessible, can respond quickly, and take action remotely. Bluetooth is one wireless technology that will blossom in 2001 as commercial handheld devices become available to support Bluetooth functionality in industrial equipment. Most of the early Bluetooth applications will be in data transfer with moving machinery and MRO functions.

Wireless LANs have been available for more than two years, but are just now achieving high enough data rates and low enough selling prices to be considered for industrial automation applications. Early use of wireless LANs has now replaced most new wired and RF data communications and handheld data collection terminals in manufacturing, warehousing, shipping, and receiving. Improved antennas, roaming software, and increased Ethernet network integrity coupled with lower hardware prices will enable use of wireless LAN connections to movable shop floor computers.

Moreover, the emphasis of Web application hosting has migrated from enterprise applications to the manufacturing arena. The use of the Web is allowing employees at all levels to manage plants and operations more effectively than ever before and at a lower cost. Collaborative solutions that encompass facets of project management, process and product development, decision support, operational functions such as performance monitoring and analysis, workflow control, asset management, process control, process optimization, and employee training are now available. Although these solutions are available as standard products, the Web-hosted versions are gaining in popularity for a variety of reasons including the inherent collaborative nature afforded with the Internet, a common user interface, and all of the advantages gained from the use of an ASP (Application Service Provider).

ARC expects new and innovative services to appear over the next year. For example, consulting services will play a major role in manufacturing in the near future. Instead of bringing consulting experts to the physical location of your process or units, it is now possible, in principle, to bring the units to the consultant by providing access to pertinent real-time data for analysis. Remote consulting will cover a broad spectrum including design, operational performance analysis, de-bottlenecking, process improvement, troubleshooting, and project implementation.

Another factor is the emergence of Publish/Subscribe (PIS) Technology. In a system that utilizes P/S, all stations operate as peers. Users subscribe for the information they want at the frequency they need it. Sources of information publish information based on instruction from users, which eliminates bandwidth-consuming polling and high speed broadcast techniques. From the emerging fieldbus networks to enterprise business networks, P/S technology is a common thread and a consistent mechanism to move information.

Additionally, experiments recently revealed that P/S is a highly efficient method for achieving multiple node time synchronization with low network overhead. Time synchronization sufficient for process control (tens of milliseconds) allows P/S to be used for synchronization of control blocks in Foundation Fieldbus networks.

Product Definition

The Software will provide data—analysis capabilities and the ability to develop process models for on-line monitoring. Data may be imported from on-line or off-line databases, spreadsheets, physical models, or text files. These data are analyzed using statistical and graphical techniques to derive the appropriate models. The model and additional default configuration information are then made available to the Monitoring System.

To use models for process monitoring, a model for the well-functioning process first needs to be developed from historical data. This model can then be used to monitor the process in real-time. The following functions are required for model definition and data mining:
1. Create a new process model;
2. Validate a process model;
3. Save a process model;
4. Modify a process model; and
5. Delete a process model.

Monitors need the ability to watch the health of their system. To do this, the results of process models and individual sensors are continually monitored. Control charts are used to give Monitors a graphical view of a well or malfunctioning process and the presence or absence of faults. A typical Monitor would watch one process model and several individual sensors simultaneously.

Once a sensor has been placed in a system view, it can be manipulated with the following functions:
1. Change Current (this session) & Default (future sessions) View;
2. Change Current & Default Time Frame; and
3. Print View.

Once a process model has been placed in a system view, it can be manipulated with the following functions:
1. Change Current (this session) & Default (future sessions) View;
2. Change Current & Default Time Frame;
3. Enable/Disable Alarm Notification;
4. Examine individual analyses that comprise the model;
5. Print View.

Once the alarm monitor has been placed in a system view, it can be manipulated with the following functions:
1. Change Current (this session) & Default (future sessions) View;
2. Get Details of an Alarm;
3. Clear an Alarm;
4. Print Alarm Log; and
5. Log Alarms.

To organize the sensors, and models, and alarms that a Monitor can view, "system views" will be created. A system view is defined as a collection of system statuses that a user has chosen to monitor. The following functions are needed to set-up and maintain system views.
1. Create a New System View;
2. Add/Delete Content of a System View (e.g., What's in the view);
3. Add/Delete a Sensor;
4. Add/Delete a Process Model;
5. Add/Delete the Alarm Monitor;

6. Modify Layout of a System View (e.g., Where the content goes);
7. Modify the Colors/Backgrounds of a System View; and
8. Print System View.

All systems require some level of administration. The functions defined here are required to administrate the Software's users and data. User Set-Up Functions will allow an administrator to set-up and configure users:
1. Add a User;
2. Disable a User;
3. Delete a User; and
4. Change Password.

User Functions enable users to get in and out of the system in a secure way:
1. Login;
2. Logout; and
3. Password Change.

Depending upon the design of the underlying data structures, Sensor Data Functions may be required in order to make raw sensor data available to the Software:
1. Add a sensor;
2. Delete a sensor; and
3. Configure sensor data.

Depending upon the design of the underlying data structures, Real-Time Data Functions may be required in order to get sensor data, provide that data to the data models, and after some period of time archive the data:
1. Get Sensor Data;
2. Provide Sensor Data to Models; and
3. Archive Data to Historical Server.

As with real-time data, historical data must also be made available to the data models, and archived or deleted over time. Historical Data Functions therefore serve to:
1. Provide Sensor Data to Models;
2. Archive Data to Storage Media; and
3. Delete Data An expert system to interpret process model alarm data and recommend specific actions for e-enterprise (ERP) systems and process control systems will be developed. The following are types of functions that an expert system could provide:
1. Provide recommendations to Monitors about what to do to clear a particular alarm (e.g., adjust sensor x to y);
2. Determine degradation over time in a system component (e.g., slow buildup of residue in a pump); and
3. Automatically provide information about a system component that needs to be replaced to a SCM (Supply Chain Management) sub-system.

An event-driven interface to Enterprise Resource Planning (ERP) systems that uses process model analysis data to initiate actions based on those analyses will be provided. The ERP interface is expected to integrate with a variety of ERP systems, including but not limited to those of SAP, IFS, Oracle Corp, J.D. Edwards, the Baan Co. Geac Computer Corp., JBA International, i2 Technologies, The Foxboro Co./Invensys Intelligent Automation, System Software Associate, and IBS.

An event driven interface to Process Control systems that uses process model analysis data to initiate actions based on those analyses will also be provided. This interface will also be important for making good use of the detection of faults/anomalies data from SCREAM. The Process Control system interface will integrate with a number of process control systems, including but not limited to those of Honeywell, Fisher-Rosemount, Rockwell Automation, GE Fanuc, Siemens Moore Processing Automation, Inc., Aspentech Technology, and the Foxboro Company.

Functional Specifications

Figure 5:
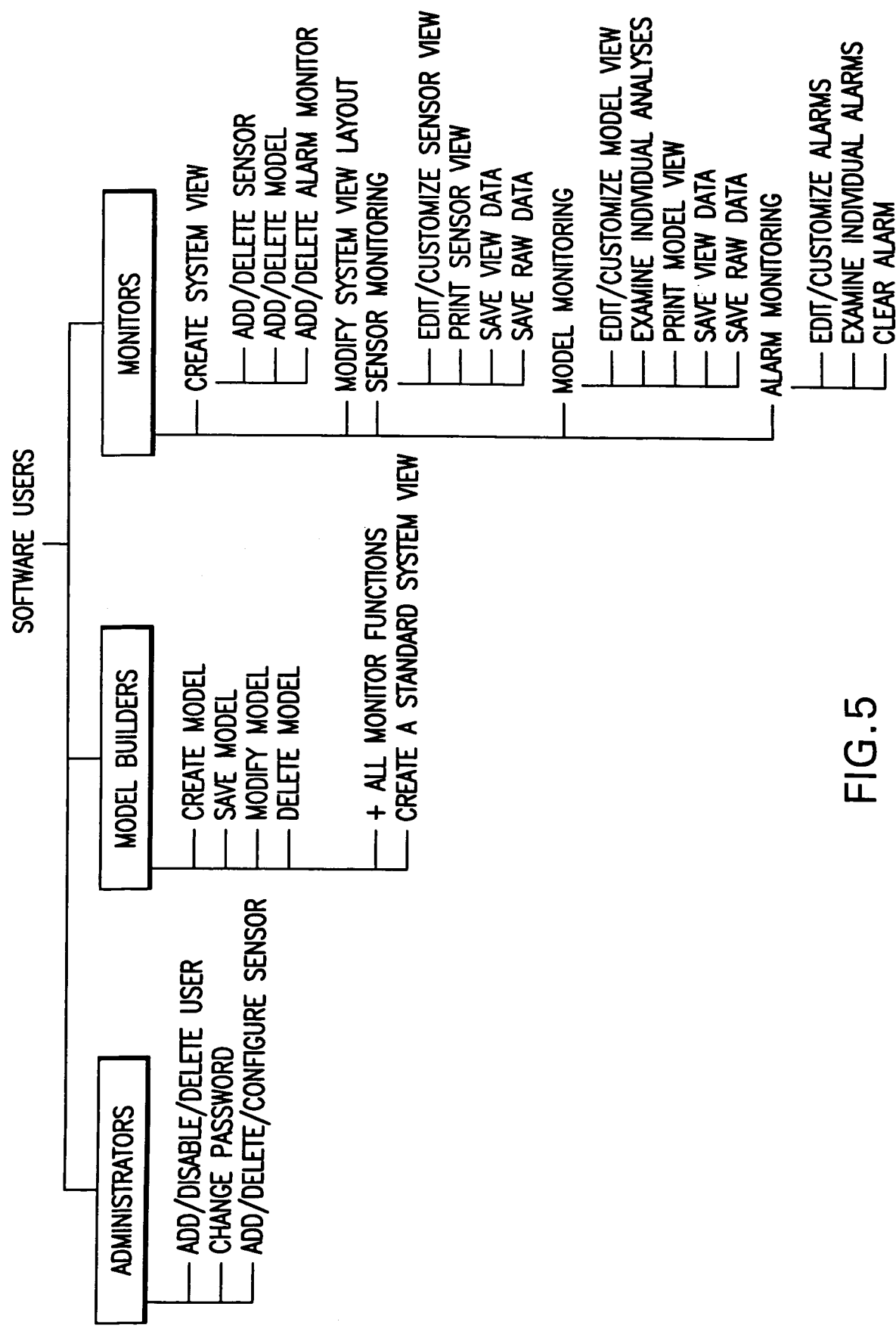
FIG. 5 is a chart showing users of the Software.

This section of the document describes the requirements for individual functions at a detailed level. FIG. 5 is a chart showing users of the Software.

One user group are the Model Builders. Model Builders create models to represent the health or status of a system. Models can be simple collections of individual sensors, or complex collections of sensors, other models, and virtual sensors. Models are at the core of the Software; they use raw sensor data to determine if the system is in or out of control, and provide that information to Monitors in the form of control charts and alarms.

A variety of functions are utilized for model building and data mining. One function is creation of a new model. Model Builders shall be able to a build process model. The overall flow for creating a process model is as follows:
1. Select algorithm;
2. Choose sensors (& other model input);
3. Select training data source;
4. Select training data start/end times;
5. Pre-process model data;
6. Define alarm conditions;
7. Validate model; and
8. Save model Model Builders also shall select the algorithm and multivariate techniques to be used in the model. A nonexclusive list of multivariate techniques available to a user is shown below in TABLE 10. The Model Builder may also select one of the SCREAM techniques of TABLE 11 below to be used in the model. If a SCREAM "continuous" data model is being used, the Model Builder is allowed to import model result from an equation-based physical model.

A Model Builder also may choose sensors & other inputs to the model. A list of available sensors may be displayed. Sensors may be described either by a description field, or by a naming convention that makes them easy to identify.

Model Builders may also be able to select individual sensors, a group of sensors related to a particular piece of equipment, or all sensors. A list of other models may also be displayed. Model Builders shall be able to select other models to include as input the model being built. Models shall be listed by "Model Name." Models may contain multiple streams of data at a given point in time.

Model Builders may also select the source of the training data Training data can come from a real-time data server, a historical data server, or from a Microsoft Excel spreadsheet. Model Builders may specify the location of the training data for each sensor or model that is used as input to the model. If training data is being imported from an Excel spreadsheet, data fields from the spreadsheet may be mapped to the appropriate sensor. A function may be provided which enables the Model Builder to associate a sensor with a column of data in the spreadsheet.

Model Builders may also select the time period to be included in the training data. The user shall be able to select start and end date/time down to the second (e.g., from MM/DD/YYYY HH:MM:SS to MM/DD/YYYY HH:MM: SS). Any valid dates may be entered.

The GUI may include pop-up calendars to aid the user in selecting the time period. Users should be able to select dates from the pop up calendars from today (no future dates) back to one year ago. Dates that are not valid should not be selectable. Alternatively, users should be able to select month, day, and year from dropdown menus. Hours, minutes, and seconds should be entered on a 24-hour clock. Users should also be able to select hours, minutes, and seconds from drop down menus.

Model Builders may validate that data from the selected time period is available in the training data set for each sensor in the model. If the data is not available for all sensors, Model Builders may: 1) select a different time period, delete the sensor from the model, or continue (pre-processing can fill in the missing data, although this is not recommended).

Model Builders also pre-process model data. Training data may be pre-processed automatically to improve the quality of the input data. Pre-processing techniques are shown in TABLE 7. Available techniques will be selected. A Model Builder shall select one or more of the above techniques depending upon the choice of algorithm. Upon selection completion, the training data should be run through the preprocessing techniques selected.

Model Builders also have the ability to define conditions that trigger alarms. The detailed descriptions of the algorithms provided below show the values can be used to create alarm conditions. Steps to create an alarm condition are as follows.

1. Based on the algorithm used, display the list of variables that can be evaluated to determine an alarm condition (e.g., Principal Component # 1, etc.).
2. The Model Builder shall build conditions consisting of one or more variables (e.g., each alarm may contain up to five variables. The variable to be evaluated should be selected from a list. The operator to be used should be selected from a list containing the following: greater than, less than, greater than or equal to, less than or equal to, equal to, not equal to). The user shall enter (i.e., not select) the actual value to be tested:

e.g., $((x>5 \text{ and } y<3))$ or $(z>7)$

3. Up to ten different alarms can be defined per model.

e.g., Alarm $1=x>5$, Alarm 2 $(x>5 \text{ and } y<3)$, Alarm $n$=etc.

4. The Model Builder may associate a priority with an alarm condition. There should be five different priority levels. The priority levels should be: 1, 2, 3, 4, and 5, with five being the most severe.
5. The Model Builder may specify which of the alarms are "on" by default (that is, if the model were added to a system view, which alarm notifications would automatically be enabled). The Model Builder may also specify whether notification for this alarm may be disabled by a Monitor.
6. The Model Builder may associate a 25-character text description with an alarm condition.

The system shall automatically generate alarm conditions related to the upper and lower alarm thresholds for the algorithm. These alarms should only be able to be edited by the Model Builder.

A Model Builder shall have the ability to validate a model by running the model against another set of data (either historical or real-time) to ensure that the model "works." The following are the steps to validate a model:

1. Select the time period to be included in the validation data. User should be able to select start and end date/time down to the second (e.g., from MM/DD/YYYY HH:MM:SS to MM/DD/YYYY HH:MM:SS).
2. Validate that data from the selected time period is available for each sensor selected. Handle any errors.
3. Run the model against the validation data.
4. Present the results in the defaults defined for the model.

A Model Builder shall be able to save a model for personal use or for use by others who may want to use the model. TABLE 1 shows some items to be saved when a model is saved.

TABLE 1

Items Saved with Model

| Data Name | Description | Comments | Change Without Re-Training? |
|---|---|---|---|
| Model Creator | A designation of the model creator. | Used to know which unpublished models belong to a particular user. | Yes |
| Model Name | A descriptive name for the model. | A model name can contain up to 25 characters, including spaces. It cannot contain the following characters: \/: * ? " <>|. Deplicate names should not be allowed. | Yes |
| Model Description | A description of what the model does. | A model description can contain up to 500 characters. Any valid characters can be included. This description will be used for help screens, and for describing the model when it is being added/deleted from system views. | Yes |
| Sensors/Model Input Used | The sensors and models used as input to this model. | | No |
| Sensor/Model Loadings | The loadings to be applied to each sensor/model used in this model. The loadings are developed during model building. | Applicable for some models. | No |
| Pre-Processing Techniques | The pre-processing techniques to be used when this model is run. | This may be from 0 to 10 different techniques. | No |
| Pre-Processing Data | For each pre-processing technique used, store the resulting output that was | Note the data varies depending on the technique. | No |

TABLE 1-continued

Items Saved with Model

| Data Name | Description | Comments | Change Without Re-Training? |
|---|---|---|---|
| | generated when the technique was run against the training data. These values will be needed when the model is run. | | |
| Default Time Frame | The default time frame to be used when this model is run (e.g., when the model is run use the last five minutes of data). | Specified in minutes. | Yes |
| Algorithm | The algorithm to be used when this model is run. | | No |
| Default View | The default view for this model (e.g., scatter plot). | | Yes |
| Default Time Scale for View | The default time scale for the default view. | | Yes |
| Data Acquisition Rate | The rate at which data is sampled from the data source. | For example, get data from all of the sensors required to run this model every 2.5 seconds. | See Footnote[1] |
| Data Display Rate | The rate at which data is supplied back to the user's display. | For example, supply data back to the user's display every 5 seconds. | Yes |
| Training Data Start Date & Time | The start date & time of the training data used to create this model. | | No |
| Training Data End Date & Time | The end date time of the training data used to create this model. | | No |
| Training Data | The actual training data. | Format may vary but most likely, along list of timestamps, sensor identifiers, and sensor readings. | No |
| Alarm-Related Data | | For each alarm condition all of the fields shown must be stored. | Yes |
| Condition | Condition: The condition that triggers the alarm (e.g., X > 5) | | |
| Severity | Severity: The severity of the error. From 1 to 5, 5 being most severe. | | |
| Description | Description: A short description of the alarm (e.g., TC-125 Temperature High). | | |
| Default Setting | Default Setting: Indicates if this alarm is enabled or disabled by default. | | |
| Alarm Type | Alarm Type: Indicates if this alarm is automatically generated by the model, or was manually configured by the model builder. | | |
| Disable? | Disable?: Indicates if notification for this alarm can be disabled. | | |
| Publish Status | Indicates if the model is public or private | Private models can only be seen/run by the creator. Public models will be available for anyone to use. | Yes |

[1]Varies by algorithm. In general, for state-based models (e.g., PLS, PCA) the answer is Yes. For dynamic-based models (e.g., SCREAM and Multi-Way PCA models), the answer is No.

Processes change over time. Sometimes, long-term changes in measurement conditions reveal the limited robustness of the initial model. This is particularly the case for multivariate models that can be very sensitive to small changes in sample conditions. As a result, Model Builders may replace or update models. A Model Builder may be presented with a list of all saved process models.

Models shall be displayed in alphabetical order by "Model Name." Upon selection, the saved items in the model shall be displayed. When a Model Builder initiates a change to a published (i.e., public) model, a copy of the model is first saved with an "unpublished" (i.e., private) status. While the Model Builder is changing the model, the original model is still published and available. When the model builder publishes the changed model, the updated model should be used immediately upon publication (i.e., if anyone has the model running, the new model should be used immediately).

Some attributes of a model can simply be changed. Others, if changed, require the model to be re-trained and re-validated. TABLE 1 just presented also indicates model data that can be changed without having to re-train the model.

The Software further allows the Model Builder to select an attribute of the model to change. If one of the attributes that cause the model to need to be re-trained is changed, when the model is saved, it should be confirmed that—the model has been-re-trained and re-validated before saving. If the model has not been re-trained and revalidated, the user is required to do so before the model can be saved.

Model builders shall be able to import simulation results from a physical 10 model The following steps input model results:
1. Using the physical model package, export the model results to a spreadsheet. These requirements are not defined here. It is assumed that he physical model software is able to export to a spreadsheet.
2. Import spreadsheet data.
3. Assign process sensors to columns in the spreadsheet.

Models may become outdated or no longer required. The Software shall allow users to delete models. The Model Builder shall have the ability to delete a model. The user may be presented with a list of all process models. One or more of the models are selected for deletion. The selection process should follow the standard browser method of selecting one or multiple items from a list (e.g., "hold down the Ctrl key to—select multiple items"). If the model is public and the model has been included in a system view, a warning message may be displayed to the Model Builder showing the number of views that include the model and a reminder that deleting the model will delete the model from all system views. The user should be given the option to continue or cancel.

When a model is deleted, it should also be deleted from the system views of all users who have-it included in a view. However, if the model is running when it is deleted, the model should continue to run until the system view that used the model is closed. At that time, the model should be deleted from the view. When a model is deleted, all references to the model should be deleted from all user views, but the model should not be deleted altogether from the system. This is done as an added level of security to ensure that a model is not inadvertently deleted. This capability would allow the model to be restored. Individual users who had included this model in their system views would however, need to re-add it to their views.

Once models have been created, they are run and the results are typically presented to a Monitor who watches the health of the system. Model Builders can also perform all of the functions available to Monitors.

Configuration Functions allow Monitors who are watching a system to define and manipulate what they see. Monitors shall be able to select a "Standard System View" to monitor. A system view is a one-screen view containing sensors, models, and possibly other elements. A "Standard System View" represents a model builder's recommended set of models, and sensors to monitor for a given process. For example: a cereal plant makes Fruit Loops, Cheerios, and Corn Flakes. Different unit operations are used when making each type cereal. Fruit Loops require the dye machine, the other—cereals do not. Corn Flakes require the toaster, the other cereals do not. A model builder can pre-define a "Fruit Loops" view that monitors only the unit operations used while making Fruit Loops. This view includes the dye machine, other unit operations, and the individual sensors for the food coloring supply tubes that tend to get clogged often.

Monitors shall also be able to create "Custom Systems Views." By default, all users will have at least one view, which is initially set to be the default view. The default view initially contains no content. The default view is automatically displayed when the user logs in. For example: Your job is to monitor the appliances in a house. Three different views of the house could be set-up. One view might be the entire house with individual models monitoring each room. A second view might be only the kitchen with individual monitors for the dishwasher, the refrigerator, and the oven, etc. A third view might be only the air conditioning system throughout the entire house. The following steps create a new system view:
1. From an existing system view, select—an option to "Add a System View" (or something like this); and
2. From this point, the user is directed to the Add/Delete Content from a System View function.

Monitors shall be able to select content from a list of available components (sensors, process models, alarm monitors, and potentially other components), name the system view, and set the system view as their default. Continuing the house example, say you just bought a microwave oven. If there is a model that monitors your microwave oven, you could choose to add it to your kitchen view. Or if you install a smoke detector in the garage, that sensor could be added to the garage view. A user shall be able to add a number of components to be included in a system view.

Monitors shall be able to add or delete a sensor from a Custom System View. Monitors are also able to display the sensors that can be added to the Custom System View, and organize the sensor names in some logical way. If technically feasible, display the sensors organized around their physical hierarchy, with the ability to expand or collapse the hierarchy. A graphic or iconographic view is highly desirable. Sensors that are already contained within the system view should be indicated as such. A user may de-select (delete) a sensor. A Monitor may also select one or multiple sensors for inclusion.

Monitors shall be able to add or delete a model from a Custom System View. The Software can display a list of all public models in alphabetical order by "Model Name." Access to the "Model Description" is provided to help the user to select the correct model. A graphic or iconographic view is highly desirable. Models that are already contained within the Custom System View should be indicated as such. A user may de-select (delete) a model. The Software allows a Monitor to select one or multiple models for inclusion. Once a model is added to a Custom System View, it immediately starts running with the default configuration saved with the model.

Monitors shall be able to add or delete the alarm monitor from a Custom System View. If the alarm monitor is already included in the Custom System View, the user is allowed to de-select (delete) the monitor. Once a monitor is added to a Custom System View, it immediately starts running with the default configuration.

Monitors are able to assign a name to a Custom System View and to change that name. By default, each new Custom System View is given the name "New View." Enable the user to enter a name for the view. If the view already has a name, the user is allowed to change it. Names may contain any character that a standard Windows file name may contain.

Users shall be able to designate a System View as their default view. The default view will automatically be displayed after the user successfully logs into the system. If the designated default view is de-selected, make the first system view the default.

Model Builders shall be able to designate a system view as a Standard System View. Standard System Views will be made available to all users to easily select a recommended set of models/sensors to be monitored for a given process.

The Layout of a System View may be modified to alter the position of the content. Monitors shall be able to reposition individual components within a Custom System View. Although the specific design of this function will depend on the GUI, it is envisioned that each model monitor, sensor monitor, and the alarm monitor will be roughly the same size. Components should be able to be moved left to right or top to bottom (e.g., move Alarm Monitor above Sensor 1, or move Model 1 into Column 2).

The Colors/Backgrounds of a System View may be modified. Monitors shall be able to select from up to five pre-defined skins to change the look of their system views. Skins are templates that define the attributes of the display.

Monitors shall be able to use their browser's print function to print the system view.

TABLE 2 describes a partial list of possible sensor types the Software can monitor, along with the attributes of these sensor types.

TABLE 2

Sensor Types

| Sensor Type | Description | Measurement Options | |
|---|---|---|---|
| Temperature | Temperature "Temperature" is a measurement of degree of hotness or coldness measured on a definite scale | Fahrenheit [° F.] (Default) Celsius [° C.] | Kelvin [K] rankine (Rk) |
| Pressure | Pressure is a measurement of force per unit area. | millibars bars atmospheres inches of mercury inches of water feet of water pound/inch$^2$ [psi] pounds/foot$^2$ | pascals (Default) kilopascals megapascals mm of water mm of mercury kg/cm$^2$ tonnes/m$^2$ |
| Flow Rate (volume) | Flow Rate is a measurement of the amount of a liquid or gas that passes a fixed point in a given time. | gallons/second gallons/hour gallons/minute foot$^3$/second foot$^3$/hour foot$^3$/minute | centimeters$^3$/second meter$^3$/second meter$^3$/minute (Default) meter$^3$/hour liters/second |
| Speed | Speed is a measure of the distance moved in a unit of time. | inches/sec inches/min inches/hour feet/sec feet/min feet/hour miles/hour millimeters/sec | centimeters/sec (Default) centimeters/min meters/sec meters/min meters/hour km/hour |
| Torque | Torque is a measure of the "strength" being used in turning (or attempting to turn) something. | 1 bf feet 1 bf inches ozf inches ton(UK)f feet ton(US)f feet newton meters [Nm] (Default) | kilonewton meters [kNm] kgf meters kgf cm gramf cm tonnef meters |
| Acceleration | Acceleration is a measure of the rate at which a velocity is changing. It may be positive (for increasing velocity) or negative (for decreasing velocity). | inches/sec$^2$ feet/sec$^2$ (Default) miles/hour.min | miles/hour.sec meters/sec$^2$ |
| Power | Power is a measure of the rate of doing work (or using energy) in relation to time. The standard unit of power is the watt [symbol W], which is a rate of 1 joule per second. | milliwatts [mW] watts [W] (Default) kilowatts [kW] megawatts [MW] terawatts [TW] joules/sec kilojoules/min megajoules/hour | btu/sec btu/min btu/hour therms/hour calories/sec calories/min kilocalories/sec kilocalories/min kilocalories/hour |

TABLE 2-continued

Sensor Types

| Sensor Type | Description | Measurement Options | |
|---|---|---|---|
| Distance | Distance is a measure of the space between two points. | inches ["] feet ['] yards miles millimeters [mm] | centimeters [cm] meters [m] (Default) kilometers [km] |
| Discrete Type 1 | Discrete sensors can be in any of several states. This sensor type describes open or closed. | Open Closed | |
| Discrete Type 2 | Discrete sensors can be in any of several states. This sensor type describes on or off. | On Off | |
| Discrete Type 3 | Discrete sensors can be in any of several states. This sensor type describes only a value (e.g., sensor is in state number 2) | 1, 2, 3, etc. | |

All sensors can be displayed using a Control, Shewhart, EWMA, or CUSUM chart. By default, data is displayed using a Control Chart. Several functions are utilized to monitor sensors. When a system view containing a sensor is opened, all sensors in that view are displayed with the configuration saved with that system view, or with the sensor's default values.

A Monitor shall be able to select a sensor and change the look of the sensor display. The following items can be changed:

1. Time Scale: Changes the x-axis time scale. Enable user to select from: 10 90 days, 30 d, 7 d, 1 d, 12 hours, 3 h, 1 h, 30 minutes, 10 m, 5 m, 1 m, 30 seconds, 10 s, 5 s, 2 s, 1 s, 500 milliseconds, 200 ms, 100 ms, 50 ms, 20 ms, 10 ms 5 ms, 2 ms, 1 ms. Note this should not change the data acquisition rate or the display rate; it merely changes the scale on which the available data is drawn.
2. Minimum/Maximum Values: Changes whether the minimum and maximum values (since sensor monitoring was started) are displayed.
3. Show Samples: Changes whether or not the chart includes tic marks to indicate when samples were taken (e.g., if display scale is every 500 ms, but you only get data every 1 second, one tic mark would be displayed in every other time scale unit.
4. Show Alarm Threshold Limits: Changes whether or not alarm threshold limits are displayed (if they are available).
5. AutoScale: Changes axis scaling so that smallest and largest values are at the bottom and top (or left and right) of the plot, respectively.

Monitors shall have the ability to specify the time from when the sensor should begin monitoring. The user shall indicate if the change is for this monitoring session only, or whether this change should be remembered for future. When a sensor is "opened" (e.g., displayed in a system view), the data is displayed from a point in time based on either this user's defined preference, or the "Default Time Frame" stored with the sensor if the user has not defined a preference. The user should select the starting time relative to the current time, and specify the time in hours and minutes. If the time period chosen is earlier than the time. the current sensor was opened, the sensor data must be calculated from the starting point to the present, using the set refresh rate (the rate at which the model normally updates).

The Print View allows monitors to use their browser's print function to print the system view. No special requirements.

Monitors shall have the ability to save the system view (i.e., the graphical view) in a file. The system view should be saved in a standard graphic form for easy input into a MS Office document (e.g., Word, PowerPoint, etc.).

When a system view containing a model is opened, all models in the view are displayed with the configuration saved with that system view or with the model's defaults. The Software enables examination of individual analyses comprising the model.

Monitors shall be able to click on any individual point in a model to get additional detail. When an individual point is selected, an appropriate graph/plot for that point should be opened in a separate browser window. The next chart to be displayed will vary depending on the analysis being viewed, and the level of the chart being viewed. In order to change current & default time frame, the requirements are the same for models as they are for sensors.

Monitors shall have the ability to enable/disable notification for a model's alarms. The process to enable/disable alarm notification is as follows:

1. Display a list of the available "Alarm Conditions" from the stored model data.
2. Users shall not be permitted to disable any of the "automatic" alarm conditions that have been defined by the Model Builder, or alarms that have been defined by the Model Builder as "not able to be disabled".
3. Alarms that are already enabled should be indicated as such. Allow user to disable an alarm. Allow user to enable one or more alarms.
4. The software should confirm the alarms have been successfully enabled or disabled. Disabling alarm notification does not disable the alarm. The alarm still gets logged, but the Monitor simply does not get notified that the alarm occurred.

Alarms can be viewed in two ways. In each model view, there will be some sort of alarm status monitor that displays whether that particular model is in an alarm state. The Software will also provide the ability to monitor all of the alarms from any running model in a single alarm monitor view. Alarms are enabled or disabled in the model view not the alarm monitor view.

When a model is running, alarms may be generated by that model and by any model used by that model. The same alarm should be reported only once by a model. For example, if the model updates every second and the same alarm condition is present every second, the alarm should only be reported once. However, once the alarm has been cleared, if the alarm condition is still occurring, the alarm should be reported again.

Monitors shall be able to see the alarm status of an individual model. Some sort of graphic or icon should communicate the model's alarm status. If no alarms are currently tripped, this should also be communicated. If an alarm is tripped, the display should indicate the severity of the alarm, and the "Alarm Description" should be displayed. For example: A traffic signal is chosen to represent alarm status. If no alarms are tripped, the light is green. If a severity 4 or 5 alarm is tripped, a red light is displayed. If a severity 1, 2, or 3 alarm is tripped, a yellow light is displayed. Inmost cases, the alarm description would scroll across the bottom of the traffic signal.

Monitors shall also be able to see alarms generated by all the models in the System View in a single list. For each alarm, the alarm date, time, severity, and "Alarm Description" should be displayed. Alarms should be displayed in chronological order with the most recent alarms displayed at the top of the list. If multiple alarms with the same date and time have occurred, the alarms should be further sorted by severity. For example:

| Date | Time | Severity | Description |
|---|---|---|---|
| Jan. 22, 2001 | 05:36:20 | Severity #5 | TC-125 Puffer Clogged |
| Jan. 22, 2001 | 05:30:22 | Severity #3 | TA-300 Temperature High |
| Jan. 22, 2001 | 04:22:01 | Severity #2 | DM-425 Red Dye#2 Low |

A Monitor shall be able to get the details of an alarm. Alarms displayed in either the alarm monitor or the model view should be "clickable" to get additional information about the alarm. When clicked; the window of the model that generated the alarm should be opened. A text description of the alarm will display and in the future, possible corrective actions will also be displayed.

Monitors shall have the ability to "clear" alarms from the alarm monitor display. Users should indicate which alarms should be deleted. A "Clear All" function should also be provided to clear all alarms in one operation. Clearing an alarm in the alarm monitor should also clear the alarm in the model view. The system should log the time an alarm was cleared and the Username of the user that cleared the alarm. Alarms should have some sort of unique identifier. A user should be able to clearly determine from log analysis, each unique occurrence of an error, and at what time each user(s) cleared the alarm.

Users shall have the ability to review historical information about the alarms that have occurred. Alarms generated by any models in the active system view should be logged. Alarms should be logged regardless of whether alarm notification is enabled or disabled (i.e., all alarms should be logged even if the user has chosen to be notified of Severity 5 errors only). All the data that is displayed should also be logged. In addition, the model and/or sensor that generated the alarm should also be logged. Log files should be stored locally on the user's machine. Each time a user opens a system view, a new log file should be created. Logs should be kept on the user's machine for 30 days. Log files older than 30 days may automatically be deleted.

The file naming convention should be indicative of the system view name, the time, and the date (e.g., 01-15-01 09:35:02 My House Log) so that the log files can be easily identified. Log files should be stored in a standard file format (e.g., CSV—Comma Separated Value) for easy import into database or spreadsheet programs. Alarms should also be logged in a central location. The same logging requirements apply to the logs kept at a central location. However, alarms should be stored by the model that generated the alarm rather than by system view.

Users shall be able to use the Windows Notepad program to open, view, and print the locally stored log files.

A variety of functions are utilized to administrate the Software's users and data. User Set-Up Functions allow an administrator to set-up and configure users.

Administrators shall be able to add new user to the system. Associated with each user will be a User name, a Password, and a User Type. When an administrator adds a user to the system, the desired User Name and an initial password are entered. The user is required to change the initial password during the first log in.

At least three different user types are currently envisioned: Administrators, Model Builders, and Monitors. FIG. 5 describes the functions available to each type of user.

Administrators shall be able to disable a user login. This will not affect the views or models the user has stored, but it should block that user from logging in.

Administrators shall be able to delete a user. Deleting a user does not delete any models that user may have created. Custom System Views associated with that user should be deleted when the user is deleted.

Administrators also need to be able to manage passwords. Users forget passwords. Administrators shall be able to reset a password for a User name to any initial password. The user is required to change the initial password during the first log in.

Several functions enable users to get in and out of the system in a secure way. In order to Login, users shall enter a User name and a Password in order to gain access to the system. The user is required to change the initial password during the first log in. Upon successful entry and validation of a password, users will be directed to a default page. Once a user logs in, that login session will be valid until: 1) the user chooses to logout, 2) the browser window is closed, or 3) a period of one hour elapses with no activity.

Users shall be able to logout from any screen. Upon logout all models, sensors, and alarms running in any active views for this user should be stopped.

Users shall be able to change the password associated with their User name. To change a password, a user must first login to the system using the procedure outlined above. To change a password, the user must enter the current password, and the new password twice (to ensure it was entered correctly). The new password is validated for validity (valid character check only), and if valid, is updated. If the password contains invalid characters, an error message is displayed and the user is given the option to try a different new password.

Depending upon the design of the underlying data structures, Sensor Data Functions may be required in order to make the sensor raw data available to model builders. An administrator shall be able to add a sensor to the Software. Adding a sensor will make that sensor's data available to model builders and system monitors TABLE 2A shows the data required to add a sensor. Administrators shall be able to import the list of sensors from a spreadsheet. This will facilitate the initial set-up of the Software.

TABLE 2A

Sensor Data

| Data Name | Description | Comments |
|---|---|---|
| Sensor Name | | A sensor name can contain up to 25 characters, including spaces. It cannot contain the following characters: \ /*?"<>¦. Duplicate names should not be allowed. |
| Sensor Data Location | Where models should obtain the raw data from when using this sensor. | |
| Sensor Description | A description of what the sensor does. | A sensor description can contain up to 500 characters. Any valid characters can be included. This description will be used for help screens, and for describing the sensor when it is being added/deleted from system views. |
| Sensor Type | The type of sensor. | See TABLE 2 for a list of sensor types. |
| Measurement Unit | The unit of measure used in the raw sensor data. | One of the Measurement Options defined in TABLE 2. |
| Default Display Unit. | The default units in which the sensor value should be displayed to the user. If the Default Display Unit is different from the Measurement Unit, a conversion needs to occur | One of the Measurement Options defined in TABLE 2. |
| Default Time Frame | The default time frame to be used when this sensor is displayed (e.g., upon initial display, show the last five minutes of data). | Specified in minutes. |
| Default View | The default view for this sensor (e.g., strip chart). | One of the Valid Views defined in TABLE 2. |
| Data Acquisition Rate | The rate at which data is sampled from the data source. | For example, get data for this sensor every 2.5 seconds. |
| Data Display Rate | The rate at which data is supplied to the user's display. | For example, supply data to the user's display every 5 seconds. |

Administrators shall be able to delete a sensor from the Software. "Deleting" a sensor in affect, stops the collection of that sensor's data and makes the sensor unavailable for use in monitoring views and models. Steps to delete a sensor are as follows:

1. Display a list of the sensors that have been configured. Select the sensors to be deleted.
2. The software should check if the sensor is used in any models. If a sensor is used in a model, the administrator should not be able to delete the sensor. The software should display a list of the models that use the sensor, and the creators of those models. All models that use the sensor must be deleted prior to the deletion of the sensor. Sensors can be deleted even if they are included in System Views.
3. The software should confirm the successful deletion of the sensors.

Similar to the add function, Administrators shall be able to change the information about a sensor. Changing defaults will affect all users except those users that have explicitly over-ridden default values.

A number of overall system requirements have been identified. The Software should be accessible from any Windows PC equipped with an appropriate browser, such as Microsoft Internet Explorer and Netscape 4.5+ family of browsers.

Minimum hardware requirements are the same as the minimum requirements to run the I.E. 5.0. They are a 486 Dx166 MHz or higher computer processor. A Windows 95, Windows 98, or Windows NT 4.0 (SP 3 or higher) operating system. 16 MB (megabytes) of RAM for Windows 95 and Windows 98:; for Windows NT: 32 MB of RAM. 70 MB Hard Drive Space for install, 55 MB Required to run after restart.

The following have been identified as help requirements. The Software should make use of screen tips. These are text descriptions that appear when the cursor is hovered over a selection. Links should be available for short descriptions to long descriptions (e.g., if short model names are displayed for selection, an extended description should be available via hyperlink (perhaps in a pop-up window). Help should be available for most Software screen displays. In general, help screens should explain the available functions on the screen, and describe the outputs/displays. A user manual shall be provided with sections for Model Builders, Monitors, and System Administrator functions.

The following have been identified as security requirements. Passwords are not displayed or printed. Upon entry, password characters should be masked with asterisks. Passwords should be stored encrypted. If a user forgets a password, an administrator should reset the password and the user should be forced to do a password change upon next login. A capability must exist for encrypting data for certain sessions. If a user logs into the system from outside some pre-defined network space, all data transmitted to and from that user should be encrypted. All system access should be recorded. Time, Date, and Username, and user location (IP Address) should be recorded for each login and logout of the system. Both successful and unsuccessful login attempts should be recorded.

Operations Environment

The following operations environment requirements have been identified.

Inputs for the Software will be different based on where the software is being installed. At a high level, we can describe the input of the system to be Sensor Data or Model Data. The Software is primarily concerned with the streaming and analysis of real-time data. The monitoring tools will be important to the product. There are no specific requirements as to the exact look of the screen displays to be developed. These will be developed during the detailed design phase.

It is recommended that a prototype of the system be developed in concert with users familiar with both the needs of Model Builders and Monitors. This could be done via either qualitative testing with an actual prototype, or through focus groups with select groups of users (e.g., Monitors) using mock-ups of screens.

The following have been identified as MIS requirements. The Software shall provide a report of the alarms that have been generated for a given date/time range. All of the data logged for the alarms, including information about who cleared the alarms should be included. The Software shall provide a report of everyone who accessed the system for a given range of dates/times. Unsuccessful login attempts should also be included. The Software shall provide a report of the sensors that have configured. The report may include all of the information of TABLE 2A. The Software shall provide a report of the models that have been created. The report may include the information in TABLE 1.

Calculations will be required for the techniques described in TABLE 7 (Pre-Processing Techniques), TABLE 8 (Univariate Techniques), TABLE 10 (Multivariate Techniques), and TABLE 11 (SCREAM Techniques).

Interaction with OPC Servers will be the primary systems with which the Software will interface. OPC Servers will provide virtually all of the raw sensor data to the Software. If an OPC is not in place at a customer site, the Software deployment will need to include the installation and configuration of such a server. The Software will interface with ERP systems and process control systems.

Certain processing and service standards and standards are needed to meet the applicable objectives stated in the project objectives section and in the Statement of Work. Factoring in cost considerations, some standards have been deemed "nice to have" rather than critical.

Calculations may be accurate to six or fewer decimal places using single precision. By default, all numbers may be displayed rounded to four significant digits. Since not all of the Software will be developed at the same time, the implementation must allow for additional system components to be added easily in a modular fashion. Ideally, new system components should be able to be added without recompiling or changing the GUI. It is expected that the following will be the subject of modules:

1. Pre-Processing Techniques;
2. Univariate Algorithms;
3. Multivariate Algorithms;
4. SCREAM Algorithms;
5. Charts/Plots;
6. An Expert System; and
7. Interfaces to ERP and Process Control Systems.

It is estimated that approximately or fewer Monitors will be using the system at any given time, and that the Monitors will monitor a subset of the same process data. In one example, a subset of process data is approximately forty-four individual sensors and twenty models, with each model containing approximately seventy-five individual sensors. Therefore, in this example the Software should be able to process raw data from approximately 1,500 sensors, using the data from those sensors to feed twenty models. These calculations may be performed once every second.

As manufacturing plants are often in continuous operation, the Software should strive for 100% availability. The system should be structured such that it can run for weeks in an unattended mode. Since the Software will likely not be initially be used to actually control manufacturing processes, initial system availability may exceed 99.35% (no more than 10 minutes of downtime per 24-hour period), assuming 100% availability of the data sources.

Once the Software is actually implemented to control processes, the Software will interface with the actual process control systems. In this scenario, a more stringent system availability is required. For this latter phase of implementation, system availability may exceed 99.998% (no more than 1 hour of downtime per 30-day period). A system view containing 4 sensors and 4 models may take no longer than 1 second to update.

Appendices

TABLE 3 describes different types of plots that may be supported by Software.

TABLE 3

Plot Types

| Name | Description |
| --- | --- |
| Line Plot | A time series or trend chart examines the time-dependent behavior of a sensor by plotting the value of the sensor as a function of time. |
| Scatter Plot (2D) | A 2D Scatter Diagram examines the relationships between data collected for two different characteristics. Although the Scatter Diagram cannot determine the cause of such a relationship, it can show whether or not such a relationship exists, and if so, just how strong it is. The analysis produced by the Scatter Diagram is called Regression Analysis. |
| Scatter Plot (3D) | A 3D Scatter Diagram examines the relationships between data collected for three different characteristics. |
| Density | A density plot is a two-dimensional grid with a defined number of |

TABLE 3-continued

Plot Types

| Name | Description |
|---|---|
| Plot | increments for each of the two axes—the bottom and left-hand sides of the grid. The number of increments for each axis may be unequal in-general, but will typically be the same for this work. The grid lines could be shown but will not be shown here. To generate a density plot, three numbers are required: (1) the grid location on the bottom axis, (2) the grid location on the left axis, and (3) the value associated with the grid point. The value of the grid point determines the color to be shown in the grid via a lookup table or mapping function.. |
| Bar Chart | A bar chart is typically used to show the numerical values associated with a series of qualitative variables. Rather than showing the values as points or lines between points, a rectangular box is drawn between the point and a value of zero for each of the values. In this work, two-dimensional bar charts will be used and described. Typically, the bottom axis is reserved for the qualitative variables (e.g., sensor name, year) and the left axis is used for the quantitative value (e.g., contribution). |
| Dendogram | A tree diagram is used to graphically display the hierarchy and relationships amongst objects/samples. The distance from the beginning (where all samples are separate) to the junction between two or more samples or groups is a measure of the dissimilarity between samples or groups of samples. |

TABLE 4 plots attributes of the plots of TABLE 3. Attributes refer to the way in which a plot is displayed to the user and those things that the user may change in the plot. The user should be able to rotate the 3-D scatter plot.

TABLE 4

Plot Attributes

| Plot Name | Variables | Draw Lines Between Points? | Draw Symbols for Each Point? | Display Labels for Each Point? | Set/ AutoScale Axes? | Turn Grid On/Off (Major Axes)? | Show Alarm Limits | Aspect Ratio? | Plot Size? | Colors (fore/background, etc.)? |
|---|---|---|---|---|---|---|---|---|---|---|
| Line Plot | x, y | Yes | User Defined Default: No | No | User Defined Default: AutoScale | User Defined Default: Off | User Defined Default: Yes | User Defined Default: 1.6 | User Defined | User Defined |
| Scatter Plot (2D) | x, y | No | Yes | User Defined Default: Yes | User Defined Default: AutoScale | User Defined Default: Off | No | User Defined Default: 1.6 | User Defined | User Defined |
| Scatter Plot (3D) | x, y, z | No | Yes | User Defined Default: Yes | User Defined Default: AutoScale | Off | No | User Defined Default: 1.6 | User Defined | User Defined |
| Density Plot | x, y | N/a | N/A | N/A | N/A | N/A | N/A | User Defined Default: 1.0 | User Defined | User Defined |
| Bar Chart | x, y | No | No | No | User Defined Default: AutoScale | User Defined Default: Off | User Defined Default: yes | User Defined Default: 1.6 | User Defined | User Defined |
| Dendogram | N/A | N/A | N/A | N/A | N/A | N/A | N/A | No | User Defined | User Defined |

TABLE 5 describes some chart types supported in the Software.

TABLE 5

Chart Types

| Name | Description |
| --- | --- |
| Control Chart | A control chart is used to visually verify whether a given sensor is within pre-defined control limits. It is a trend chart with horizontal lines for the mean (or set point), upper control limit and lower control limit for that particular sensor. |
| Shewhart Plot | Control charts. |
| EWMA (Exponentially Weighted Moving-Average) | An EWMA (Exponentially Weighted Moving-Average) Chart is a control chart for variables data (data that is both quantitative and continuous in measurement, such as a measured dimension or time). It plots weighted moving average values. A weighting factor is chosen by the user to determine how older data points affect the mean value compared to more recent ones. Because the EWMA Chart uses information from all samples, it detects much smaller process shifts than a normal control chart would. |
| CUSUM (Cumulative Sum) | A CUSUM chart is a control chart for variables data that plots the cumulative sum of the deviations from a target. Because each plotted point on the Cu Sum Chart uses information from all prior samples, it detects much smaller process shifts than a normal control chart would. |
| Hotelling $T^2$ | The Hotelling $T^2$-statistic measures unusual variability within the calibration model space. |
| Q-Residual | Companion plot to Hotelling $T^2$ versus time. The Q-Residual statistic is the sum of squares of the errors between the data and its estimates and is a measure of the model mismatch. |
| SPE (Squared Prediction Error) | The Squared Prediction Error (SPE) chart may also be used to detect shifts. The SPE is typically associated with PLS rather than PCA. |
| Coherence Difference Matrix Norm | The Coherence Difference Matrix Norm chart is used by the Coherence-Based Fault Detection portion of SCREAM for identifying faults and process states. |
| Pareto Chart | A Pareto Chart is a vertical bar graph showing problems in a prioritized order, so it can be determined which problems should be tackled first. |
| Histogram | A single response (measurement, variable) is divided into a series of intervals, usually of equal length. The data are displayed as a series of vertical bars whose heights indicate the number of data values in each interval. |
| Contribution Plot (Scores) | The value of the loading for each of the sensors for one component in a model. The component to be plotted is chosen by the user. If the first principal component in a PCA model is chosen, the contribution plot will be a bar chart showing the loadings (which have positive and negative values) for PC#1 for each of the variables used in the model. |
| Contribution Plot (Errors) | When calculating the value of $T^2$, Q-residual or SPE for new data for a model that has been previously built, each sensor has a non-negative contribution. The contribution plot shows the value of the contribution for each of the sensors in this calculation. |
| Scores Plot | The Scores plot shows the distribution of the samples in the model. |
| Loadings Plot | Loading Charts provide an indication of the relative contribution of each Process Variable towards a given Principal Component for all groups in the analysis. |
| Parallel Coordinate Plot | By representing each observation not as a point in a scatter plot but as a series of unbroken line segments connecting parallel axes. Each axis represents a different variable. |
| Coherence Chart | A square checkerboard plot (or density plot). The number squares along one side equals the number of sensors. The color of the box is related to the degree of covariance between two sensors. The diagonal elements always have the color associated with a value of unity since a sensor is perfectly correlated with itself. The Coherence Chart is used by the Coherence-Based Fault Detection portion of SCREAM to identify relationships between sensors. |
| Coherence Difference Chart | The Coherence Difference Chart is used to visualize a change from an expected process state. If the current state is identical to the expected process state, the entire chart will be black (e.g., no difference). Colors appear as differences are detected. If only a single box is a different color, this indicates a change in the coherence between two sensors. (The identity of these sensors can be determined by looking |

TABLE 5-continued

Chart Types

| Name | Description |
|---|---|
| | at the axes.) If an entire line is a different color and cross-hairs are visible, this indicates a change in the coherence between one sensors and all other sensors in the sub-system. |

Table 6 describes the contents of the chart types of TABLE 5.

TABLE 6

Chart Contents

| | | Variables | | | | |
|---|---|---|---|---|---|---|
| Name | Plot Type | X | y | z, ρ | User-Selected Options | Show Alarm? |
| Control Chart | Line Plot | Time | Sensor value | N/A | y | If Defined |
| Shewhart Plot | Line Plot | Time | Sensor value | N/A | y | If Defined |
| EWMA (Exponentially Weighted Moving-Average) | Line Plot | Time | Sensor value | N/A | y | If Defined |
| CUSUM (Cumulative Sum) | Line Plot | Time | Sensor value | N/A | y | If Defined |
| Hotelling $T^2$ | Line Plot | Time | Hotelling $T^2$ | N/A | Model | Yes |
| Q-Residual | Line Plot | Time | Q-Residual | N/A | Model | Yes |
| SPE (Squared Prediction Error) | Line Plot | Time | SPE | N/A | Model | Yes |
| Coherence Difference Matrix Norm | Line Plot | Time | Matrix norm | N/A | Model | Yes |
| Pareto Chart | Bar Chart | Variable Name | Number of Occurrences | N/A | Condition | None |
| Histogram | Bar Chart | Value | Number of Occurrences | N/A | Variable | None |
| Contribution Plot (Scores) | Bar Chart | Variable Name/Number | Value (PC #) | N/A | Point in Scores Plot; PC Number | Yes |
| Contribution Plot (Errors) | Bar Chart | Variable Name/Number | Value ($T^2$, Q, SPE) | N/A | Point in $T^2$, Q, SPE Plot | Yes |
| Scores Plot | Scatter Plot (2D, 3D) | $PC^2$, Time | PC | PC | x, y, z | None |
| Loadings Plot | Scatter Plot (2D, 3D) | $PC^2$, Time | PC | PC | x, y, z | None |
| Parallel Coordinate Plot | Line Plot | PC Number | Value of Corresponding PC | N/A | Model | None |
| Coherence Chart | Density Plot | Variable Name/Number | Sensor Name/Number | Coherence | Model Subsystem | None |

[2]PC = Principal Component.

TABLE 7 shows some data pre-processing techniques. For each technique, the required inputs, expected outputs, and information stored with the model are defined.

TABLE 7

Pre-Processing Techniques

| Pre-Processing Technique Name | Pre-Processing Technique Description |
|---|---|
| Data Centering and Scaling (auto-scaling) | Eliminates the units associated with different measurements (e.g., temperature, pressure) and scales the data by the variance so that all sensor responses are approximately the same scale (e.g., typically between −3 and 3) is required for PCA and PLS but is not required for SCREAM elements. |
| Data Synchronization | This feature specifically targets time lags between different sensors during data acquisition and uses a buffer to match time stamps (as closely as possible) for different sensors/systems. |
| Data Transformation/ Linearization | A transform is applied to the data to eliminate effects such as seasonal trends and/or transform the data into a linear form. |
| Elimination of | A useful technique to reduce computation time if |

TABLE 7-continued

Pre-Processing Techniques

| Pre-Processing Technique Name | Pre-Processing Technique Description |
| --- | --- |
| Redundant Variables | computation time becomes an issue during the design phase of the project. |
| Estimation of Missing Data | Data for one sensor may be missing for a variety of reasons (e.g., sensor removed, sensor not polled, reading not properly transmitted). A scheme must be developed for estimating the value of this sensor in order to use PCA or PLS models. |
| Noise Filtering | Techniques (e.g., Savitzky-Golay, exponential moving average) to reduce the effects of noise. If the noise characteristics of the sensor change, most noise filtering techniques will not remove these characteristics. Thus, the noise model in SCREAM for anomaly detection is still valid even after noise filtering. |
| Outlier Detection | This step is used during model building but not while monitoring. An "outlier" is a point that is statistically quite different from all other points. Outliers must be removed during model building to obtain a good estimate of normal operations. |
| Variable Selection | Related to elimination of redundant variables. The purpose of this technique is to quickly screen the sensors and determine which of these sensors are the most significant without having to build a complex model and calculate loadings. |

Data centering and scaling are used when building PCA or PLS models. Auto-scaling for multi-way PCA is not as straightforward as typical two-dimensional PCA models. Inputs During Model Building are sensor readings over time. Expected Outputs During Model Building are auto-scaled sensor readings over time. Information Saved with Model are average and standard deviation for each sensor for all data used to build the model. Inputs During Model Monitoring are sensor readings over time and average and standard deviation for each sensor for all data used to build the model (from information saved). Expected Outputs During Model Monitoring are auto-scaled sensor readings over time, based on the auto-scaling parameters used to build the model.

Data synchronization is important when acquiring data from multiple systems in multiple locations. When linked directly to a single OPC server, data synchronization may not be an issue. Typically a buffer is used to acquire data. Inputs during model building are sensor readings over time. Expected outputs during model building are sensor readings over time so that time stamps for all sensors types are approximately equal. Inputs during model monitoring are sensor readings over time. Expected Outputs During Model Monitoring are sensor readings over time so that time stamps for all sensors types are approximately equal.

Missing data has an important effect on the analysis for certain models. If data is missing for either a PCA or PLS model and. the loading is large enough, then the model will produce meaningless results. The effect of missing data is riot nearly as vital for the algorithms of SCREAM, and missing data may not be estimated—nor replaced for SCREAM models.

If there is a missing value for a PCA or PLS model, there are three ways to handle the issue:

1. Do not include data for analysis when there are missing values. If the problem persists, report an error.

2. If the problem persists and cannot be fixed, build a new model that doesn't include the sensor(s) with missing values.

3. Estimate the value (e.g., use an average value, use the prior value, use a PLS model and inherent redundancy in subsystem, etc.). If the problem persists, report an error.

Where missing values are to be replaced, inputs during model building include sensor readings over time. Expected outputs during model building are sensor readings over time with missing values replaced. Required inputs during model monitoring include sensor readings over time. Expected outputs during model monitoring include sensor readings over time with missing values replaced.

The purpose of noise filtering is to eliminate spikes and not change the structure of the underlying noise. Inputs during model building include sensor readings over time. Expected outputs during model building include sensor readings over time after noise filtering. Parameters saved with a model are not specific to a model but are universal. Inputs during model monitoring include sensor readings over time. Expected outputs during model monitoring include sensor readings over time after noise filtering.

TABLE 8 shows various univariate techniques.

TABLE 8

Univariate Techniques

| Univariate Technique Name Average | Univariate Technique Description |
|---|---|
| Average | The arithmetic mean gained by adding two or more quantities and then dividing by the total number of quantities. |
| Standard Deviation | A statistical measure of how widely individual items in a frequency distribution differ from the mean. |
| Capability Index (Cp) | A measure of the ability of the process to make product within specification. Defined as: (high spec − low spec)/(6 * sigma), where sigma is the measured standard deviation. |
| Upper Capability Index (Cp, u) | Defined as: (average value − lower spec)/(3 * sigma) |
| Lower Capability Index (Cp, 1) | Defined as: (high spec − average value)/(3 * sigma) |
| Capability Index 2 (Cp, m) | Accounts for deviation from a target value. Defined as: $Cp/sqrt(1 + (average - target)^2/sigma^2)$ |
| Instability Index (St) | Used to examine the stability or instability of a process over time. Defined as: (Number of out-of-control data points ÷ Total number of data points) × 100 |

For the univariate techniques shown in TABLE 8, TABLE 9 describes the required inputs and expected outputs.

TABLE 9

Inputs And Outputs For Univariate Techniques

| Univariate Technique Name | Inputs | Expected Outputs |
|---|---|---|
| Average | Sensor reading over time | Average |
| Standard Deviation | Sensor reading over time | Standard Deviation |
| Capability Index (Cp) | High Specification<br>Low Specification<br>Standard Deviation | Cp (Capability Index) |
| Upper Capability Index (Cp, u) | Average Value<br>Low Specification<br>Standard-Deviation | Cp, u (Upper Capability Index) |
| Lower Capability Index (Cp, 1) | Average Value<br>High Specification<br>Standard Deviation | Cp, 1 (Lower Capability Index) |

TABLE 9-continued

Inputs And Outputs For Univariate Techniques

| Univariate Technique Name | Inputs | Expected Outputs |
|---|---|---|
| Capability Index 2 (Cp, m) | Cp (Capability Index)<br>Average Value<br>Target Value<br>Standard Deviation | Cp, m (Capability Index 2) |
| Instability Index (St) | # of Out of Control Points<br>Total # of Control Points | St (Instability Index) |

TABLE 10 shows some of the multivariate techniques expected to be employed in conjunction with the Software.

TABLE 10

Multivariate Techniques

| Multivariate Technique Name | Multivariate Technique Description |
|---|---|
| ACE (Alternating Conditional Expectations) | A multivariate non-parametric regression procedure where the objective is identical to the Additive Model (AM) but extends the capabilities of AM by allowing a functional transformation of the response variable as well as the explanatory variables. |
| AM (Additive Model) | A multivariate non-parametric regression procedure that finds sets of functions to transform the explanatory variables to maximize the correlation between the transformed explanatory variables and the response variable. |

TABLE 10-continued

Multivariate Techniques

| Multivariate Technique Name | Multivariate Technique Description |
|---|---|
| AVAS (Additivity and Variance Stabilization) | A multivariate non-parametric regression procedure that is an extension of Alternating Conditional Expectations (ACE) and imposes variance-stabilizing transformations. |
| CDA (Canonical Discriminant Analysis) | CDA is one of the algorithms in the larger class of discriminant algorithms that is a subset of factor analysis. A discriminant algorithm requires supervised learning and each class is known and appropriately labeled. Discriminant algorithms calculate the loadings to maximize the variance between classes. |
| CLS (Classical Least Squares) | A method of multivariate calibration. A CLS model assumes the form $X = CS + E$, where $X$ is the response data, $S$ is a matrix of pure component responses, $C$ is a matrix of weights (concentrations) and $E$ is a noise or error matrix. An estimate of $S$ is calculated by $(C^tC)^{-1}C^tX$. |
| Genetic Algorithms | Search procedures that use the mechanics of natural selection and natural genetics. The basic operation of a genetic algorithm is simple. First a population of possible solutions to a problem is developed. Next, the better solutions are recombined with each other to form some new solutions. Finally the new solutions are used to replace the poorer of the original solutions and the process is repeated. |
| HCA (Hierarchical Cluster Analysis) | HCA is one of the algorithms in the larger class of cluster analysis. Classification is accomplished in an unsupervised mode (based on distances/similarities) and the results are shown in a dendogram. |
| ILS (Inverse Least Squares) | A method of multivariate calibration. ILS models assume the form $y = Xb + e$, where $y$ is a property to be predicted, $X$ is the measured response, $b$ is the vector of weights and $e$ is the noise or error vector. |
| K-means | K-means is one of the algorithms in the larger class of cluster analysis. For K-means the user inputs the number of expected classes and loadings are calculated to group the scores into this many clusters. |
| k-Nearest Neighbors (kNN) | kNN is one of the algorithms in the larger class of cluster analysis. Supervised learning is required since each class must be labeled. A new sample is identified as the class that has k neighbors nearest the unknown, or the largest number of neighbors within the k nearest neighbors. |
| LOESS (Locally Weighted Regression) | The LOESS model performs a linear regression on points in the data set, weighted by a kernel centered at x. The functional form of the kernel changes depending on the sensitivity and span required for the given problem. |
| MARS (Multivariate Adaptive Regression Splines) | A multivariate non-parametric regression procedure. The MARS procedure builds flexible regression models by fitting separate splines (or basis functions) to distinct intervals of the predictor variables. |
| MLR (Multiple Linear Regression) | A method of inverse least squares. The weights can be calculated by $b = X^+y$, where $X^+$ is a pseudo-inverse. The pseudo-inverse is defined $(X^tX)^{-1}X^t$. |
| Multi-Block PCA | PCA models are developed for each subsystem or unit operation. The outputs of the models for subsystems are used as inputs for a single process model. |
| Multi-Way PCA | Multi-Way PCA is useful for batch processes or other transient data (a window of data for a continuous process). Rather than the typical 2-dimensional array for PCA, multi-way PCA is a 3-dimensional array that still uses PCA for analysis. Specific algorithms include PARAFAC and Tucker3. |
| Neural Networks, Neural Nets (NN) | Neural Nets estimate relationships between one or several input variables called independent variables |

TABLE 10-continued

Multivariate Techniques

| Multivariate Technique Name | Multivariate Technique Description |
|---|---|
| | or descriptors (e.g. absorbance at different wavelengths) and one or several output variables called dependent variables or responses (e.g. concentration of a target analyte), without any a priori assumption of a specific model form. Information in a NN is distributed among multiple cells (nodes) and connections between the cells (weights). |
| PCA (Principal Component Analysis), PA | PCA is one of the algorithms in the larger class of factor analysis. In PCA factors are calculated by forming a linear combination of the sensor responses. PCA can be used in an unsupervised mode. The coefficients (loadings) are calculated based on capturing the greatest amount of variance subject to orthogonal constraints. |
| PCR (Principal Components Regression) | A method of inverse least squares that is commonly used to deal with ill-conditioned regression problems by regressing the property of interest (y) onto PCA scores. The pseudo-inverse is defined as $P_k(T_k^t T_k)^{-1} T_k^t$, $P_k$ and $T_k$ have the usual definitions for PCA—loadings and scores, respectively. |
| PLS (Partial Least Squares) | A method of Inverse Least Squares (ILR) that addresses one of the shortcomings of Principal Components Regression (PCR). In PCR the loadings are calculated without using the information contained in the property of interest even when the data is available. PCR captures maximum variance of X (just like PCA), MLR achieves maximum correlation of X with y (at the expense of variance within x), and PLS maximized the covariance between X and y. The pseudo-inverse is calculated by $W_k(P_k^t W_k)^{-1}(T_k^t T_k)^{-1} T_k^t$, where W is additional set of weights to maintain orthogonality. |
| PPR (Projection Pursuit Regression) | A multivariate non-parametric regression procedure. Projects the data onto a smaller number of dimensions and then allows rotation to pursue interesting features. |
| RPR (Recursive Partitioning Regression) | A multivariate non-parametric regression procedure that was designed to find local low-dimensional structure in functions that shows high-dimensional global dependence. The output is a decision tree or dendogram. |
| SIMCA (Soft Independent Modeling of Class Analogy) | SIMCA considers each class separately. For each class separately a principal component analysis is performed which leads to a PC model for each class (so-called disjoint class models). Supervised training is required for classification. |

One multivariate technique listed in TABLE 10 is principal component analysis (PCA). PCA involves a procedure that transforms a number of (possibly) correlated variables into a (smaller) number of uncorrelated variables called principal components. PCA is included so that model builders can perform multivariate statistical process control with a simple—technique that focuses on the process state. PCA is a well-documented method in literature for process control, and the techniques for detecting anomalies are well tested.

For model building, inputs for PCA include sensor readings over time for multiple sensors arranged in a two-dimensional matrix. The number of columns equals the number of sensors, and the number of rows equals the number of time stamps. Expected outputs for PCA include:
1. The number of PCs (Principal Components)
2. For each PC, a loading value for each sensor. The loadings are saved in a two-dimensional matrix. The number of columns equals the number of principal components, and the number of rows equals the number of sensors.
3. Hotelling $T^2$ Control Limit
4. Q-Residual Control Limit Depending on the number of PCs, one of the following charts will be the default. For one PC, a scores plot is the default having PC1 (Principal Component 1) on the y-axis and time on the x-axis. A loadings plot may also be employed having PC1 on the y-axis and time on the x-axis. For two PCs a scores plot is the default having PC2 on the y-axis and PC1 on the x-axis. A loadings plot with the same axes may also be used. For three or more PCs, a scores plot is the default having PC3 on the z-axis, PC2 on the y-axis, and PC1 on the x-axis. A loadings plot with the same axes may also be used. If there are more than three PCs, the user should be given the option of selecting which PCs to display, and which of the three views to use.

Automatic alarms may be triggered under two conditions. A severity 3 alarm is triggered, and text indicating "Control Limit Exceeded—$T^2$", when the condition Hotelling $T^2$ (when model is run)>Hotelling $T^2$ Control Limit. A severity 4 alarm is triggered, and text indicating "Control Limit Exceeded—Q", when the condition: Q-Residual (when model is run)>Q-Residual Control Limit.

For model monitoring using PCA, inputs include data for all "Sensors Used" in the model at a given point in time, and a loading value for each sensor for each principal component (based on model results). Expected outputs include scores for each principal component, hotelling $T^2$ at a given point in time, and Q-Residual at given point in time. Top level charts/plots used include a default display of Hotelling $T^2$ value as a function of Time displayed using Hotelling $T^2$ vs. Time chart. Each point represents a measure of deviation (Hotelling $T^2$) from the model at a point in time. Points that are outside the expected control limit should be highlighted. For Q-Residual value, the default display is Q-Residual value as a function of Time displayed using a Q-Residual vs. time chart. Each point represents a measure of deviation (Q-Residual) from the model at a point in time. Points that are outside the expected control limit should be highlighted.

Second level charts/plots used include:
1. From a point on the Hotelling $T^2$ as a function of Time chart, a default display of the top 10 Sensors contributing to the Hotelling $T^2$ value using a contribution plot. The sensors values are sorted highest to lowest.
2. From a point on the Q-Residual as function of Time chart, a default display of the top 10 Sensors contributing to the Q-Residual value using a contribution plot. The sensors values are sorted highest to lowest.

Third level charts/plots used include, from a sensor selected on either of the contribution plots in Level Two, a default display control chart for sensor chosen. Begin plot, [n units in time] before the point in time selected in Level 2, and end the plot [n units in time] after the point selected in Level 2. Get n from the sensor's "Default Time Frame" in TABLE 2A).

Another multivariate technique listed in TABLE 10 is partial least squares (PLS). PLS is included so that model builders can develop virtual, inferential or soft sensors for processes. There are two main reasons to use virtual sensors. Virtual sensors may be used to correlate commonly measured process variables (e.g., pressure, temperature, flow rate) with infrequently measured lab results (e.g., density, pour point) so that the lab result can be approximated on-line, in real-time at the same acquisition rate as the process variables. Virtual sensors may also be used to create a virtual redundant sensor by correlating the measurements of many process variables with one other process variable. For instance, there is a detector at the end of an emissions stack that measures the concentration of a specific gas being released to the environment. The EPA requires a redundant sensor for such cases and has recently accepted the results of a virtual redundant sensor instead of a hard redundant sensor.

For Model Building using PLS, inputs include sensor readings over time for multiple sensors arranged in a two-dimensional matrix. The number of columns equals the number of sensors, and the number of rows equals the number of time stamps. Another input is target property measurement over time. Expected outputs from PLS Model Building include the number of latent variables, the set of loadings (one per sensor per latent variable), a standard error of prediction; a measurement of how good the model was given the input data, and a Residual Control Limit. Top level charts/plots used include a Loadings Plot of latent variables. A severity 4 alarm may be triggered where Residual (when model is run)>Residual Control Limit, and text indicating "Control Limit Exceeded—PLS Residual" will be displayed.

For Model Monitoring using PLS, inputs include data for all "Sensors Used" in the model at a given point in time, and loadings by sensor, with one loading per latent variable. Expected Outputs include predicted virtual sensor (i.e., target property) value, and residual value (measure of the model validity for the input data). Top level charts/plots used include residual value as a function of Time displayed using an x vs. y chart. Each point represents a measure of deviation (the Residual) from the model at a point in time. Points that are outside the expected control limit should be highlighted. In a virtual sensor control chart. Each point represents the predicted value of the virtual sensor at a point in time. Points that are outside the expected control limit should be highlighted. Second level charts/plots used include from either plot a contribution plot in which each bar represents an individual sensor. Either residual values or predicted virtual sensor values can trigger alarms:

Another multivariate technique listed in TABLE 10 is Multi-block PCA. Multi-block PCA is included so that models can be built for individual unit operations (or subsystems) during the evaluation period and the output of these models can then be used as inputs to an overall process model. Building an overall process model is a simpler process for the model builder if there are existing models for unit operations. There are additional benefits to this technique. For example, the overall process model does not require every sensor in the plant to be an input since the models for unit operations determine the important variables to be passed to the overall model; thus, the computation time is reduced by a factor approximately equal to the number of unit operations. When an anomaly is detected in the overall process model, the model can first determine which unit operation(s) caused the fault and then determine which sensor(s) caused the disturbance.

Inputs during model building include sensor readings over time, virtual sensor readings over time, and outputs from other PCA models. Expected outputs for PCA include:
1. The number of PCs (Principal Components)
2. For each PC, a loading value for each sensor. The loadings are saved in a two-dimensional matrix. The number of columns equals the number of principal components, and the number of rows equals the number of sensors.
3. Hotelling $T^2$ Control Limit
4. Q-Residual Control Limit Depending on the number of PCs, one of the following charts will be the default. For one PC, a scores plot is the default having PC1 (Principal Component 1) on the y-axis and time on the x-axis. A loadings plot may also be employed having PC1 on the y-axis and time on the x-axis. For two PCs a scores plot is the default having PC2 on the y-axis and PC1 on the x-axis. A loadings plot with the same axes may also be used. For three or more PCs, a scores plot is the default having PC3 on the z-axis, PC2 on the y-axis, and PC1 on the x-axis. A loadings plot with the same axes may also be used. If there are more than three PCs, the user should be given the option of selecting which PCs to display, and which of the three views to use.

Automatic alarms may be triggered under two conditions. A severity 3 alarm is triggered, and text indicating "Control Limit Exceeded—T2", when the condition Hotelling $T^2$ (when model is run)>Hotelling $T^2$ Control Limit. A severity 4 alarm is triggered, and text indicating "Control Limit Exceeded—Q", when the condition: Q-Residual (when model is run)>Q-Residual Control Limit.

Inputs for model monitoring utilizing Multi-block PCA include data for all "Sensors Used" in the model at a given point in time, data for all virtual sensors used in the model at a given point in time, and outputs from other PCA models. Expected outputs from model monitoring include scores for each principal component, Hotelling $T^2$ at a point in time, and Q-Residual at a point in time. Values for hotelling $T^2$ and Q-Residual can trigger alarms.

The same charts/plots used on the top and second level as with PCA. Third level charts/plots are also the same as PCA, except if a sensor selected on either of the contribution plots in Level Two is:
1. An output from another PCA model, then display Hotelling T2 and Q-Residual as a function of time for that particular model. Use the same hierarchy for PCA models as usual.
2. An output from a virtual sensor, then display the residual value as a function of Time displayed using an x vs. y chart. Each point represents a measure of deviation (the Residual) from the model at a point in time. Points that are outside the expected control limit should be highlighted. Use the same hierarchy for PLS models as usual.

Another multivariate technique of TABLE 10 is Canonical Discriminant Analysis (CDA). CDA can perform two functions: identification of anomalies, and data mining. There are other ways for identifying anomalies, for example expert systems. However, the Software already has CDA coded in multiple forms and should be easy to implement. CDA would no longer be required for process monitoring once an expert system is in place.

CDA is a useful technique for data mining and provides one of the discriminant algorithms for performing supervised analysis. The loadings of a CDA may be vastly different than the loadings of a PCA model for the same data set since a CDA model attempts to maximize the variance between classes. PCA calculates loadings by maximizing the variance—captured, regardless of its source. Note a class is simply a collection of data that is given a label and is required for supervised training. For instance, the class names can be a condition (e.g., normal, start-up) or a recipe (e.g., HA-123, SBR-542) or any other collection of data that can be given a common label.

Inputs for model building using CDA include:
1. Sensor readings over time for multiple sensors arranged in a two-dimensional matrix. The number of columns equals the number of sensors, and the number of rows equals the number of time stamps.
2. A label associated with each time stamp (or series of time stamps) that properly identifies the condition of the process during the time period (e.g., normal, start-up, shutdown, idle).
3. One of the process conditions must be labeled 'default' state for alarms. Typically, the class containing normal operating conditions for a given product/recipe is the default condition.
4. Classification limit. The limit for probability that is used to determine whether or not a given process state is a member of one of the classes in the model.

Outputs expected from CDA include the number of PCs (Principal Components), and for each PC, a loading value for each sensor. The loadings are saved in a two-dimensional matrix. The number of columns equals the number of principal components, and the number of rows equals the number of sensors.

The same top level charts/plots are used as in PCA model building. Automatic Alarms are triggered by the probability of the current state being part of the 'default' class. If the probability falls below a certain limit, then an alarm is sounded. Furthermore, if the probability is high for the current state as being part of another class, then report the identified class.

CDA can also be used for model monitoring and data mining. Inputs for model monitoring include data for all "Sensors Used" in the model at a given point in time, and also include loading value for each sensor for each principal component (based on model results). The library includes statistics regarding scores for each class in the model.

Expected outputs include an identifier such as one of the labels used while building the model, and also include a measure of the likelihood/probability that the identifier is correct. For data mining top level charts/plots used are the same as CDA model building. CDA would likely not utilize plots for real-time process monitoring. For real-time monitoring, CDA will be used to identify the state of the process or unit operation based on the results of underlying models. The probability of the current state being part of the 'default' class can trigger an alarm. If the probability falls below a certain limit, then an alarm is sounded. Furthermore, if the probability is high for the current state as being part of another class, then report the identified class.

Another multivariate approach of TABLE 10 is Multi-way PCA. Multi-way PCA will be evaluated along with the components of SCREAM and commercially available software when evaluating fault detection capabilities for process dynamics.

Multi-way PCA is a natural choice since PCA is already included, algorithms are available for evaluation in Matlab toolboxes, and the technique serves as a good benchmark when discussing benefits of other algorithms. There is one major difference between PCA and multi-way PCA. PCA does not account for the fact that the data was acquired in a sequential manner. Multi-way PCA takes advantage of this information. If multi-way PCA exhibits features during the evaluation period that the components of SCREAM do not, then multi-way PCA would be evaluated for inclusion in the initial development phase. Specific algorithms already exist for this calculation, including PARAFAC, Tucker3, tri-linear decomposition, etc.

Inputs for multi-way PCA include sensor readings over-time for multiple sensors for multiple batches (or time windows in a continuous process) are arranged in a three-dimensional matrix. The number of columns equals the number of sensors, the number of rows equals the number of batches, and the depth of the array equals the number of time stamps. The outputs expected, automatic alarms, and top, second, and third level charts/plots would be the same as for PCA model building.

For monitoring of a model using multi-way PCA, inputs include sensor readings over time for multiple sensors for multiple batches (or time windows in a continuous process) are arranged in a three-dimensional matrix. The number of columns equals the number of sensors, the number of rows equals the number of batches, and the depth of the array equals the number of time stamps. Another input for multi-way PCA model monitoring is a loading value for each sensor for each principal component (based on model results). The outputs expected, automatic alarms, and top, second, and third level charts/plots would be the same as for PCA model monitoring.

TABLE 11 shows the SCREAM techniques supported by the Software. Initially the focus will be upon the pre-processing portion of the Model Filter, coherence-based fault detection, and dynamical invariant anomaly detection. These three boxes will allow sufficient evaluation of the SCREAM system. Subsequently, the remaining SCREAM components will be developed. This development phase will also include the other portions of the Model Filter, if required—integration with models would be a requirement if the relationship requires more than just running simulation data through the algorithms before running real data.

TABLE 11

SCREAM TECHNIQUES

| SCREAM Technique Name | Description |
| --- | --- |
| Model Filter ("Grey Box") | Separates time-correlated sensor data (known physical behavior, stationary components, linear components, non-linear components, noise). Combines data components with physical or heuristic models of arbitrary quality. |
| Symbolic Data Model | Considers all discrete signals from the system. Detects and enumerates state mismatches and explicit failures. Identifies operating mode of the system. Predicts state of system components. |
| Coherence Based Fault Detector | Computes a single, complex, cross-signal invariant ("Coherence Plot") for each subsystem. Matches invariant to mode-indexed invariant prediction. Identifies and quantifies deviations (single signal departures, multiple signal departures, known or novel events). Identifies return to expected behavior. Isolates deviation to sensors, sensor pairs, and timetags events. |
| Dynamical Invariant Anomaly Detector | Examines individual signals (either signals with low redundancy or signals identified by Coherence Detector). Extracts invariant features from corrected sensor data. Identifies and quantifies deviations (confirms or augments cross-channel findings, classifies as known or novel events. |
| Informed Maintenance Grid (IMG) | Studies the evolution of cross-channel behavior over the medium- and long-term operation of the system. |
| Prognostic Assessment | Feature-based and Coherence-based trending to failure. Inclusion of physics models. Determination based on performance characteristics and fused information. Capability to use failure models or fault data. |
| Predictive Comparison | Combines numeric and symbolic results into a unified result. Correlates detected events with predicted states to derive predicted failures and un-modeled events. Processes explicit anomalies and correlates them to detected events. |

The Model Filter SCREAM technique of TABLE 11 is used to compare the current sensor measurements to the results of a theoretical (or numerical) model. A difference is calculated for each sensor in the model, and these differences are passed to the Dynamical Invariant Anomaly Detector along with all sensor responses.

Inputs during Model Building include sensor readings over time. Expected outputs during Model Building include sensor differences over time. Information saved with model includes the results for the theoretical model, and the sensors used in the theoretical model. It is unlikely that every sensor will be included in the theoretical model. Inputs during Model Monitoring include sensor readings over time. Outputs expected during Model Monitoring include sensor differences over time.

The Coherence-Based Fault Detector SCREAM technique of TABLE 11 identifies single sensor faults (e.g., excessive noise, sensor drift, sensor failure) and multiple sensor anomalies (e.g., unexpected feedback, complex failures) by evaluating the correlation between different sensors within a subsystem. Separate models are built for each unit operation or sub-system to reduce the needless complexity and size of a single process model.

Inputs during model building include a list of sensors to be modeled, sensor readings over time, a label for mode of operation (or class), such as steady-state, start-up, etc., and a definition of which of the modes of operation is the default. Expected outputs during model building include a window of time used in calculations, a statistical description for the coherence for each sensor pair for process state, and a control limit for matrix norm for coherence difference plot. Top level charts/plots used include a coherence plot. An automatic alarm of severity 3 is triggered, and text is displayed stating "Control Limit Exceeded—Coherence Miatrix Norm", when the coherence matrix norm (when model is run)>coherence matrix norm Control Limit.

For Model Monitoring using Coherence Based fault detection, inputs include data for all "Sensors Used" in the model at a given point in time and all prior times within the time window specified in the model, as well as a list of sensors to be modeled. The library includes statistics regarding the coherence plots for each state/class. Expected Outputs include coherence for each sensor pair, a matrix norm for coherence difference plot when using the default for the calculation, and identification of process state based on comparison with library if matrix norm is too large for default state. If matrix norm is too large for all states in library, then expected output would be 'unknown process state.'

Charts/plots used on the top-level include a default display of the Coherence Difference Matrix Norm as a function of Time displayed using Coherence Difference Matrix Norm vs. Time chart. Each point represents a measure of deviation (matrix norm) from the default process state. Points that are outside the expected control limit should be highlighted. Charts/plots used on the second level include a default display of Coherence difference plot for the current process conditions and the default process state. The coherence difference plot may be made for current process conditions and the identified process state if a process state other than the default state was identified. Values of the coherence difference Matrix Norm (using default process state to calculate difference), can trigger alarms.

The Dynamical Invariant Anomaly Detector SCREAM technique of TABLE 11 is used to detect faults in single channels and is used to either confirm or augment the findings during coherence-based fault detection. The methods used can detect a change in the underlying structure (e.g., a change in frequency) but cannot detect a change in operation (e.g., a change in amplitude).

An autoregressive model is built to capture linear dynamics. The residuals from this model are then modeled separately by (1) an artificial neural network to capture the nonlinear behavior of the dynamics and (2) the moments of the probability distribution to model the noise characteristics. A model should not be built for every sensor and should only be used for critical sensors. If all sensors are modeled, then the rate of false alarms is not much smaller than current levels. Additionally, the computation time may be prohibitive.

Inputs for model building include sensor readings over time during normal operation. Expected Outputs from the model include:
1. window of time used in calculations, average and standard deviation for each of the coefficients in the linear autoregressive (AR) model for each sensor;
2. control limits for AR coefficient difference;
3. average and standard deviation for each of the coefficients in the neural network (NN) model for each sensor;
4. control limits for NN coefficient difference;
5. average and standard deviation for each of the probability distributions (PD) for each sensor; and
6. control limits for PD difference.

An alarm of severity 3 may automatically be triggered under a number of conditions. For example, when the AR coefficient difference (when model is run)>AR coefficient difference Upper Control Limit, or AR coefficient difference (when model is run)<AR coefficient difference Lower Control Limit, a message is displayed stating that "Control Limit Exceeded—sensor name, linear dynamics". Similarly, when the NN coefficient difference (when model is run)>NN coefficient difference Upper Control Limit, or NN coefficient difference (when model is run)<NN coefficient difference Lower Control Limit, a message is displayed stating that "Control Limit Exceeded—sensor name, non-linear dynamics". Finally, when the PD difference (when model is run) >PD difference Upper Control Limit, or PD coefficient difference (when model is run)<PD difference Lower Control Limit, a message is displayed stating that "Control Limit Exceeded—sensor name, noise characteristics".

For model monitoring using Dynamical Invariant Anomaly Detector, inputs include sensor readings over time during normal operation, the window of time used in calculations, and the expected process state (Default: normal; phase 2: based on symbolic data). The library includes average values and control limits for autoregressive (AR) coefficient difference for each coefficient for all defined process states, average values and control limits for neural network (NN) coefficient difference for each coefficient for all defined process states and average values and control limits for probability distribution (PD) difference for each distribution for all defined process states.

Expected Outputs of the model include current data such as AR coefficient difference, NN coefficients, and PD values, and also the difference between current and expected values for AR, NN, and PD. Values of AR coefficient difference, NN coefficient difference, and PD difference can trigger alarms. Top level charts/plots used are user-selectable but do not include a default since every sensor will have the following charts:
1. control chart for AR coefficient difference;
2. control chart for NN coefficient difference; and
3. control chart for PD difference.

Glossary

The following represents a concise explanation of certain terms referenced in the above discussion. This listing is for informational purposes only, and is not intended to define or otherwise limit the terms. Other meanings of the listed terms may be understood.

Bluetooth: A set of radio wave communication protocols and standards that enable low-cost, high-speed communication among devices that are within 10 meters (approximately 33 feet) of each other (this distance can be increased to 100 meters with amplifiers or increasing the transmit power).

Foundation Fieldbus: A bi-directional communications protocol used for communications among field instrumentation and control systems. Foundation Fieldbus is the only digital fieldbus protocol developed to meet the ISA's SP50 requirements, and is the only protocol that meets stringent, mission-critical demands for intrinsic safety and use in hazardous areas, volatile processes and difficult regulatory environments.

GUI: Graphical User Interface.

HMI (Human Machine Interface): Also known as man machine interface. Systems for operating plants, monitoring processes and backing up data in industrial manufacturing processes. Smaller packaging machines have simple control units while powerful visualization systems based on industrial PCs are often used in complex packaging lines. Such systems display the operating processes in a machine as flow diagrams and allow more transparency in their monitoring. Important operational data are recorded and graphically displayed. If something is not running properly, an alarm is generated immediately.

JPL (Jet Propulsion Laboratory): Managed for NASA by the California Institute of Technology, the Jet Propulsion Laboratory is the lead U.S. center for robotic exploration of the solar system. In addition to its work for NASA, JPL conducts tasks for a variety of other federal agencies. JPL also manages the worldwide Deep Space Network, which communicates with spacecraft and Conducts scientific investigations from its complexes in California's Mojave Desert near Goldstone; near Madrid, Spain; and near Canberra, Australia.

OPC (OLE for Process Control): A communication standard based on OLE (Object Linking & Embedding) and COM (Component Object Model) technology that forms the new means of exchanging information between MS Windows applications. It offers interoperability between the control, command, supervision applications, the industrial equipment (PLCs, sensors, actuators) and the office management applications. OPC defines standard objects, methods and properties built on the COM concept to allow real time data servers like DCS, PLC and field equipment to communicate their data to OPC clients.

PLC (Programmable Logic Controller): A device that can be programmed to react to input signals. Modern day PLCs are sophisticated enough to perform any control task. PLCs are rugged, reliable, and easy to program. They are economically competitive with other control methods and have replaced conventional hard-wired relay and timer panels in many applications. PLCs can stand alone, be networked together, or networked to an Operator Interface or SCADA system.

Q (Q-Residual): A measure of deviation from a model where the deviation is outside the model. This measurement is referred to as Q or Q-Residual for PCA. For PLS, it is called Residual.

SCADA (Supervisory Control and Data Acquisition): Contains components of control, analysis, monitoring, storage and management of the information flow between the systems at the field level and the control level of a company. This ensures that the decentralized I/O modules and the machine controllers are linked to the office computers on the control level.

SCREAM (System Coherence Rendering Exception Analysis for Maintenance): A collection of models based on technology developed at JPL that provide intelligence for system self-analysis. Originally called BEAM (Beacon-Based Exception Analysis for Multimissions) at JPL.

SPC: Statistical Process Control.

$T^2$ (Hotelling $T^2$): A measure of deviation from a model where the deviation is within the model.

Virtual Sensor: A collection of sensors, often used to measure a single unit operation, that can be treated as a single unit (e.g., the 32 sensors in the Cyranose 320). Individual sensors in the virtual sensor are given a weighting, and a resulting score is calculated. A virtual sensor may be treated like a regular sensor in a model.

Again, it is emphasized that the above-listed concise explanation of terms is for informational purposes only and is not intended to limit or otherwise define the term for purposes of this application or the claims set forth herein. Other meanings of the listed terms may be understood.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An appended diagnostic system comprising:
   a plurality of sensors;
   process manager means for performing diagnostic analysis;
   means for connecting said plurality of sensors with a pre-existing network of a pre-existing monitoring system that is used to monitor equipment;
   means for integrating sensor data from said plurality of sensors with data from pre-existing sensors, to form integrated data, wherein said pre-existing sensors are coupled with said pre-existing monitoring system; and
   means for preprocessing said integrated data for further processing by said process manager means,
   wherein said process manager means performs diagnostic analysis of said equipment based on said integrated data obtained from said plurality of sensors and said plurality of pre-existing sensors, and wherein said process manager means determines an operational state of said equipment.

2. The system of claim 1 wherein said plurality of sensors comprises chemical sensors.

3. The system of claim 1 wherein said plurality of sensors comprises thermal sensors for thermal detection.

4. The system of claim 1 wherein said plurality of sensors comprises mechanical sensors.

5. The system of claim 1 wherein said plurality of sensors comprises radiation sensors.

6. The system of claim 1 wherein said plurality of sensors comprises biological sensors.

7. The system of claim 1, wherein said process manager means comprises:
   means for applying a first model to a first input to identify a first predicted descriptor characteristic of a state of the equipment; and
   means for consulting a knowledge based system to provide an output based upon the first predicted descriptor.

8. The system of claim 1 wherein said plurality of sensors are wireless sensors configured to communicate with said networking module via a communication mode selected from the group consisting of infrared communications and radiofrequency communications.

9. The system of claim 1 wherein said plurality of sensors are non-permanent sensors.

10. The system of claim 1 wherein said process manager means transmits a portion of said integrated data to a data interpretation system.

11. The system of claim 1 wherein said diagnostic analysis corresponds to diagnosing the operational state of a hydrocarbon processing equipment.

12. The system of claim 1 wherein said process manager means provides a notification regarding an occurrence of an event.

13. The system of claim 1 wherein said process manager means provides for initiating follow-on actions.

14. The system of claim 13 wherein said follow-on actions includes correction means responsive to an event.

15. The system of claim 1 wherein said network comprises:
   a first transceiver node, configured to be connected with said plurality of sensors;
   a local hub, connected with said first transceiver node; and
   a second transceiver hub connected with said pre-existing monitoring system, wherein said second transceiver hub is configured to exchange data with said local hub.

16. An appended diagnostic system for analyzing an environment, comprising:
   a plurality of sensors in which each of said plurality of sensors is either a chemical sensor, a biological sensor, or a radiological sensor;
   means for connecting said plurality of sensors with a pre-existing network of a pre-existing monitoring system having a plurality of pre-existing sensors that is used to monitor said environment;
   process manager means for performing diagnostic analysis; and a server for preprocessing data obtained from said plurality of sensors and data obtained from said plurality of pre-existing sensors, for further processing by said process manager means,
wherein said process manager means performs diagnostic analysis of said environment based on said integrated data obtained from said plurality of sensors and said plurality of pre-existing sensors, and wherein said process manager means determines a state of said environment.

* * * * *